US012756164B2

(12) United States Patent
Willits et al.

(10) Patent No.: US 12,756,164 B2
(45) Date of Patent: Oct. 6, 2026

(54) CABLE CUTTING ACCESSORY

(71) Applicant: Black & Decker Inc., New Britain, CT (US)

(72) Inventors: Samuel Willits, Towson, MD (US); Thomas R. Kaye, Jr., Fallston, MD (US); Marco Lourenco, Lebanon, OH (US)

(73) Assignee: Black & Decker Inc., New Britain, CT (US)

( * ) Notice: Subject to any disclaimer, the term of this patent is extended or adjusted under 35 U.S.C. 154(b) by 173 days.

(21) Appl. No.: 18/441,116

(22) Filed: Feb. 14, 2024

(65) Prior Publication Data

US 2024/0275145 A1 Aug. 15, 2024

Related U.S. Application Data

(60) Provisional application No. 63/485,138, filed on Feb. 15, 2023.

(51) Int. Cl.
*H02G 1/12* (2006.01)
*B25F 3/00* (2006.01)

(52) U.S. Cl.
CPC ............. *H02G 1/1265* (2013.01); *B25F 3/00* (2013.01)

(58) Field of Classification Search
CPC ................................ B25F 3/00; H02G 1/1265
See application file for complete search history.

(56) References Cited

U.S. PATENT DOCUMENTS 2,917,760 A * 12/1959 John ........................ A47L 11/40 15/49.1
3,093,023 A * 6/1963 Vail ...................... B23D 45/122 83/594
3,913,799 A * 10/1975 Davis, Jr. ............ B05C 17/0103 222/326
3,959,877 A 6/1976 Zorzenon
4,062,110 A * 12/1977 Alvarez ............... H02G 1/1297 30/90.3
4,103,578 A * 8/1978 Ducret ................. H02G 1/1297 83/924

(Continued)

FOREIGN PATENT DOCUMENTS

CN 108321732 A 7/2018
CN 108808575 A 11/2018

(Continued)

OTHER PUBLICATIONS

Extended European Search Report, EP Application No. 24157788.1-1201, Jun. 21, 2024, 8 pages, EPO.

*Primary Examiner* — Sean M Michalski
(74) *Attorney, Agent, or Firm* — Brake Hughes Bellermann LLP

(57) ABSTRACT

A device may include a housing. A device may include a rotatable input shaft at least partially received in the housing and configured to be coupled to a power tool. A device may include a rotatable blade configured to be rotated upon rotation of the rotatable input shaft. A device may include a jaw assembly coupled to the housing and including a first jaw and a second jaw operable to grasp a cable, the jaw assembly operable to move the cable towards the rotatable blade allowing the rotatable blade to form a slit in an exterior jacket of the cable.

31 Claims, 43 Drawing Sheets

200

(56) References Cited

U.S. PATENT DOCUMENTS

| | | | | |
|---|---|---|---|---|
| 4,169,400 | A * | 10/1979 | Ducret | H02G 1/1297 83/924 |
| 4,730,391 | A | 3/1988 | Wood | |
| 4,844,177 | A * | 7/1989 | Robinson | B25B 23/145 81/473 |
| 4,901,438 | A * | 2/1990 | Gibney | B25F 5/00 30/90.3 |
| 4,949,463 | A * | 8/1990 | Chen | B23D 57/0076 30/500 |
| 5,191,666 | A * | 3/1993 | Corbin | B25B 21/007 7/165 |
| 5,649,793 | A * | 7/1997 | Ericksen | B23B 49/023 408/81 |
| 5,988,957 | A | 11/1999 | Wheeler | |
| 6,044,744 | A * | 4/2000 | Eslambolchi | H02G 1/1239 30/90.7 |
| 6,138,362 | A | 10/2000 | Yoshimori | |
| 6,176,322 | B1 * | 1/2001 | Wadge | B25F 3/00 408/4 |
| 6,178,643 | B1 | 1/2001 | Erbrick et al. | |
| 6,261,035 | B1 | 7/2001 | Moores et al. | |
| 6,929,266 | B2 | 8/2005 | Peters et al. | |
| 7,086,813 | B1 | 8/2006 | Boyle et al. | |
| 7,293,362 | B2 | 11/2007 | Konen | |
| 7,681,315 | B2 * | 3/2010 | Wicklund, Jr. | B25B 7/22 30/361 |
| 7,984,556 | B2 | 7/2011 | Konen | |
| 8,622,401 | B2 | 1/2014 | Puzio et al. | |
| 9,156,147 | B2 | 10/2015 | Peters et al. | |
| 9,388,885 | B2 * | 7/2016 | Hartranft | B25F 5/001 |
| 9,701,032 | B2 | 7/2017 | Moss et al. | |
| 10,978,860 | B1 * | 4/2021 | Wendt | B23D 45/003 |
| 11,276,993 | B2 | 3/2022 | Sedlacek | |
| 12,294,204 | B2 * | 5/2025 | Galindo Gonzalez | H02G 1/1297 |
| 2007/0152408 | A1 * | 7/2007 | Peters | B23B 31/107 279/143 |
| 2009/0013477 | A1 * | 1/2009 | Agronin | H02G 1/1214 30/90.1 |
| 2012/0124841 | A1 | 5/2012 | Ducret | |
| 2016/0271781 | A1 | 9/2016 | Kobayashi et al. | |
| 2018/0183221 | A1 | 6/2018 | Wilcox | |

FOREIGN PATENT DOCUMENTS

| | | | |
|---|---|---|---|
| CN | 106129777 | B | 12/2018 |
| CN | 109616957 | A | 4/2019 |
| CN | 208782368 | U | 4/2019 |
| CN | 111755993 | A | 10/2020 |
| CN | 113991554 | A | 1/2022 |
| EP | 2977155 | B1 | 1/2018 |
| JP | 2020131298 | A | 8/2020 |
| KR | 200148315 | Y1 | 6/1999 |
| KR | 1020160081713 | A | 7/2016 |
| KR | 101847404 | B1 | 4/2018 |

* cited by examiner

100

100

200

200

200

200

300

300

300

300

300

300

500

514

512

512

512

512

500

510

500

600B

600C

CABLE CUTTING ACCESSORY

CROSS-REFERENCE TO RELATED APPLICATION

This application claims the benefit of and priority to U.S. Provisional Application No. 63/485,138, filed Feb. 15, 2023, which is incorporated by reference herein in its entirety.

FIELD

This document relates, generally, to a cable cutting accessory, and in particular to a cable cutting accessory that facilitates quick retention of the cable to the accessory, and smooth movement of the cable towards a rotating saw.

BACKGROUND

Electrical professionals use various types of cable and conduits to route electrical wiring through buildings. One example of cable is metal clad (MC) cable, an assembly of one or more insulated circuit conductors enclosed in an armor of interlocking metal tape. The interlocking metal tape creates a corrugated sheath around the wires. When installing electrical cable at a site, electricians must make cuts to the cable sheathing, and some of those cuts must be performed without cutting or damaging the wires protected within the cable.

When electrical cable, for example MC cable, is composed of a jacket or sheathing made of spiral metal tape, cutting through a single corrugated rib is enough to create a circumferential break in the jacket. Prior specialized tools allow an electrician to clamp electrical cable against a rotatable blade and then turn a hand crank to cut through one of the raised corrugated ribs of the cable. Operating a hand crank tool in tight spaces can be awkward and time-consuming for the electrical professional, however. In addition, because prior tools clamp the electrical cable tightly against the blade, the pressure of the cable against the blade can create resistance which must be overcome when the user begins to turn the hand crank to cut the cable.

SUMMARY

In some aspects, the techniques described herein relate to a cable jacket cutting device including: a housing; a rotatable input shaft at least partially received in the housing and configured to be coupled to a power tool; a rotatable blade configured to be rotated upon rotation of the rotatable input shaft; and a jaw assembly coupled to the housing and including a first jaw and a second jaw operable to grasp a cable, the jaw assembly operable to move the cable towards the rotatable blade allowing the rotatable blade to form a slit in an exterior jacket of the cable.

In some aspects, the techniques described herein relate to a cable jacket cutting device, wherein the jaw assembly is movable between an open position and a closed position and is biased toward the closed position.

In some aspects, the techniques described herein relate to a cable jacket cutting device, wherein the second jaw is coupled to the housing via a pivot point.

In some aspects, the techniques described herein relate to a cable jacket cutting device, wherein the first jaw is configured to move towards and away from the rotatable blade via a track engaged with a groove.

In some aspects, the techniques described herein relate to a cable jacket cutting device, wherein the first jaw and the second jaw are operable to move independently with respect to one another.

In some aspects, the techniques described herein relate to a cable jacket cutting device, further including a lever coupled to the housing operable to move the first jaw away from the rotatable blade.

In some aspects, the techniques described herein relate to a cable jacket cutting device, further including a biasing member operable to bias the second jaw towards the first jaw.

In some aspects, the techniques described herein relate to a cable jacket cutting device, wherein the biasing member includes at least one of a compression spring, an extension spring, or a torsion spring.

In some aspects, the techniques described herein relate to a cable jacket cutting device, further including: a second rotatable shaft oriented transverse to the rotatable input shaft; and a plurality of gears operable to couple the rotatable input shaft to the second rotatable shaft.

In some aspects, the techniques described herein relate to a cable jacket cutting device, further including a bit holder assembly rotatably drivable upon rotation of the rotatable input shaft.

In some aspects, the techniques described herein relate to a cable jacket cutting device, further including at least one roller coupled to the jaw assembly and configured to support the cable.

In some aspects, the techniques described herein relate to a cable jacket cutting device, wherein the at least one roller is coupled to one of the first jaw or the second jaw is configured to rotate and translate relative to one of the first jaw and the second jaw.

In some aspects, the techniques described herein relate to a cable jacket cutting device, wherein the jaw assembly is movable between a first position in which the rotatable blade is unexposed and a second position in which the rotatable blade is exposed to form the slit in a jacket of the cable.

In some aspects, the techniques described herein relate to a cable jacket cutting device, wherein the housing includes a door configured to be openable to replace the rotatable blade.

In some aspects, the techniques described herein relate to a cable jacket cutting device, wherein the jaw assembly further includes a lock member configured to engage a groove in a jacket of the cable when the jaw assembly is in a closed position.

In some aspects, the techniques described herein relate to a cable jacket cutting device, wherein a first biasing force on the first jaw biases the first jaw towards the second jaw and a second biasing force on the second jaw biases the second jaw towards the rotatable blade, the second biasing force being greater than the first biasing force.

In some aspects, the techniques described herein relate to a cable jacket cutting device, wherein the first jaw includes an indented portion with a first roller on a first side of an indented portion longitudinal axis and a second roller on a second side of the indented portion longitudinal axis, the first roller and the second roller configured to translate in a direction perpendicular to the indented portion longitudinal axis and a rotating input shaft axis, the first roller and the second roller being biased in the direction of the second jaw.

In some aspects, the techniques described herein relate to a cable jacket cutting device, further including a depth adjustment element positioned at least partially within the housing, the depth adjustment element including a set screw adjustable to change a length of travel of the first jaw towards the rotatable blade.

In some aspects, the techniques described herein relate to a cable jacket cutting device, further including: a lock plate coupled to the second jaw oriented to be transverse to a rotatable blade plane and a rotating input shaft axis, the lock plate being twistable with respect to the second jaw when the cable is installed inside the jaw assembly.

In some aspects, the techniques described herein relate to a cable jacket cutting device, further including: a lock plate coupled to the second jaw oriented to be transverse to a rotatable blade plane and a rotating input shaft axis, the lock plate including an edge portion with a first section configured to guide the cable into the jaw assembly and a second section configured to hold the cable against the first jaw.

In some aspects, the techniques described herein relate to a cable jacket cutting device, wherein the second jaw further includes a second jaw roller.

In some aspects, the techniques described herein relate to a cable jacket cutting device, further including a door configured to provide access to the rotatable blade.

In some aspects, the techniques described herein relate to a cable jacket cutting device, wherein the door includes a pivot end and a fastener end.

In some aspects, the techniques described herein relate to a cable jacket cutting device, wherein the door provides access at least one of a spare rotatable blade or a set screw.

In some aspects, the techniques described herein relate to a method including: coupling a rotatable input shaft of a cable jacket cutting device to a rotating output member of a power tool; inserting a cable having an exterior jacket between a first jaw and a second jaw of the cable jacket cutting device, at least one of the first jaw and the second jaw causing the cable to move toward a blade that is rotatably driven upon rotation of the rotatable input shaft; actuating the power tool to cause rotation of the blade to form a slit in the exterior jacket of the cable.

In some aspects, the techniques described herein relate to a method, wherein the first jaw and second jaw are movable between an open position and a closed position and are biased towards the closed position.

In some aspects, the techniques described herein relate to a method, wherein the second jaw is connected to a housing of the cable jacket cutting device via a pivot point.

In some aspects, the techniques described herein relate to a method, wherein the first jaw is configured to move towards and away from the blade via a track engaged with a groove system.

In some aspects, the techniques described herein relate to a method, wherein the first jaw and the second jaw are operable to move independently with respect to one another.

In some aspects, the techniques described herein relate to a method, wherein the cable jacket cutting device further includes a lever coupled to a housing, the lever being operable to move the first jaw away from the blade.

In some aspects, the techniques described herein relate to a method, wherein the cable jacket cutting device further includes a biasing member and a housing, the biasing member seated between the housing and the second jaw, the biasing member being operable to bias the second jaw towards the first jaw.

In some aspects, the techniques described herein relate to a method, wherein the biasing member includes at least one of a compression spring, an extension spring, or a torsion spring.

In some aspects, the techniques described herein relate to a method, wherein the cable jacket cutting device further includes a second rotatable input shaft coupled in a transverse orientation to the rotatable input shaft, and a plurality of gears operable to couple the rotatable input shaft to the second rotatable input shaft.

In some aspects, the techniques described herein relate to a method, wherein the cable jacket cutting device further includes a bit holder assembly coupled to a coupling end of the rotatable input shaft, the bit holder assembly rotatably drivable by rotation of the rotatable input shaft.

In some aspects, the techniques described herein relate to a method, wherein a first spring force on the first jaw biases the first jaw towards the second jaw and a second spring force on the second jaw biases the second jaw towards the blade, the second spring force being greater than the first spring force.

In some aspects, the techniques described herein relate to a method, wherein the first jaw includes an indented portion with a first roller on a first side of an indented portion longitudinal axis and a second roller on a second side of the indented portion longitudinal axis, the first roller and the second roller configured to translate in a direction perpendicular to the indented portion longitudinal axis and a rotating input shaft axis, the first roller and the second roller being biased in the direction of the second jaw.

In some aspects, the techniques described herein relate to a method, wherein the cable jacket cutting device further includes a depth adjustment element coupled at least partially within a housing, the depth adjustment element including a set screw adjustable to change a length of travel of the first jaw towards the blade.

In some aspects, the techniques described herein relate to a method, wherein the cable jacket cutting device further includes a lock plate coupled to the second jaw oriented transverse to a rotatable blade plane and a rotating input shaft axis, the lock plate being twistable with respect to the second jaw when a cable is installed inside the first jaw and the second jaw.

In some aspects, the techniques described herein relate to a method, wherein the cable jacket cutting device further includes a lock plate coupled to the second jaw oriented to be transverse to a rotatable blade plane and a rotating input shaft axis, the lock plate including an edge portion with a first section configured to guide the cable into the first jaw and the second jaw and a second section configured to hold the cable against the first jaw.

In some aspects, the techniques described herein relate to a method, wherein the cable jacket cutting device further includes a second jaw roller coupled to the second jaw.

In some aspects, the techniques described herein relate to a method, wherein the cable jacket cutting device further includes a door coupled to a housing, the door configured to provide access to the blade.

In some aspects, the techniques described herein relate to a method, wherein the door includes a pivot end and a fastener end.

In some aspects, the techniques described herein relate to a method, wherein the door provides access at least one of a spare rotatable blade or a set screw.

In some aspects, the techniques described herein relate to a cable jacket cutting device including: a housing; a rotatable input shaft at least partially received in the housing and configured to be coupled to a power tool; a rotatable blade configured to be rotated upon rotation of the rotatable input shaft; a cable holder assembly configured to hold a cable while allowing the rotatable blade to form a slit in an exterior jacket of the cable; and a bit holder configured to be rotated upon rotation of the rotatable input shaft.

In some aspects, the techniques described herein relate to a cable jacket cutting device, wherein the cable holder assembly further includes a jaw assembly including a first jaw and a second jaw operable to grasp the cable and to move the cable towards the rotatable blade allowing the rotatable blade to pass through a slot in one of the first jaw or the second jaw.

In some aspects, the techniques described herein relate to a cable jacket cutting device, wherein the jaw assembly is movable between an open position and a closed position and is biased toward the closed position.

In some aspects, the techniques described herein relate to a cable jacket cutting device, wherein at least one of the first jaw or the second jaw is pivotally coupled to the housing.

In some aspects, the techniques described herein relate to a cable jacket cutting device including: a housing; a rotatable input shaft at least partially received in the housing and configured to be coupled to a power tool; a rotatable blade configured to be rotated upon rotation of the rotatable input shaft; and a jaw assembly coupled to the housing and including a first jaw and a second jaw operable to grasp a cable, a lock member configured to engage a groove in a jacket of the cable when the cable is grasped by the jaw assembly, and at least one roller configured to support the cable when grasped by the jaw assembly, wherein the jaw assembly is operably movable between a first position in which the rotatable blade is unexposed and a second position in which the rotatable blade is exposed and is rotatable to form a slit in the jacket of the cable.

In some aspects, the techniques described herein relate to a cable jacket cutting device, wherein the first jaw moves towards and away from the rotatable blade via a track engaged with a groove system.

In some aspects, the techniques described herein relate to a cable jacket cutting device, wherein the first jaw and the second jaw are operable to move independently with respect to one another.

In some aspects, the techniques described herein relate to a cable jacket cutting device, further including: a lever coupled to the housing operable to move the first jaw away from the rotatable blade.

In some aspects, the techniques described herein relate to a cable jacket cutting device, further including: a biasing member coupled between the housing and the second jaw, the biasing member being operable to bias the second jaw towards the rotatable blade.

BRIEF DESCRIPTION OF THE DRAWINGS

FIG. 5AA is a detail of a side view of a cable cutting accessory attachment with an open door, in accordance with an example.

FIG. 5BB is a detail of a perspective view of a rotating input shaft, in accordance with an example.

FIG. 5CC is a detail of a cross-sectional view of a cable cutting accessory attachment with a portion of a housing missing, in accordance with an example.

FIG. 5DD is a perspective view of a first jaw, in accordance with an example.

FIG. 5EE is a perspective view of a first jaw, in accordance with an example.

DETAILED DESCRIPTION

A cable cutting accessory attachment is described in the present disclosure that may be coupled to a rotating output member (e.g., a chuck or tool bit holder) of a rotary power-driven tool (e.g., an impact driver, a drill, a drill driver, or a screwdriver). Such rotary power-driven tools may include a motor that outputs torque to drive an accessory and perform an operation on a workpiece. The cable cutting accessory is operable to make a cut to a cable jacket or sheathing, for example a corrugated cable such as a flexible metal cable or a metal clad (MC) cable. In examples, the cable may have wiring inside the cable jacket. In examples, the cable cutting accessory may be operable to cut the cable jacket to make a circumferential break without damaging any electrical wiring inside the cable.

When attached to a rotating output member of the power-driven tool, the cable cutting accessory, in accordance with examples described herein, may provide for secure gripping of the cable in a first position in which the cable may not be in contact with the blade. The cable cutting accessory may then allow for a smooth movement of the cable towards a blade rotated by the power-driven tool to cut cable.

Flexible metal cable such as MC cable is a collection of insulated wires (typically 14- or 12-gauge), bundled together and protected by a ribbon-like metal jacket that provides a corrugated spiral exterior surface. Cutting a ridge of the corrugated jacket in a longitudinal direction can sever a section of the spiral ribbon, thereby allowing for a circumferential break in the jacket. The devices and method described herein may be used to cut electrical cabling, or any other type of jacket.

Figure 1B:
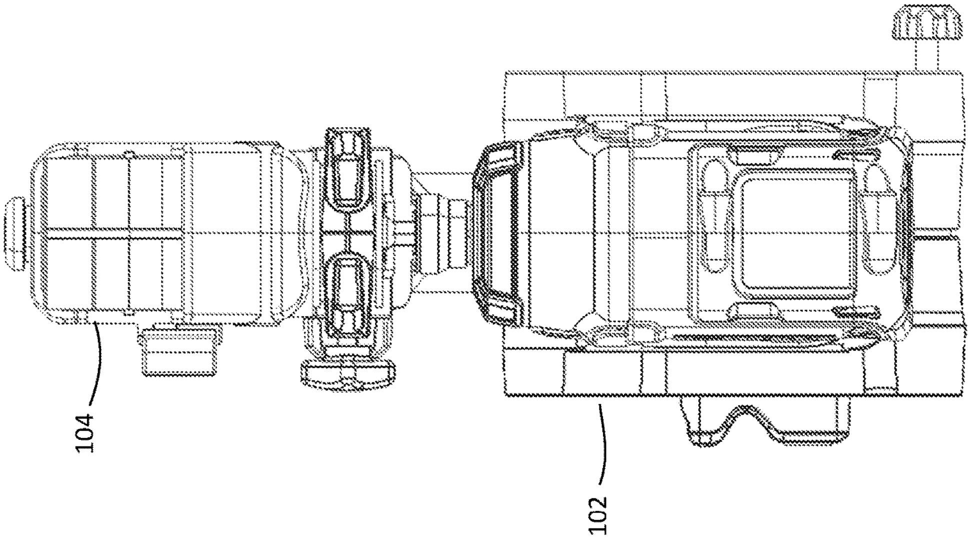
FIG. 1B is a top view of a power-driven tool with a cable cutting accessory attachment, in accordance with an example.
Figure 1A:
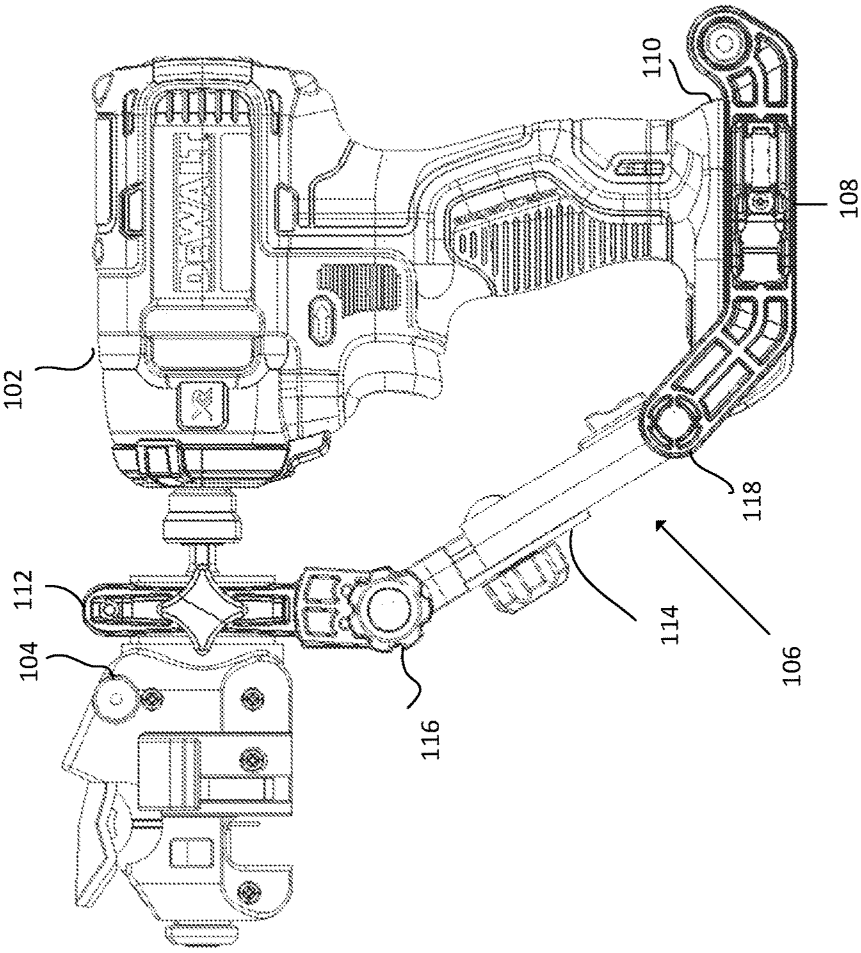
FIG. 1A is a side view of a power-driven tool with a cable cutting accessory attachment, in accordance with an example.
Figure 1C:
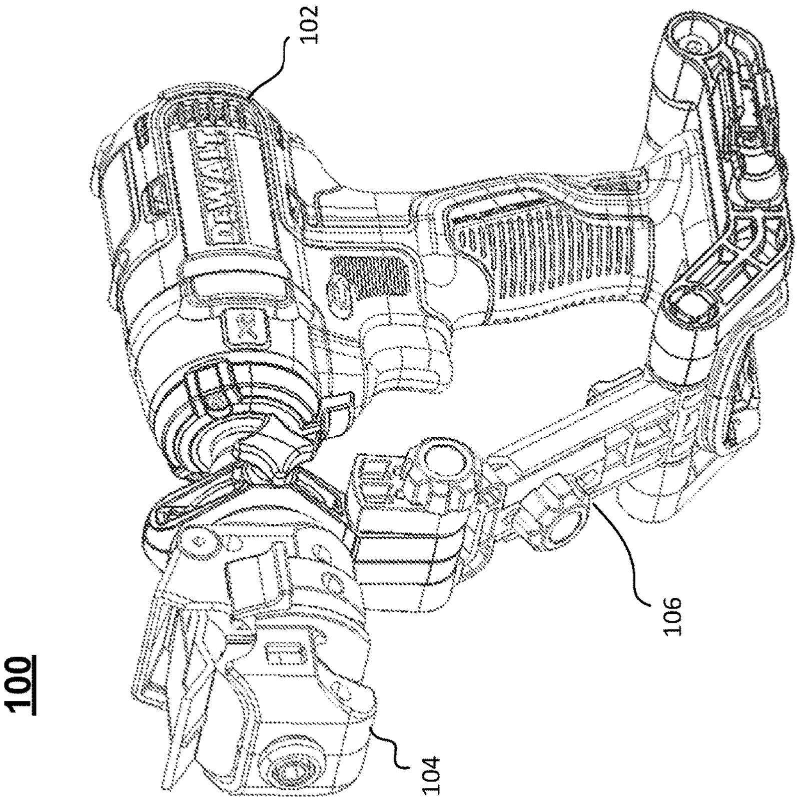
FIG. 1C is a perspective view of a power-driven tool with a cable cutting accessory attachment, in accordance with an example.
Figure 1D:
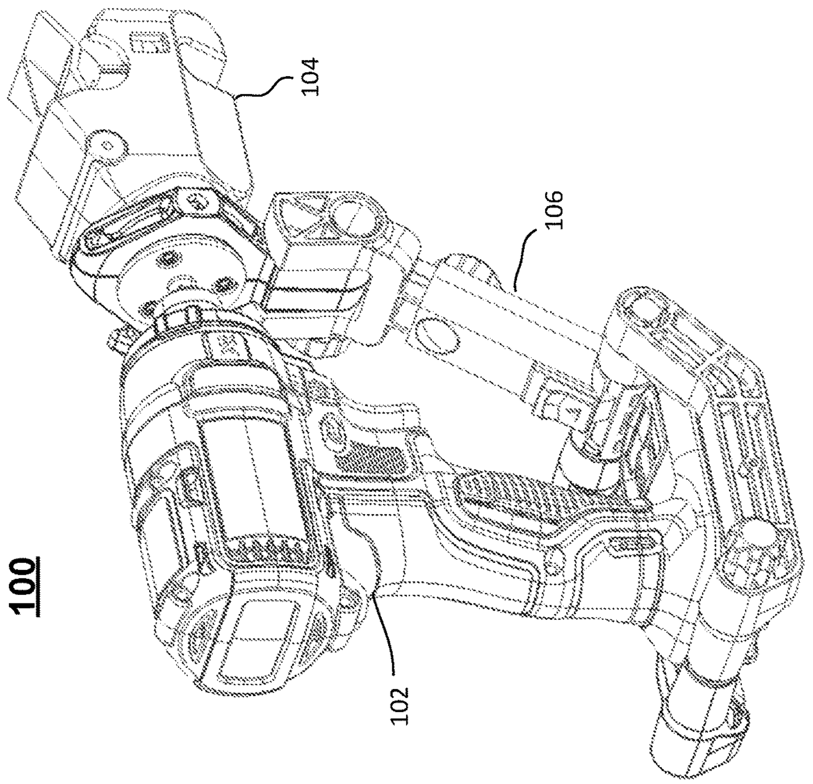
FIG. 1D is a perspective view of a power-driven tool with a cable cutting accessory attachment, in accordance with an example.

FIG. 1A provides a side view of a power-driven tool and a cable cutting accessory attachment combination 100, in accordance with an example. FIG. 1B depicts a top view, and FIGS. 1C and 1D depict perspective views of the cable cutting accessory attachment combination 100 (also referred to interchangeably throughout as accessory attachment combination 100).

Accessory attachment combination 100 includes a power-driven tool 102 and a cable cutting accessory attachment 104. Power-driven tool 102 may be any tool that provides a rotating output member. For example, power-driven tool 102 may comprise a drill, drill/driver combination, an impact driver, or any tool that provides a rotating output member.

Cable cutting accessory attachment 104 can be coupled to a rotating output member of power-driven tool 102 to cut a cable. Cable cutting accessory attachment 104 is depicted in FIGS. 1A to 1D as the same as accessory attachment 200 depicted in FIGS. 2A to 2M below, but this is not intended to be limiting. In examples, cable cutting accessory attachment 104 may comprise any of the example cable cutting accessories 200, 300, 400, 500 described in this disclosure or similar cable cutting accessories.

In examples, accessory attachment combination 100 may further include a brace assembly 106. As may best seen in FIG. 1A, brace assembly 106 may include a clamping assembly 108 configured to be removably and rigidly attached to a base portion 110 of power-driven tool 102. A collar 112 is configured to be coupled to a neck of cable cutting accessory attachment 104. An arm assembly 114 has a first end portion 116 pivotally coupled to the collar 112 and an opposite second end portion 118 coupled to the clamping assembly 108. Brace assembly 106 may allow for a rigid coupling of power-driven tool 102 to accessory attachment 104. Brace assembly 106 may have a configuration the same as or similar to one or more of the brace assemblies disclosed in U.S. Pat. App. Pub. No. 2022/0331942, which is incorporated by reference in its entirety.

Figure 2A:
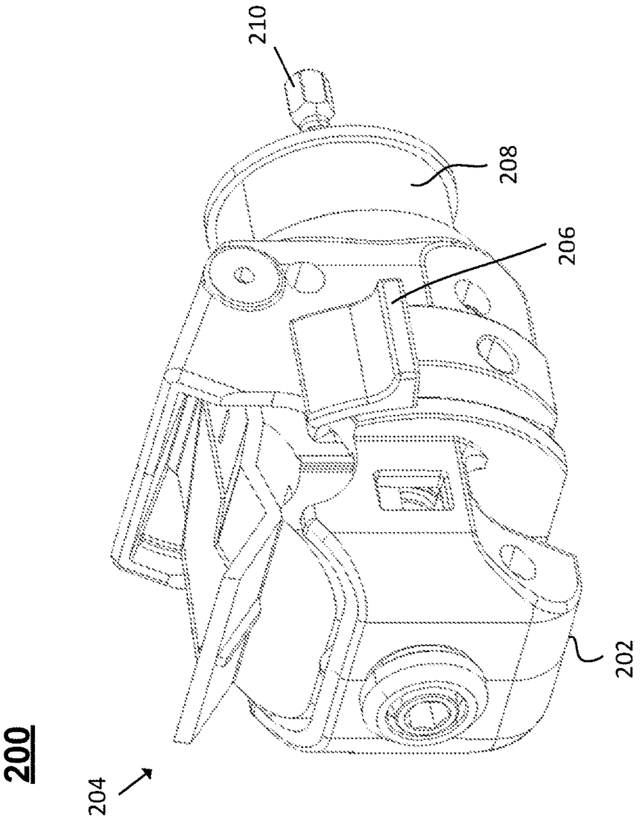
FIG. 2A is a perspective view of a cable cutting accessory attachment, in accordance with an example.
Figure 2B:
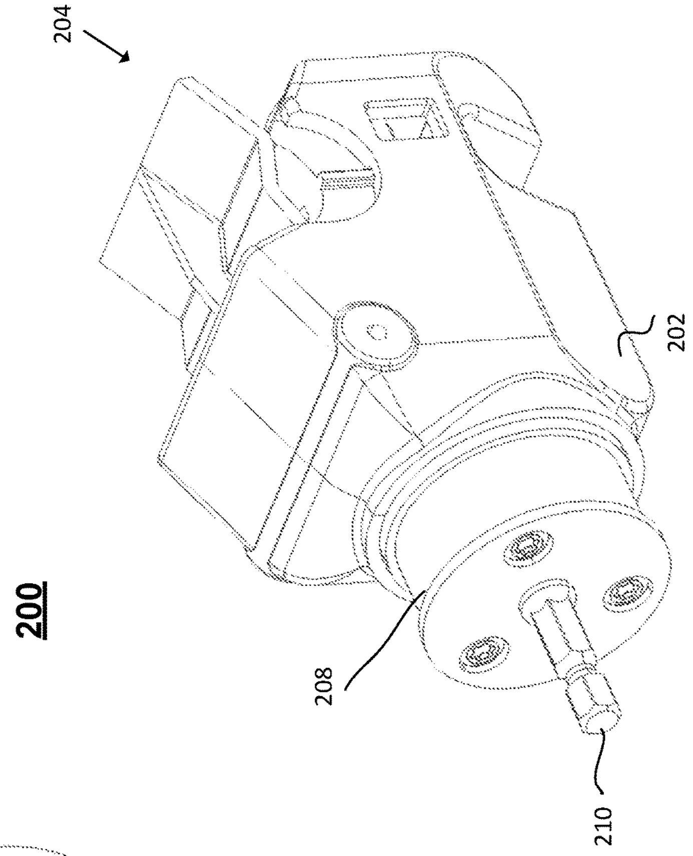
FIG. 2B is a perspective view of a cable cutting accessory attachment, in accordance with an example.
Figure 2C:
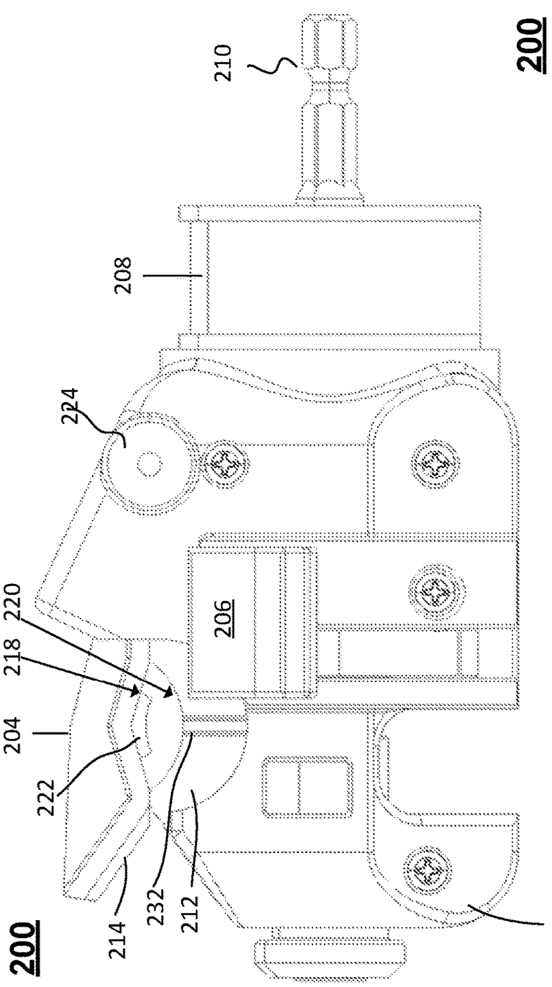
FIG. 2C is a side view of a cable cutting accessory attachment, in accordance with an example.
Figure 2D:
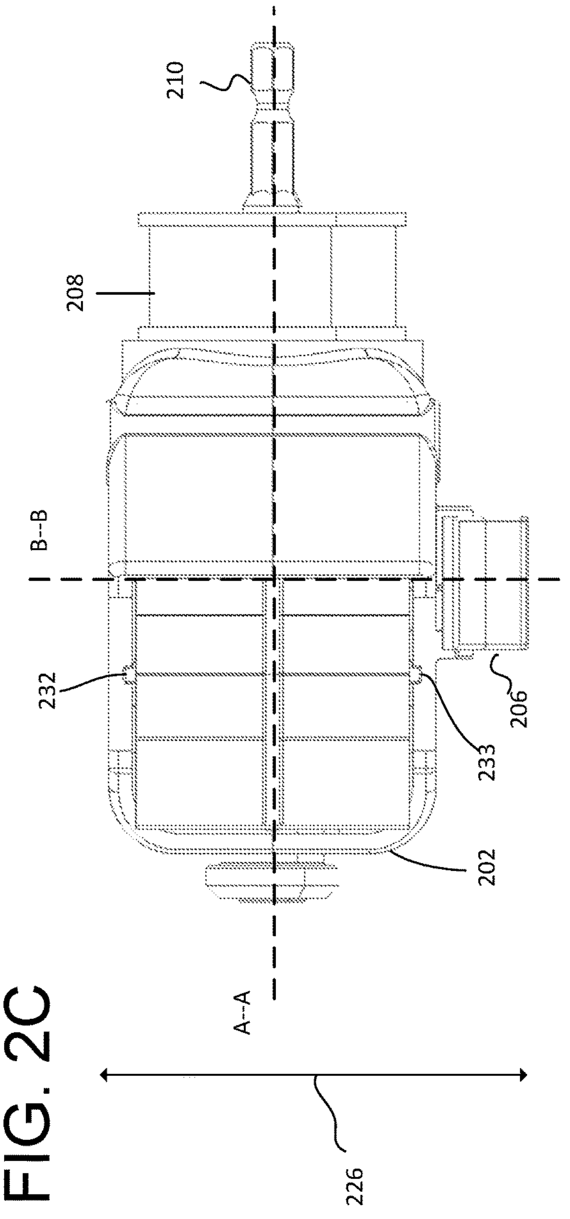
FIG. 2D is a top view of a cable cutting accessory attachment, in accordance with an example.
Figure 2E:
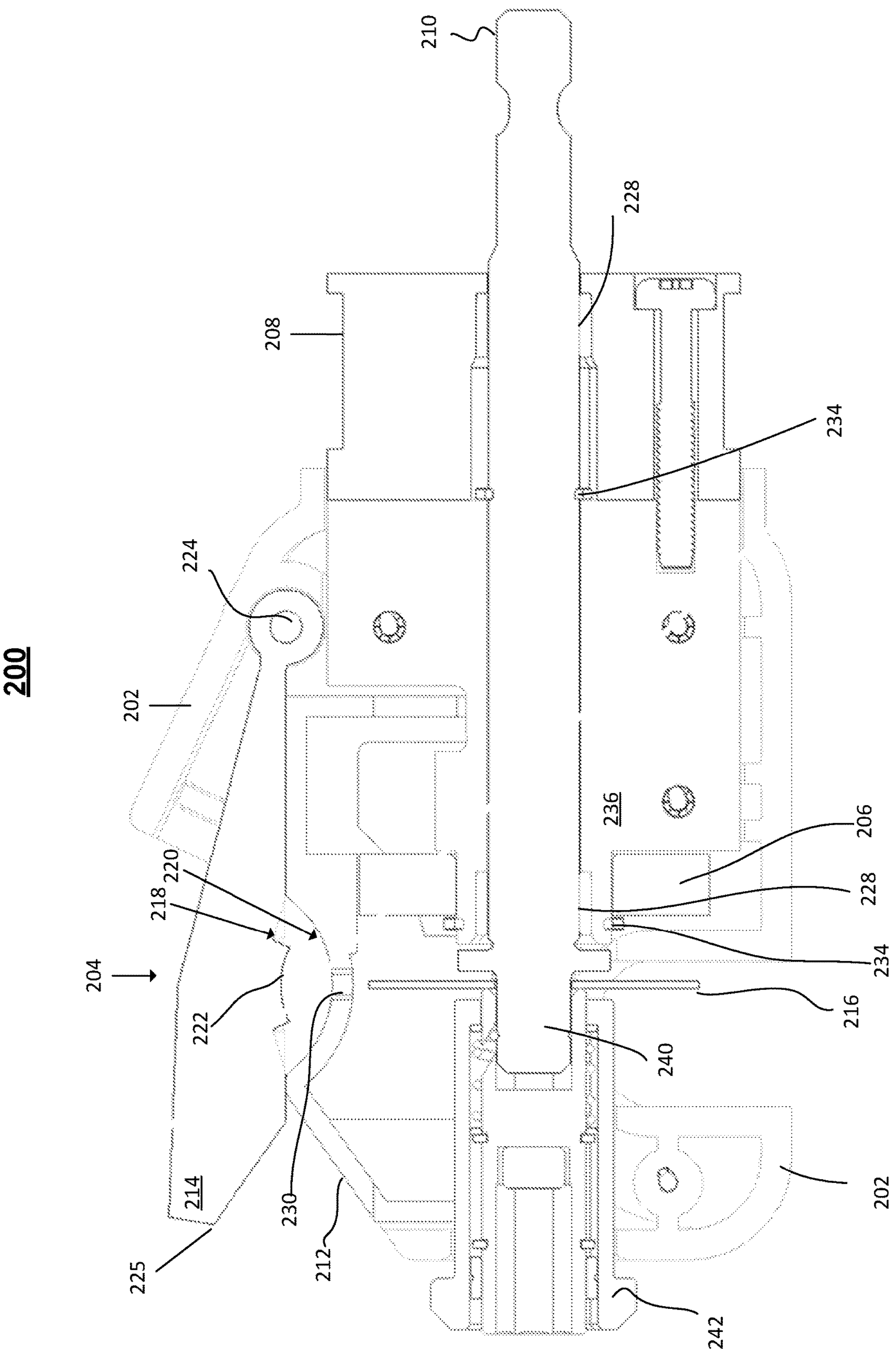
FIG. 2E is a cross-sectional view of a cable cutting accessory attachment, in accordance with an example.
Figure 2F:
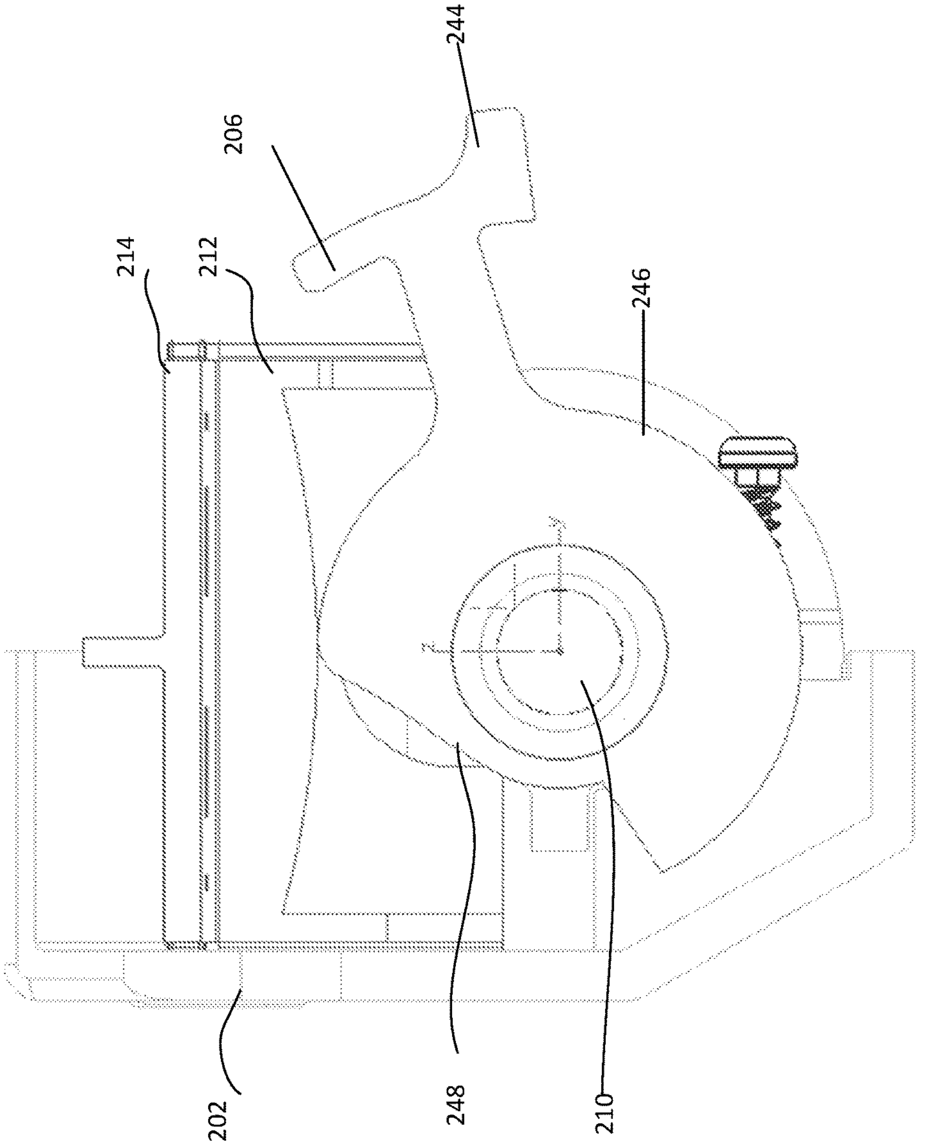
FIG. 2F is a cross-sectional view of a cable cutting accessory attachment, in accordance with an example.
Figure 2H:
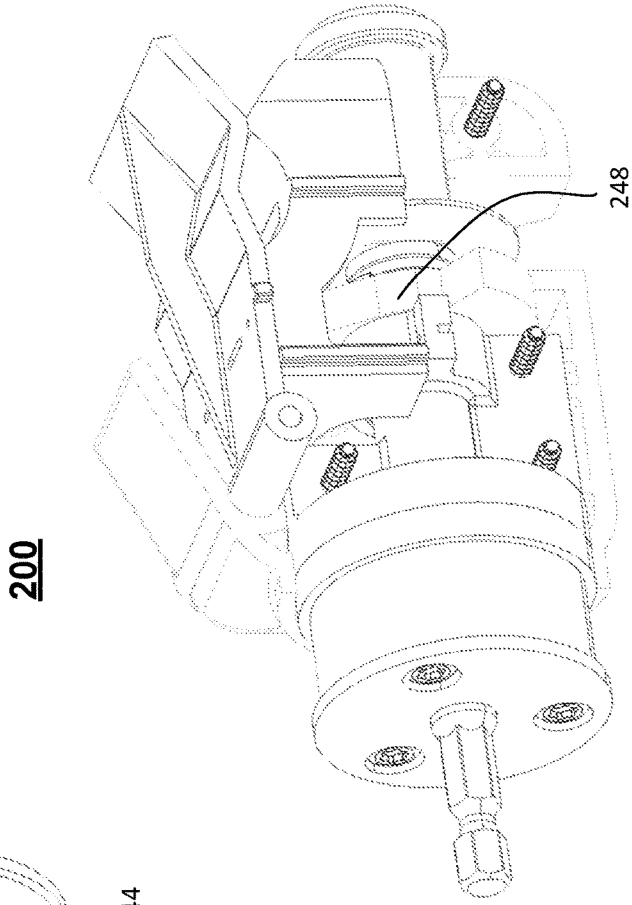
FIG. 2H is a perspective view of a cable cutting accessory attachment with a portion of housing removed, in accordance with an example.
Figure 2G:
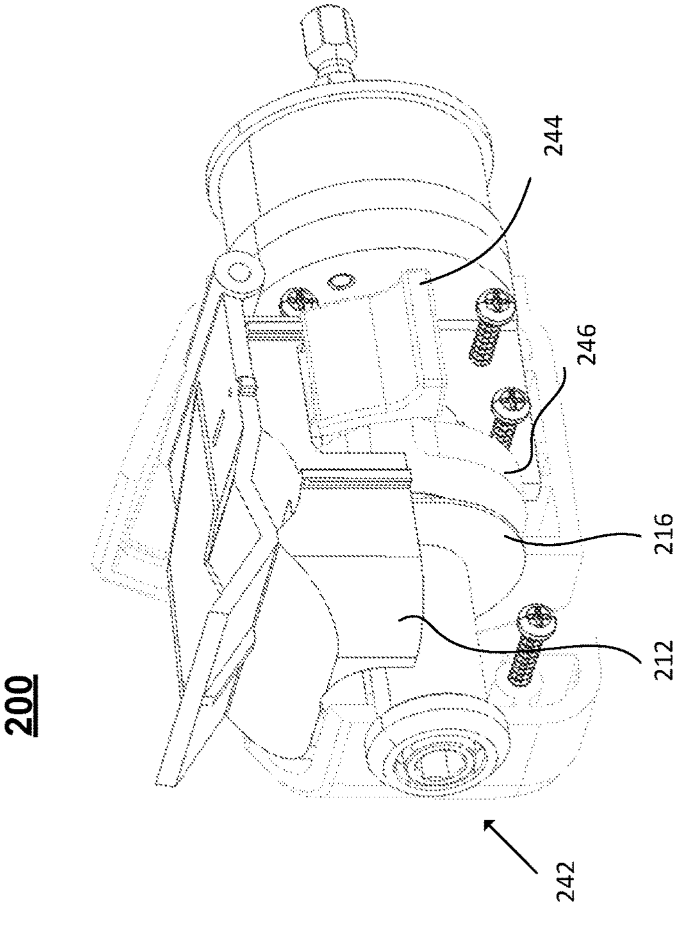
FIG. 2G is a perspective view of a cable cutting accessory attachment with a portion of housing removed, in accordance with an example.
Figure 2I:
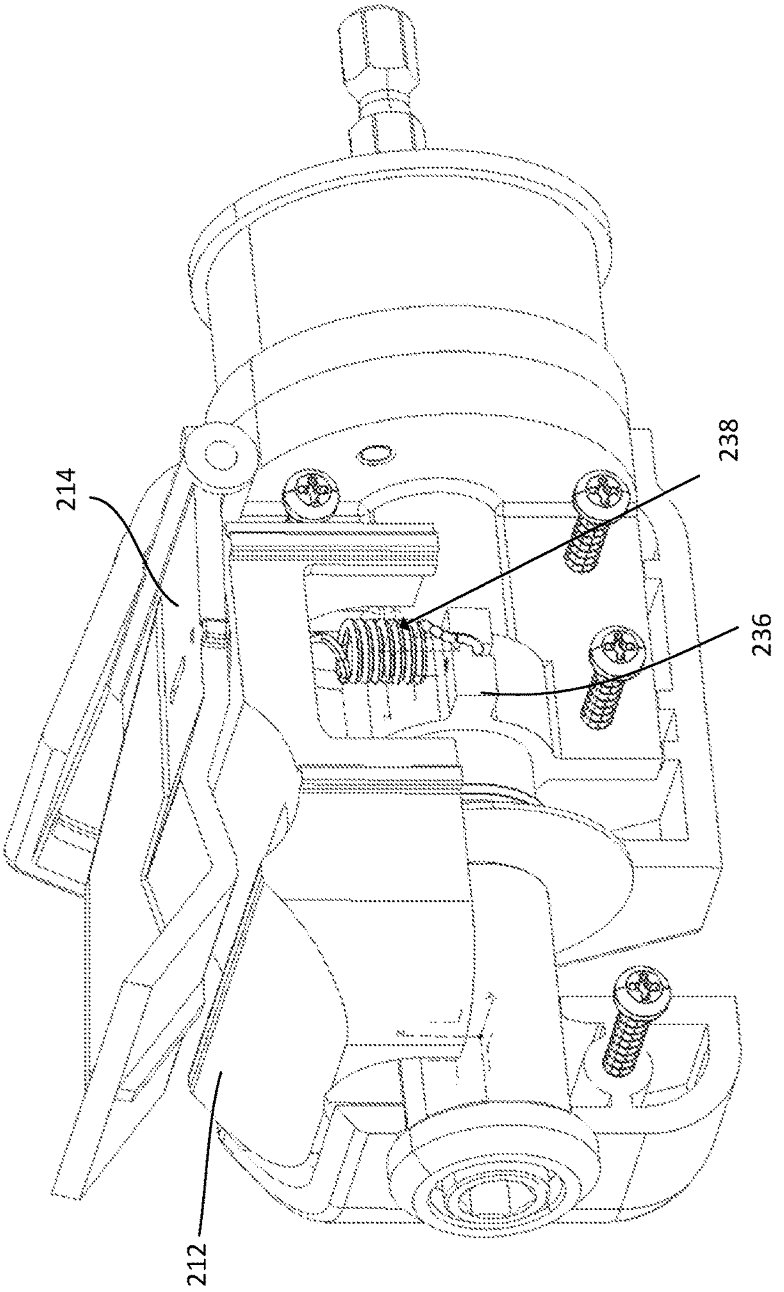
FIG. 2I is a perspective view of a cable cutting accessory attachment with a cover removed, in accordance with an example.

FIGS. 2A to 2I depict views of an example implementation of a cable cutting accessory attachment 200 in a disengaged position, in accordance with an example. By disengaged, what is meant is that cable cutting accessory attachment 200 is neither clasping nor cutting a cable. FIGS. 2A and 2B depict a perspective view of a cable cutting accessory attachment 200, in accordance with an example. FIG. 2C depicts a side view and FIG. 2D depicts a top view of cable cutting accessory attachment 200. FIG. 2E depicts a cross-sectional view of cable cutting accessory attachment along A-A noted in FIG. 2D, and FIG. 2F depicts a cross-sectional view of cable cutting accessory attachment 200 along B-B noted in FIG. 2D. FIGS. 2G, 2H, and 2I depict perspective views of cable cutting accessory attachment 200 with a portion of housing 202 removed.

Cable cutting accessory attachment 200 includes a housing 202, jaw assembly 204, a rotating input shaft 210 (visible in FIG. 2E), and a rotating blade 216 (i.e., rotatable blade visible in FIG. 2E.

Housing 202 is configured to surround at least a portion of rotating input shaft 210 and rotating blade 216 coupled therein. Housing 202 may be configured to allow a user to handle accessory attachment 200 without coming into contact with moving parts or injury. Housing 202 may be configured to protect the cable cutting accessory attachment 200 assembly. In examples, 202 may be manufactured from metal, plastic, or any other material or combination of materials.

Rotating input shaft 210 comprises a shaft at least partially housed by housing 202 operable to turn rotating blade 216. Rotating input shaft 210 is operable to be coupled to and driven by power-driven tool 102. Rotating input shaft 210 may include one or more hexagonal ends suitable to be coupled to a rotating input shaft of power-driven tool 102 or a bit holder, as will be further described below. Rotating blade 216 is a circular blade. When coupled to rotating input shaft 210, rotating blade 216 may cut surfaces brought into contact with it.

As may be best seen in the cross-sectional view of FIG. 2E, cable cutting accessory attachment 200 may further include inner housing member 236. In examples, inner housing member 236 may be integral to, and a part of housing 202. In examples, inner housing member 236 may be a separate piece positioned inside housing 202. In examples, inner housing member 236 may be coupled to housing 202 via one or more fasteners. A component described as coupled to housing 202 herein may be coupled to housing 202 via inner housing member 236.

Inner housing member 236 includes a borehole through which rotating input shaft 210 may pass. In examples, rotating input shaft 210 may be coupled to inner housing member 236 via one or more bearings 228. In examples, one or more bearings 228 may comprise one or more sleeve bearings, or any other type of bearing.

In examples, inner housing member 236 may be further configured to couple to or seat a resilient member. In examples, inner housing member 236 may be further configured to couple to a lever.

In examples, inner housing member 236 may be machined or printed from metal or plastic. In examples, inner housing member 236 may be formed via any other manufacturing method.

Cable cutting accessory attachment 200 may further include a neck 208. Neck 208 may be operable to couple housing 202 and/or inner housing member 236 to collar 112 of brace assembly 106, thereby securing the position of cable cutting accessory attachment 200 with respect to power-driven tool 102. Neck 208 may include a circular ring with an annular depression suitable to seat an annular portion of collar 112, for example. In examples, neck 208 may couple to housing 202 and/or inner housing member 236 using one or more fasteners.

As may be best seen in the cross-sectional view of FIG. 2E, in examples, one or more retaining rings 234 positioned around rotating input shaft 210. Rotating input shaft 210 may help secure a longitudinal position of rotating input shaft 210 with respect to housing 202 and/or inner housing member 236.

Jaw assembly 204 comprises a first jaw 212 and a second jaw 214. First jaw 212 and second jaw 214 are operable to clamp, grasp, or squeeze a cable securely between them and/or to move cable 250 towards rotating blade 216.

Second jaw 214 is operable to move with respect to first jaw 212 to allow a cable to be inserted between the two pieces. Second jaw 214 may also move with respect to housing 202. In examples, second jaw 214 may comprise a substantially unitary member. Second jaw 214 may rotate about a pivot point 224 with respect to housing 202. Pivot point 224 may oppose an opening end 225 of second jaw 214, or the end that opens to allow a cable to enter jaw assembly 204. In examples, pivot point 224 may pivot within a portion of housing 202. Housing 202 may be configured around jaw assembly 204 to allow jaw assembly 204 to open wide enough to accommodate any anticipated cable size. Housing 202 may also be configured to allow a user to hold cable cutting accessory attachment 200 without disturbing jaw assembly 204.

In examples, second jaw 214 may include an indented portion 218 facing first jaw 212. Indented portion 218 may be operable to seat or align a cable more precisely with respect to rotating blade 216. Indented portion 218 may also prevent a cable from moving once clamped within jaw assembly 204. The cross-sectional shape of indented portion 218 may extend uniformly along the width of second jaw 214 in a direction along which the longitudinal axis of the cable may be seated. In examples, indented portion 218 may have a semi-circular cross-sectional shape along a width 226 dimension of second jaw 214, forming a cross section of a cylinder inset within second jaw 214. In other examples, indented portion 218 may comprise an angled cross-sectional shape, or any other type of shape operable to secure a cable by complementing the cross-sectional shape of the cable.

In examples, second jaw 214 may include an alignment tab 222. In examples, alignment tab 222 may be coupled around a periphery of the cross-sectional area of indented portion 218. In examples, alignment tab 222 may be located at one position along the width 226 (as seen in FIG. 2D) of indented portion 218. By aligning alignment tab 222 transverse (e.g., perpendicular) to a longitudinal length of indented portion 218 along width 226, alignment tab 222 may be configured to seat between two adjacent corrugated ridges of a cable, thereby aligning the cable with respect to rotating blade 216. This may help align rotating blade 216 to cut one single ridge of a cable precisely.

Jaw assembly 204 further comprises first jaw 212. In examples, first jaw 212 may include its own respective indented portion 220 facing indented portion 218. Indented portion 220 may include many of the same features described with respect to indented portion 218 above. The combination of indented portion 220 and first jaw 212 may provide for a gap or a cavity within jaw assembly 204 that can securely hold a cable. In examples, indented portion 218 and indented portion 220 may be sized to allow for a range of cable sizes to be securely grasped therein.

First jaw 212 includes a slit 230 along at least a portion of indented portion 220 through which at least a portion of rotating blade 216 may pass. In examples, slit 230 may configured with enough width to allow rotating blade 216 to pass through it to cut a single rib of a corrugated cable grasped within jaw assembly 204.

As may be seen in FIG. 2C, in examples, first jaw 212 may be coupled to housing 202 and/or guided moving towards and away from rotating blade 216 via one or more rails 232. One or more rails 232 may interface with one or more grooves 233 positioned in housing 202 (as may be seen in FIG. 2D). In the example of cable cutting accessory attachment 200, one or more rails 232 are substantially straight, allowing first jaw 212 to glide smoothly perpendicularly towards and away from rotating blade 216. As first jaw 212 moves towards and away from rotating blade 216, jaw assembly 204 and the cable grasped therein may also move towards rotating blade 216, enabling a more precise cut. In examples, second jaw 214 may include one or more respective rails as well.

In examples, first jaw 212 and second jaw 214 may be operable to move independently with respect to one another. This may allow for the two-step cable grasp and cable cutting method of operating cable cutting accessory attachment 200. For example, second jaw 214 may pivot open and closed to allow for the clamping of a cable within jaw assembly 204. Next, the movement of first jaw 212 transverse to rotating input shaft 210 facilitates the movement of jaw assembly 204 towards rotating blade 216.

In examples, jaw assembly 204 may be biased to maintain a closed position. For example, as may be seen in FIG. 2I, cable cutting accessory attachment 200 may include a resilient member, e.g., an extension resilient member 238. In examples, extension resilient member 238 may be seated between housing 202 and second jaw 214. In examples, extension resilient member 238 may be seated between inner housing member 236 and second jaw 214. In examples, extension resilient member 238 may be operable to bias second jaw 214 towards first jaw 212. In examples, extension resilient member 238 may be operable to bias second jaw 214 towards rotating input shaft 210 or rotating blade 216. By biasing second jaw 214 towards housing 202 or inner housing member 236, with first jaw 212 positioned, it may be possible to bias jaw assembly 204 in a closed position. In order to seat a cable within jaw assembly 204, a user must overcome the force of extension resilient member 238 to open second jaw 214. After the cable is placed within 204 and the user releases second jaw 214, however, extension resilient member 238 may help secure jaw assembly 204 shut to retain the cable in place. In other examples, the resilient member may comprise a compression resilient member, a leaf spring, a torsion spring, or another type of elastic member.

In examples, cable cutting accessory attachment 200 may include a lever 206. Lever 206 may be coupled to housing 202, for example via inner housing member 236. Lever 206 may pivot around inner housing member 236 to move the position of first jaw 212 with respect to rotating blade 216. As may best be seen in FIG. 2F, a base curved section 246 (i.e., cam section) of lever 206 rotates around rotating input shaft 210. Base curved section 246, which is rotated using a lever 244 accessible to a user outside of housing 202, includes a relatively flattened section 248. The rotational position of base curved section 246 and relatively flattened section 248 determine the displacement of first jaw 212 with respect to rotating input shaft 210.

In the example of cable cutting accessory attachment 200, when lever 244 is rotated towards jaw assembly 204, base curved section 246 comes into contact with first jaw 212, overcoming the bias of extension resilient member 238 and displacing first jaw 212 away from rotating input shaft 210 and rotating blade 216. When lever 244 is rotated away from jaw assembly 204, relatively flattened section 248 comes into contact with first jaw 212, allowing first jaw 212 to move towards rotating input shaft 210 and rotating blade 216 with the bias provided by extension resilient member 238. Lever 206 may therefore allow for the movement of jaw assembly 204 towards rotating blade 216 to facilitate the cutting of a cable.

Lever 206 may be further seen in FIGS. 2G and 2H, where part of housing 202 is removed. In examples, lever 206 may have additional shapes and configuration with respect to the placement of lever 244 to allow for a position that moves a cable towards and away from rotating blade 216 to be cut.

FIGS. 2A-2H depict cable cutting accessory attachment 200 in a disengaged configuration. When disengaged, no cable is held within jaw assembly 204, and lever 206 is configured to push jaw assembly 204 away from rotating blade 216.

Figure 2J:
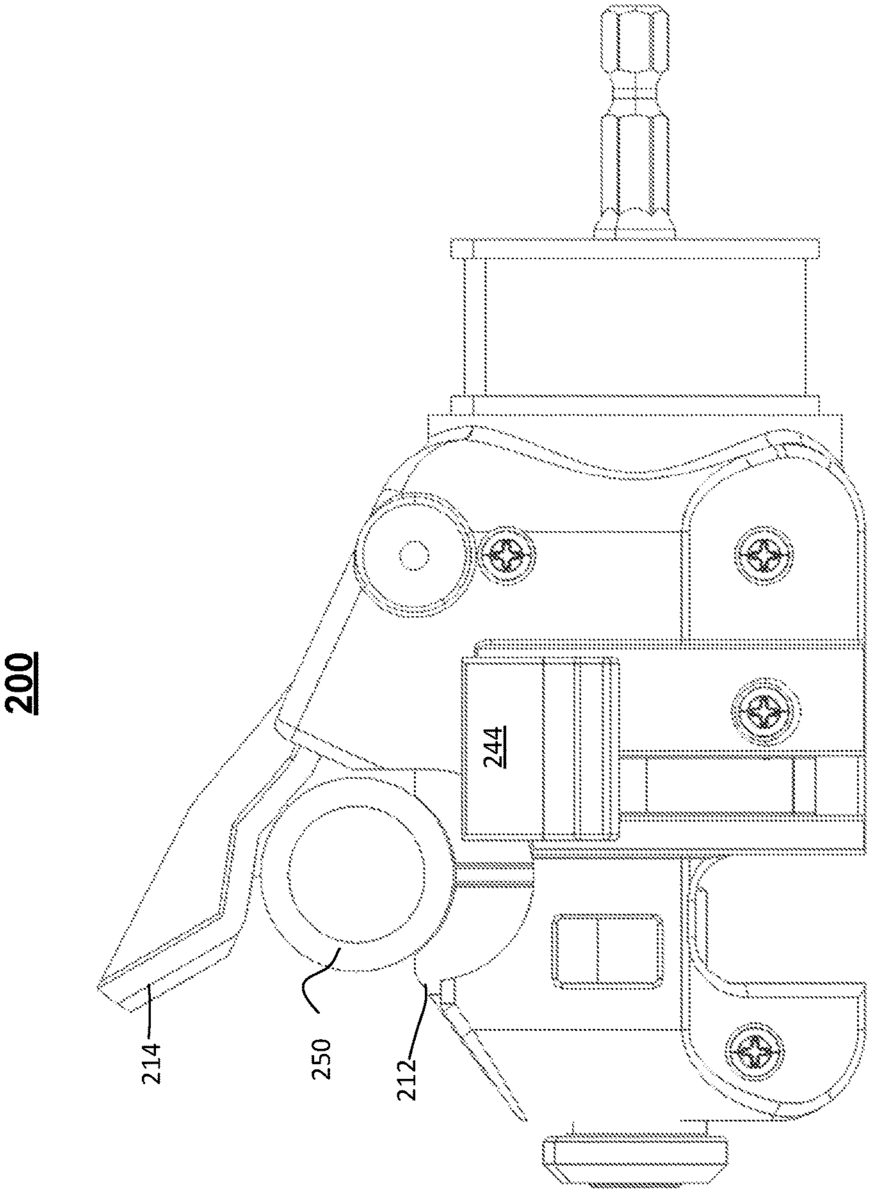
FIG. 2J is a side view of a cable cutting accessory attachment, in accordance with an example.

FIG. 2J depicts cable cutting accessory attachment 200 in a partially engaged configuration. In FIG. 2J, a cable 250 has been inserted into jaw assembly 204. Second jaw 214 may be biased against inner housing member 236, applying a force that grasps cable 250 between first jaw 212 and second jaw 214.

Figure 2K:
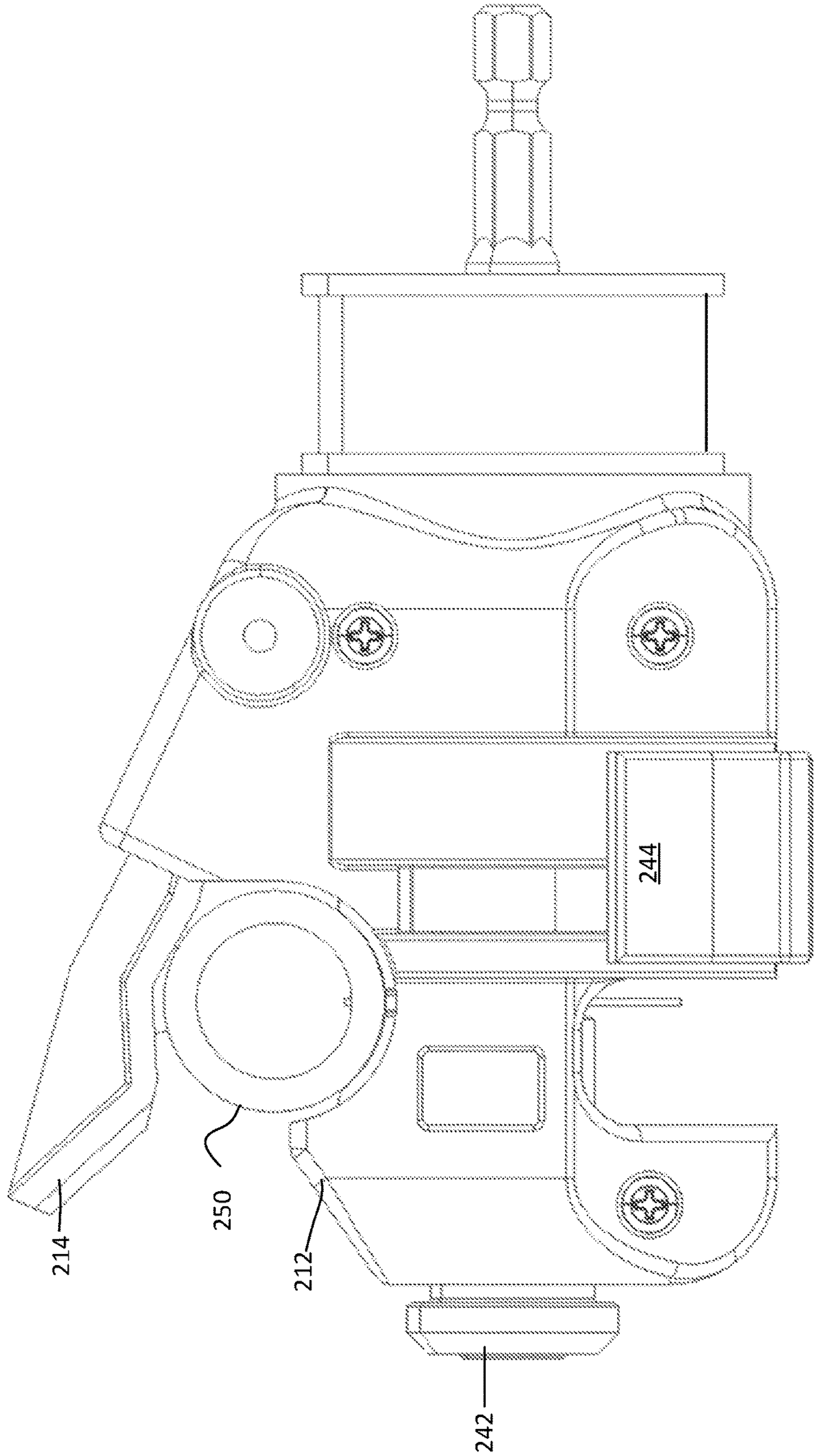
FIG. 2K is a side view of a cable cutting accessory attachment, in accordance with an example.
Figure 2L:
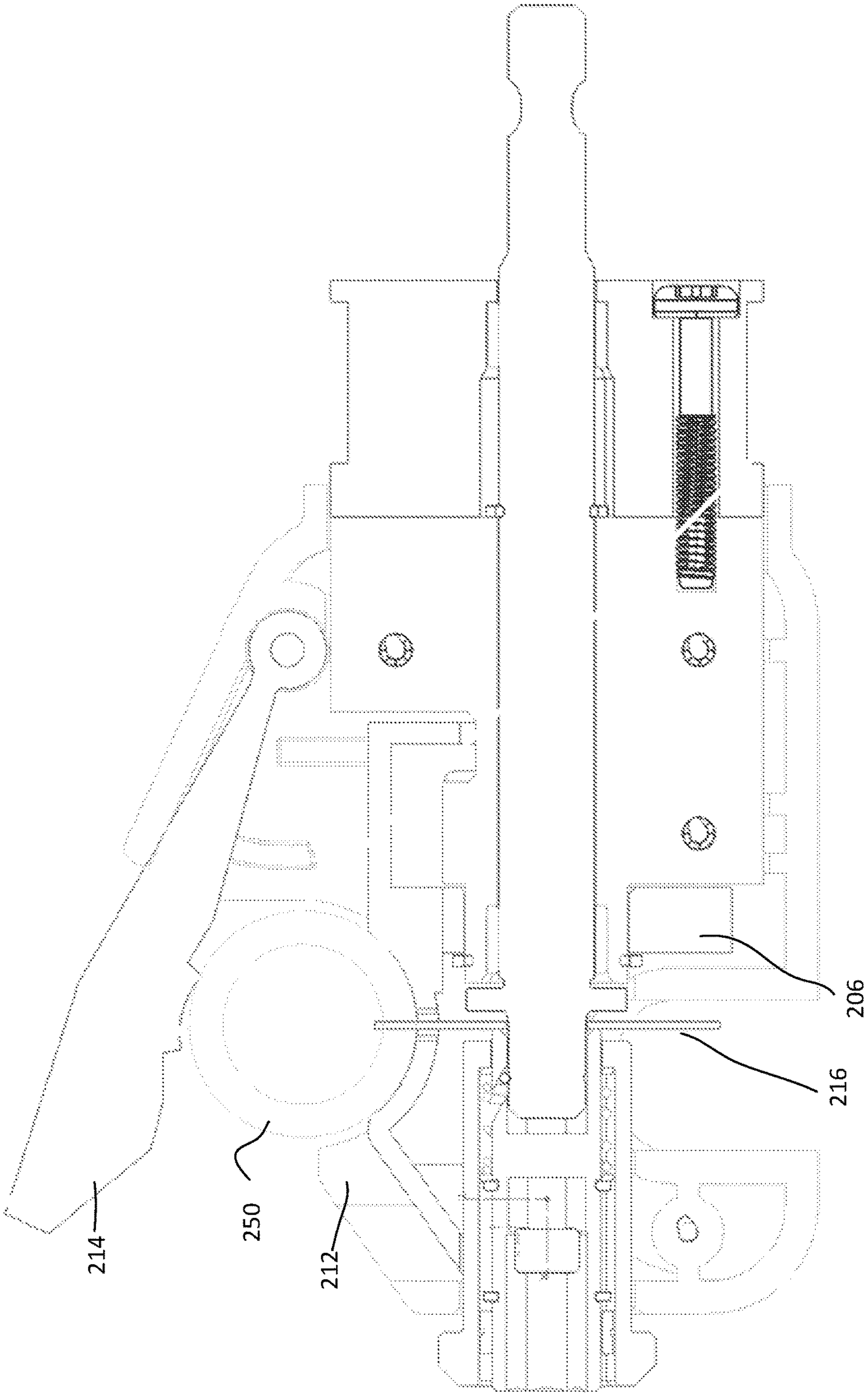
FIG. 2L is a cross-sectional view of a cable cutting accessory attachment, in accordance with an example.
Figure 2M:
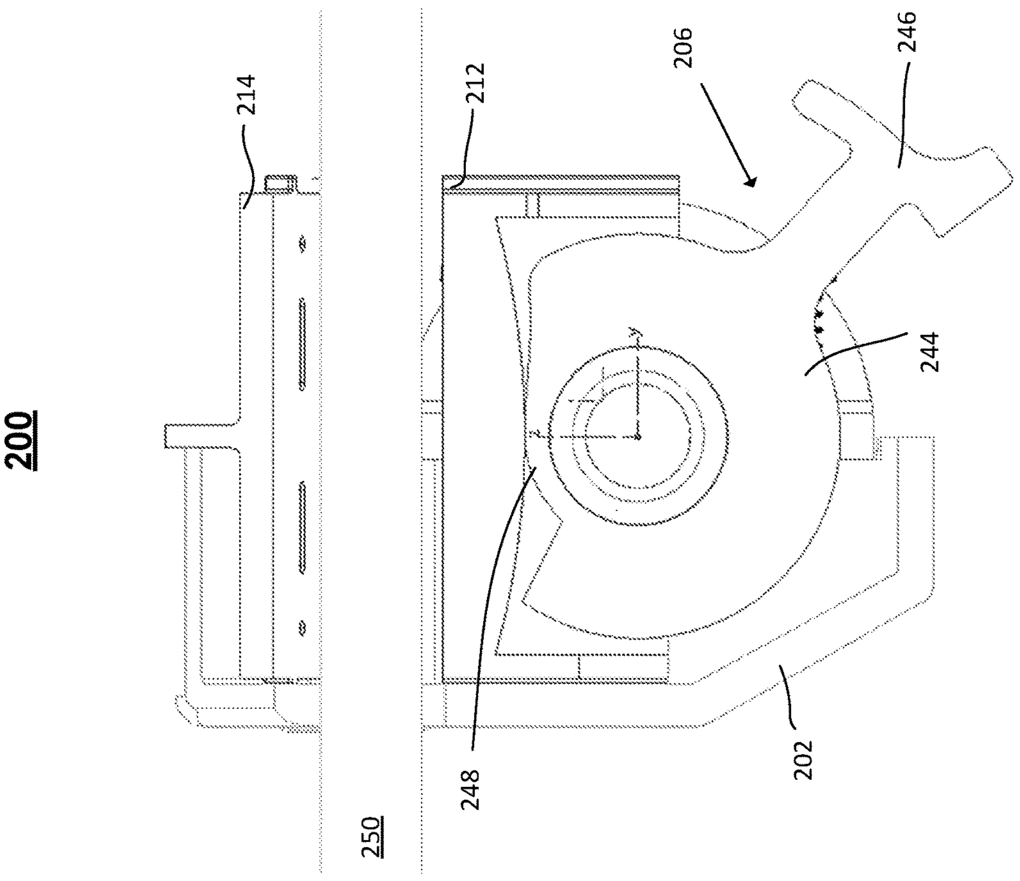
FIG. 2M is a cross-sectional view of a cable cutting accessory attachment, in accordance with an example.

FIGS. 2K-2M depict cable cutting accessory attachment 200 in a fully engaged or cutting configuration. As may be seen in FIG. 2K, lever 244 is rotated down, away from jaw assembly 204, allowing relatively flattened section 248 to contact first jaw 212. First jaw 212 moves towards rotating blade 216, bringing jaw assembly 204 and cable 250 with it. The user may operate power-driven tool 102 to rotate rotating blade 216. Eventually the movement of first jaw 212 allows some portion of rotating blade 216 to pass through slit 230 and contact a jacket of cable 250. In FIG. 2K, a small portion of rotating blade 216 may be seen passing through the jacket of cable 250.

Example lever 206 is not intended to be limiting, however. In examples, lever 244 may be in any position with regards to base curved section 246 and relatively flattened section 248. In examples, lever 206 may take any form operable to change a position of first jaw 212 with respect to rotating blade 216 when rotated.

By providing jaw assembly 204, which may grasp a cable quickly and securely in a first step and move jaw assembly 204 towards rotating blade 216 to cut a cable in a second step, it is possible to provide an easier to operate, quicker to execute, more precise cable-cutting tool.

In examples, a coupling end 240 of rotating input shaft 210 may be configured to receive a bit holder assembly 242. Bit holder assembly 242, best seen in FIGS. 2E and 2G, may have a configuration the same as or similar to any of a myriad of known chuck, bit holder, or collet designs, including but not limited to the designs shown, for example, as described in U.S. Pat. Nos. 9,156,147; 8,622,601; 7,086,813; 6,929,266; 6,261,035, and 5,988,957, each of which is incorporated by reference. By including coupling end 240 configured to couple to bit holder assembly 242 it may be possible for cable cutting accessory attachment 200 to be a multipurpose tool. A user may use cable cutting accessory attachment 200 to cut the jacket of a cable, and then quickly reconfigure cable cutting accessory attachment 200 with a screw bit to drive a screw.

Figure 3A:
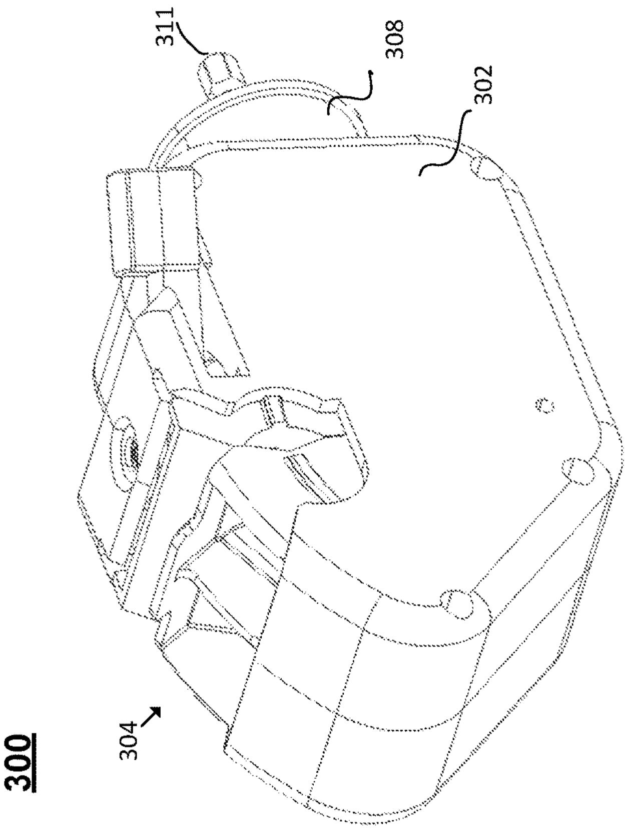
FIG. 3A is a perspective view of a cable cutting accessory attachment, in accordance with an example.
Figure 3B:
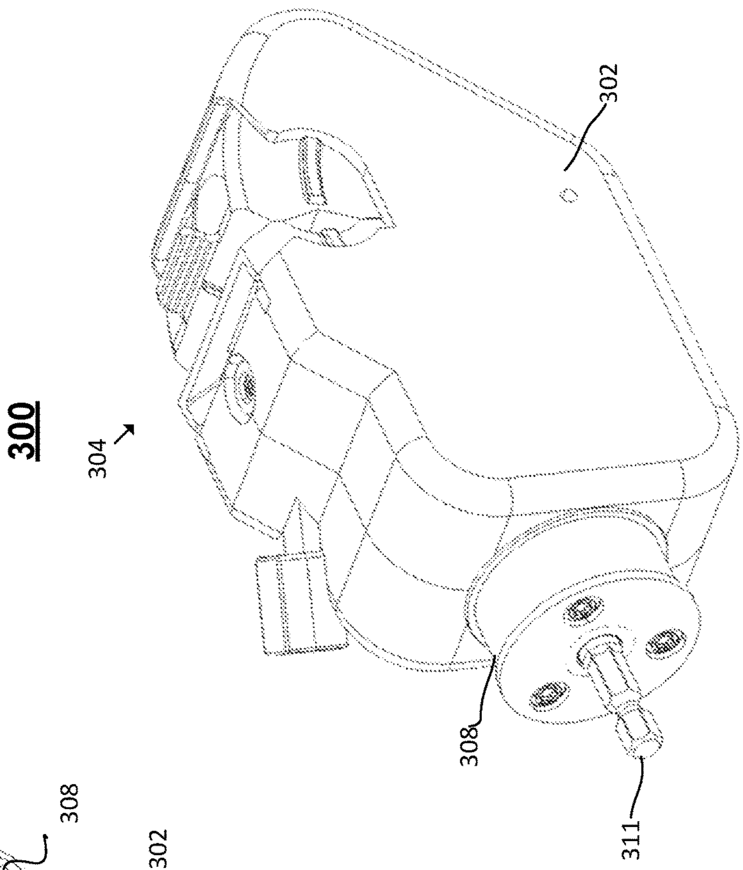
FIG. 3B is a perspective view of a cable cutting accessory attachment, in accordance with an example.
Figure 3C:
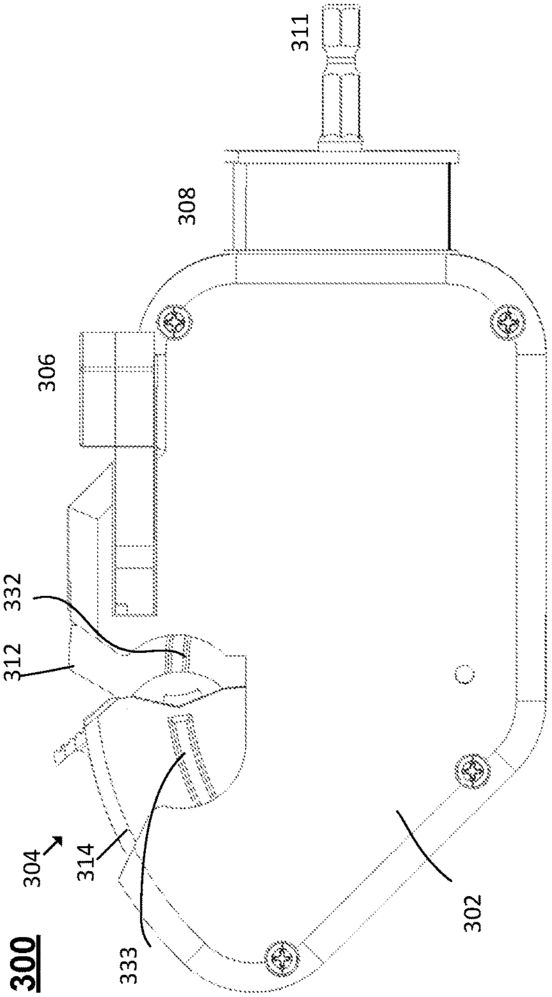
FIG. 3C is a side view of a cable cutting accessory attachment, in accordance with an example.
Figure 3D:
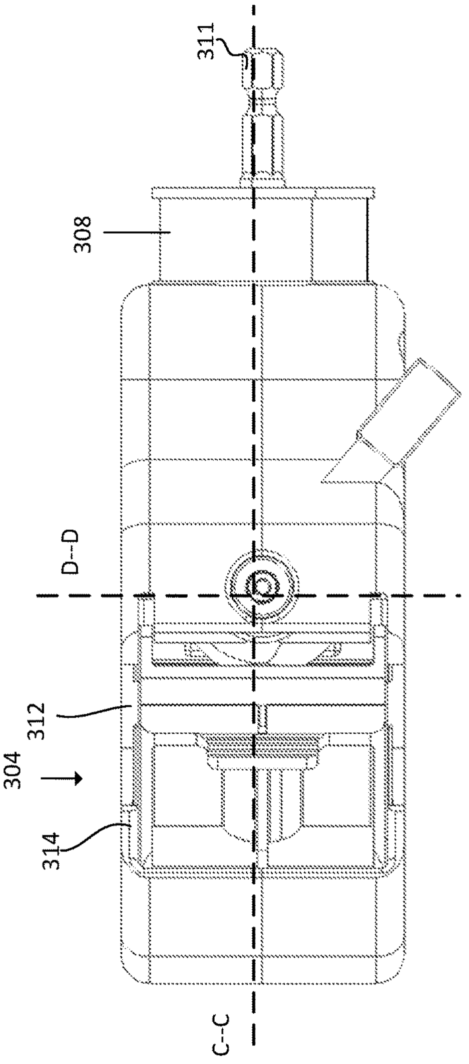
FIG. 3D is a top view of a cable cutting accessory attachment, in accordance with an example.
Figure 3E:
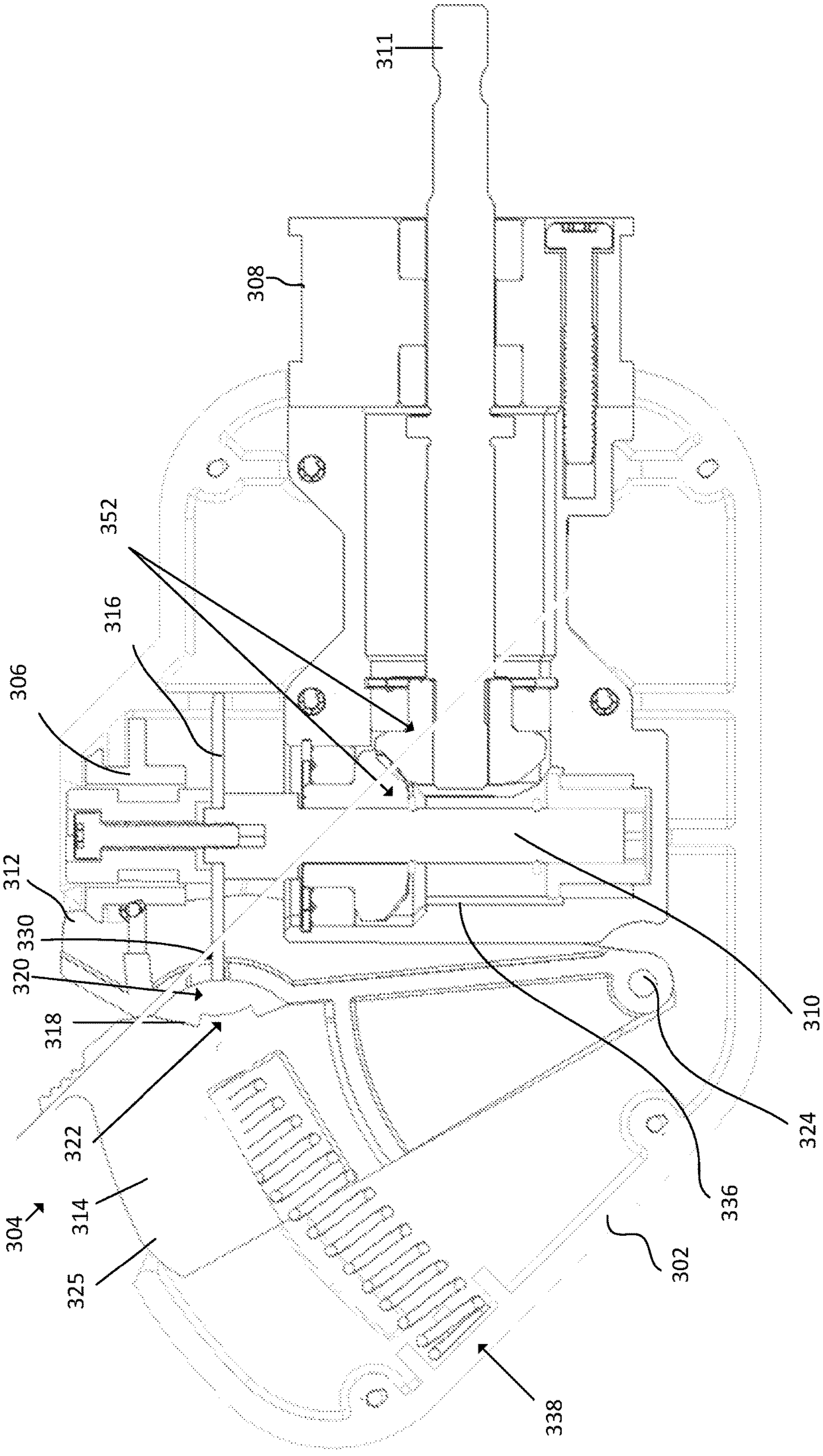
FIG. 3E is a cross-sectional view of a cable cutting accessory attachment, in accordance with an example.
Figure 3F:
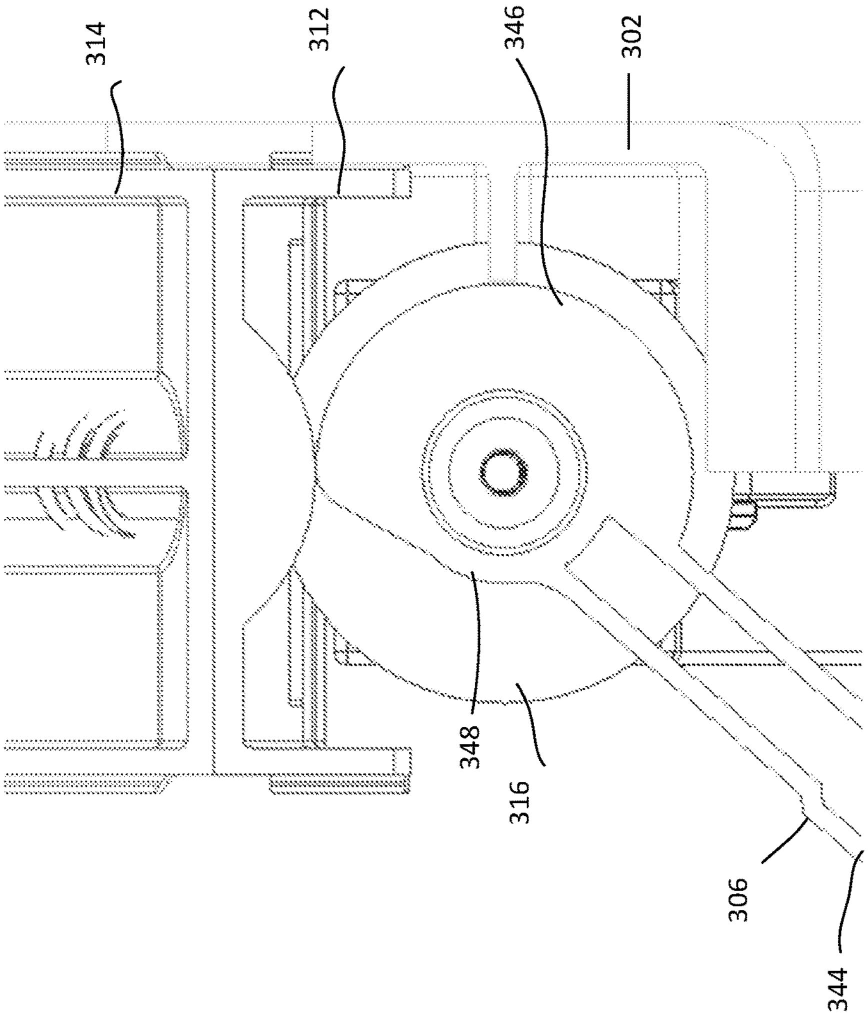
FIG. 3F is a cross-sectional view of a cable cutting accessory attachment, in accordance with an example.

FIGS. 3A to 3L depict views of another example implementation of a cable cutting accessory attachment 300. FIGS. 3A to 3F depict cable cutting accessory attachment 300 in a disengaged position, in accordance with an example. FIGS. 3A and 3B depict a perspective view of a cable cutting accessory attachment 300, FIG. 3C depicts a side view, FIG. 3D depicts a top view, 3E depicts a cross-sectional view along C-C noted in FIG. 3D, and FIG. 3F depicts a cross-sectional view along D-D noted in FIG. 3D.

Cable cutting accessory attachment 300 includes a housing 302 and a rotating blade 316. In examples, housing 302, and rotating blade 316 may provide similar functionality to that described with respect to cable cutting accessory attachment 200 above.

As may be best seen in the cross-sectional view of FIG. 3E, cable cutting accessory attachment 300 may further include inner housing member 336. In examples, inner housing member 336 may include any of the features described with respect to inner housing member 236. In examples, inner housing member 336 may include at least one additional borehole through which second rotating input shaft 311 may be supported via one or more bearings. Any component described as coupled to housing 302 herein may be coupled to housing 302 via inner housing member 336.

As may best be seen in FIG. 3E, cable cutting accessory attachment 300 includes two rotating input shafts: a first rotating input shaft 310 and a second rotating input shaft 311. Second rotating input shaft 311 may be coupled to power-driven tool 102, and first rotating input shaft 310 may be coupled to rotating blade 316. Second rotating input shaft 311 is oriented perpendicular to first rotating input shaft 310. In examples, plurality of gears 352 (i.e., bevel gears) may couple first rotating input shaft 310 to second rotating input shaft 311, translating the rotational rotation of second rotating input shaft 311 90 degrees to turn first rotating input shaft 310.

Cable cutting accessory attachment 300 includes a jaw assembly 304. Like jaw assembly 204, jaw assembly 304 also includes a first jaw 312 and a second jaw 314. In examples, first jaw 312 and second jaw 314 may both pivot from a single pivot point, for example from a pivot point 324. In examples, pivot point 324 may be coupled to housing 302. Opening jaw assembly 304 to insert cable 250 may therefore comprise rotating an opening end 325 of second jaw 314 away from first jaw 312. In examples, second jaw 314 may include a small finger grip to allow the user to easily rotate it away from first jaw 312.

In examples, jaw assembly 304 may also include an indented portion 318, an indented portion 320, and an alignment tab 322, similar to those described above with regards to cable cutting accessory attachment 200 above.

In examples, first jaw 312 may include a slit 330 configured for a portion of rotating blade 316 to pass through. As may be best seen in FIG. 3C, first jaw 312 may include one or more rails 332 to facilitate the smooth, precise movement of 312 towards and away from rotating blade 316. Housing 302 may include one or more grooves shaped and sized to allow alignment tab 322 to glide within them. One or more rails 332 may provide for a semi-circular track to facilitate the pivoting motion of example first jaw 312.

In examples, second jaw 314 may also include one or more rails 333 to guide its movement. One or more rails 333 may also provide for a semi-circular track to facilitate smooth pivoting motion of second jaw 314.

In examples, second jaw 314 may be biased in a closed position against first jaw 312, thereby biasing jaw assembly 304 into a closed position. In an example, as may be best seen in FIG. 3E, cable cutting accessory attachment 300 may include a biasing member 338 positioned between housing 302 and second jaw 314. Biasing member 338 may be operable to bias second jaw 314 towards rotating saw 316. Biasing member 338 may also be operable to bias jaw assembly 304 in a closed position. In examples, housing 302 may include a small resilient member seat extending inside an inner surface of housing 302 (for example, an annular lip) and second jaw 314 may include a biasing member seat (for example, a borehole) to keep both ends of biasing member 338 secure within cable cutting accessory attachment 300. Biasing member 338 may help keep cable 250 secure within jaw assembly 304. In examples, the biasing member may comprise a compression spring. In other examples, the biasing member may comprise an extension spring, a leaf spring, a torsion spring, or another type of elastic member.

In examples, biasing member 338 may help bias jaw assembly 304 towards rotating blade 316 and a cam lever 306 may displace first jaw 312 away from rotating blade 316 until the user desires to make a cut. In examples, cam lever 306 be coupled to housing 302 via inner housing member 336 and may operate much like lever 206 described above. For example, cam lever 306 may also include a lever 344, a base curved section 346, and a relatively flattened section 348 (best seen in FIG. 3F) that may operate similar to lever 244, base curved section 246, and relatively flattened section 248, described above.

Cable cutting accessory attachment 300 may also include a neck 308 to facilitate coupling to collar 112 of brace assembly 106, similar to that described with respect to neck 208 above.

Figure 3G:
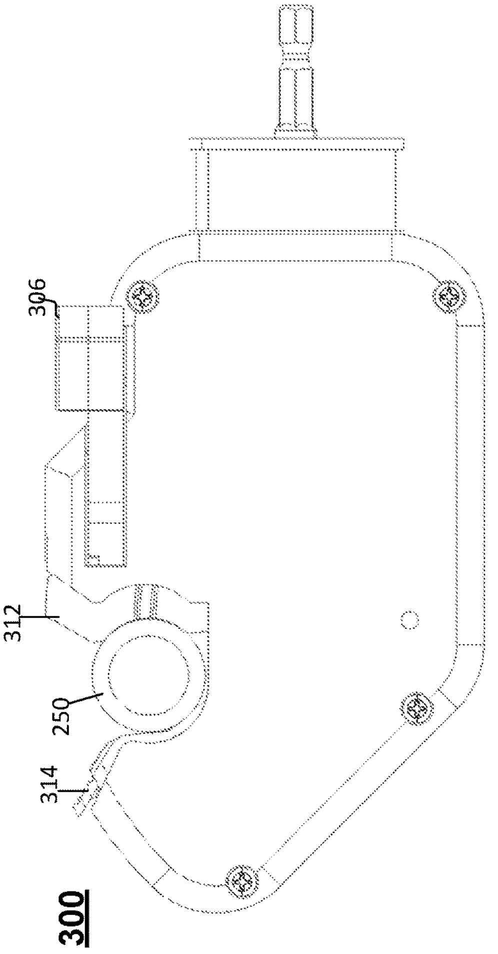
FIG. 3G is a side view of a cable cutting accessory attachment, in accordance with an example.
Figure 3H:
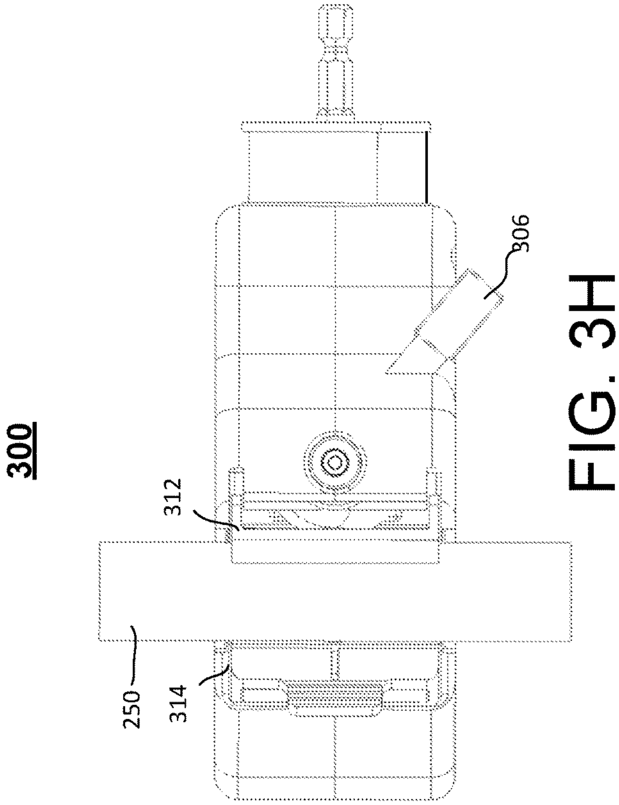
FIG. 3H is a top view of a cable cutting accessory attachment, in accordance with an example.

FIGS. 3G and 3H depict views of cable cutting accessory attachment 300 in a partially engaged position, with a cable held within jaw assembly 304. FIG. 3G depicts a side view and FIG. 3H depicts a top view. In the partially engaged position, cable cutting accessory attachment 300 grasps cable 250, but cam lever 306 is in a position to keep cable 250 away from rotating blade 316.

Figure 3I:
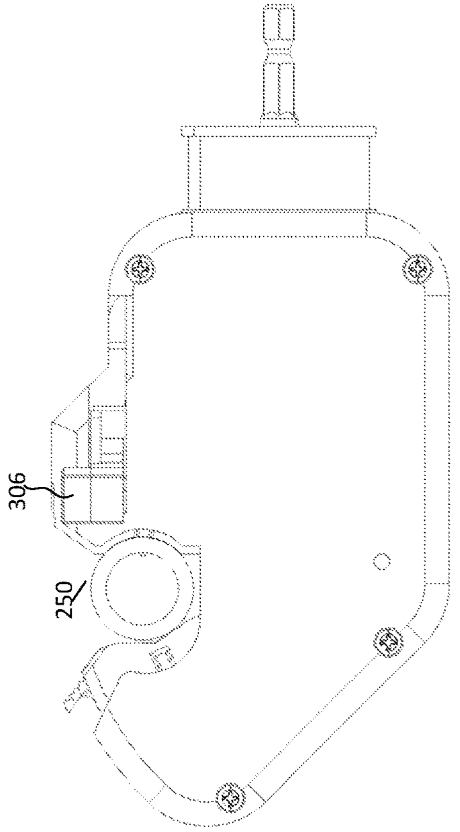
FIG. 3I is a side view of a cable cutting accessory attachment, in accordance with an example.
Figure 3J:
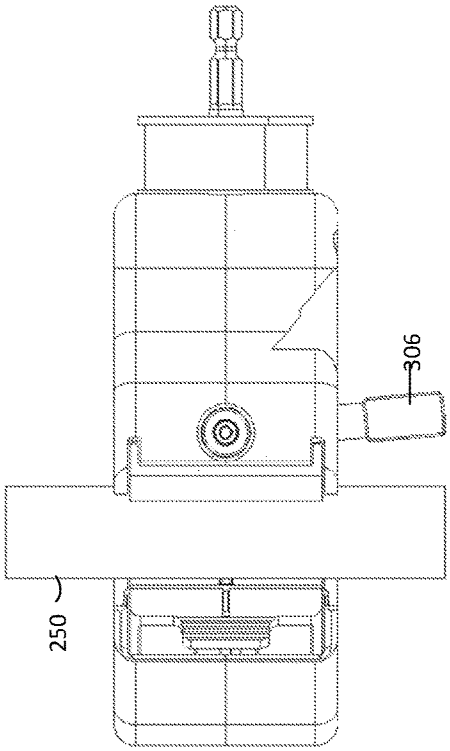
FIG. 3J is a top view of a cable cutting accessory attachment, in accordance with an example.
Figure 3K:
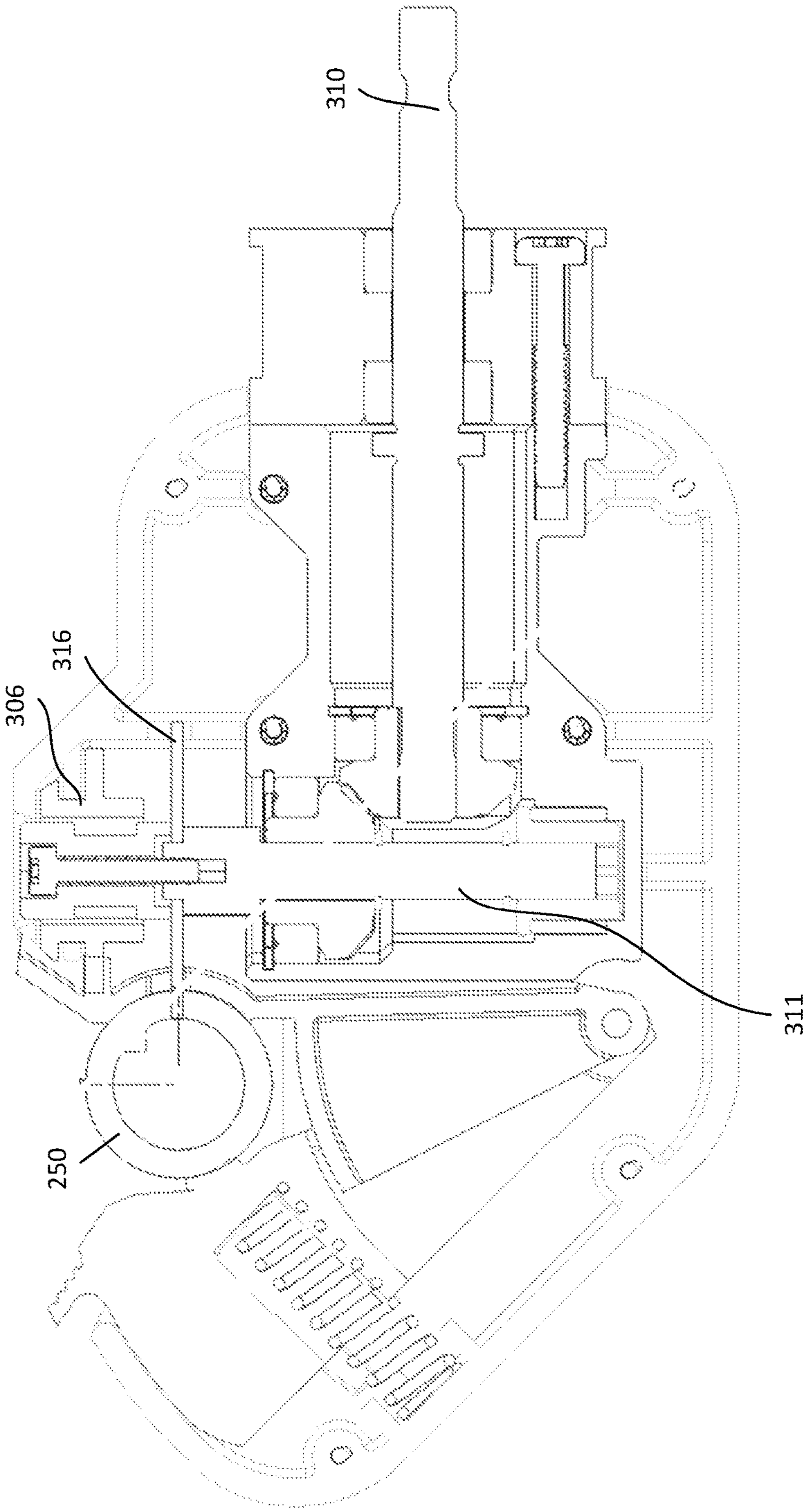
FIG. 3K is a cross-sectional view of a cable cutting accessory attachment, in accordance with an example.
Figure 3L:
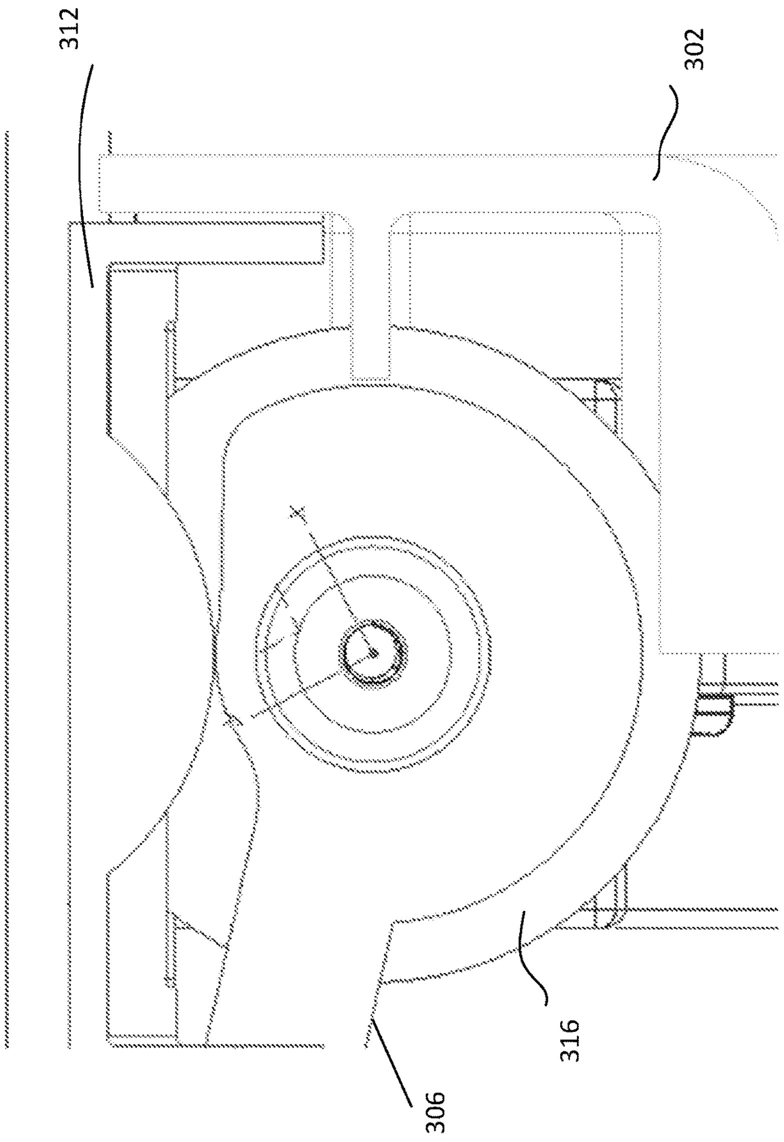
FIG. 3L is a cross-sectional view of a cable cutting accessory attachment, in accordance with an example.

FIGS. 3I to 3L depict views of cable cutting accessory attachment 300 in a fully engaged or cutting configuration. FIG. 3I depicts a side view, FIG. 3J depicts a top view, 3K depicts a cross-sectional view along C-C noted in FIG. 3D, and FIG. 3L depicts a cross-sectional view along D-D noted in FIG. 3D. In the fully engaged configuration, cable cutting accessory attachment 300 grasps cable 250 in jaw assembly 304, and cam lever 306 is rotated to allow cable 250 to move towards rotating blade 316, thereby making a cut to the corrugated rib of jacket of cable 250.

The user who operates cable cutting accessory attachment 200 or 300 to make a cut will also need to operate the motor of power-driven tool 102. In examples, the user may insert cable 250 into jaw assembly 204 or 304, operate the motor of power-driven tool 102, and subsequently move cable 250 towards rotating blade 316 to make a cut. Alternatively, the user may move cable 250 towards rotating blade 316 and then operate the motor of power-driven tool 102.

In examples, the cable cutting device may further include a housing positioned around the rotating input shaft and the rotating blade. For example, the cable cutting device may include housing 202 or housing 302, as described above.

In examples, the cable cutting device may further include a jaw assembly coupled to the housing. For example, the cable cutting device may include any of the features of jaw assembly 204 or 304, as described above. The jaw assembly of the cable cutting device may further be biased to maintain a closed position, as described above.

In examples, a second jaw of the cable cutting device may be connected to the housing via a pivot point. For example, the second jaw may be connected to a housing similar to that described with regards to second jaw 214 or 314. pivot point 224 or 324, and housing 202 or 302 described above.

In examples, the first jaw of the cable cutting device may move towards and away from the rotating blade via a track and groove system (i.e., track engaged with a groove). For example, the first jaw of the cable cutting device may include one or more rails 232 or 332, as described above.

In examples, the first jaw and the second jaw of the cable cutting device may be operable to move independently with respect to one another. For example, the first jaw and the second jaw may include any of the features described above with respect to first jaw 212 and second jaw 214 or first jaw 312 and second jaw 314.

In examples, the cable cutting device may further include a cam lever coupled to the housing operable to move the first jaw away from the rotating blade. The cam lever may include any of the features described with respect to lever 206 or 306 above.

In examples, the cable cutting device may further include a resilient member coupled between the housing and the second jaw, the resilient member being operable to bias the second jaw towards the rotating blade. For example, the cable cutting device may include a resilient member similar to extension resilient member 238 or biasing member 338 described above.

Figure 4:
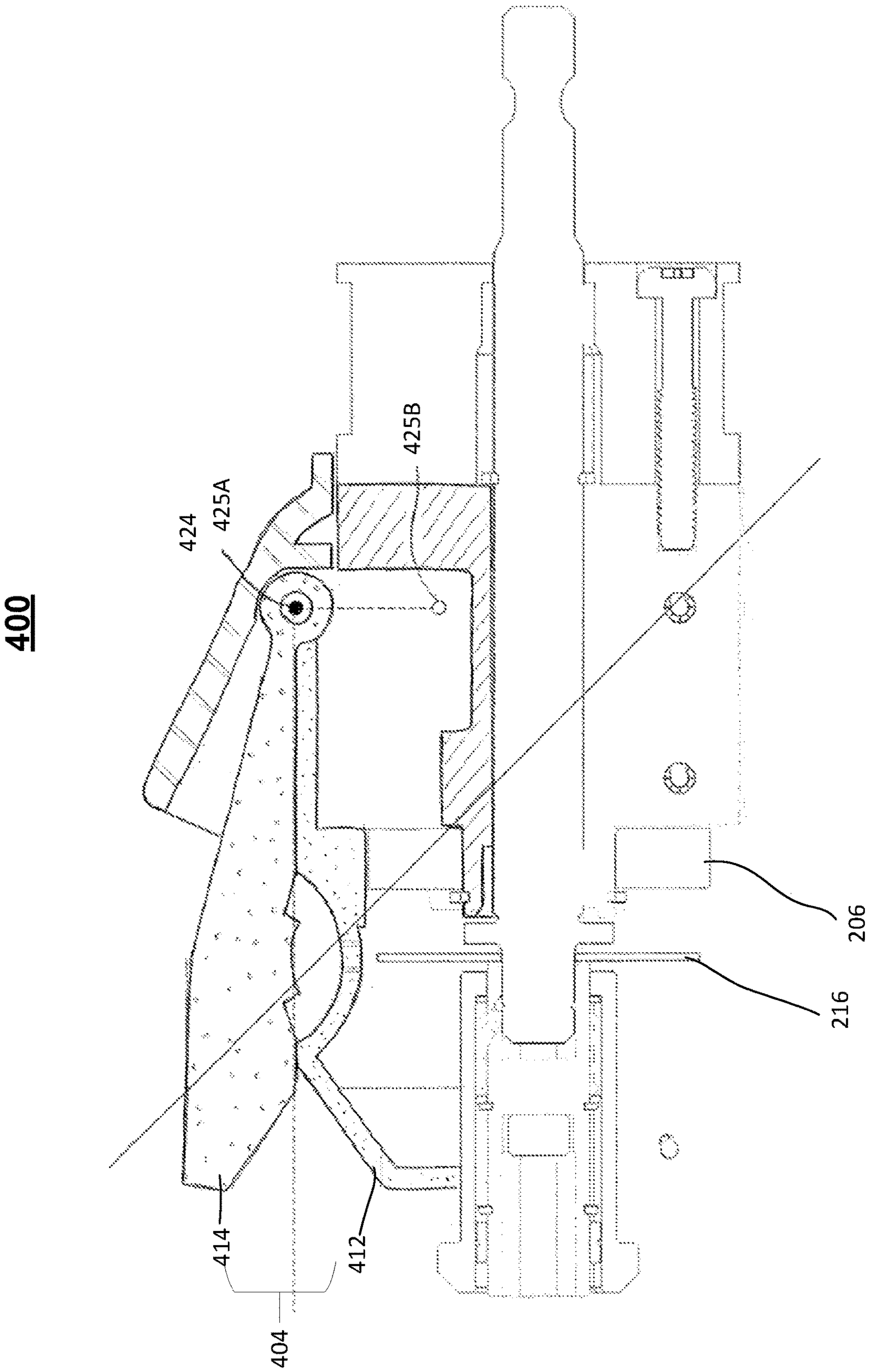
FIG. 4 is a cross-sectional view of a cable cutting accessory attachment, in accordance with an example.

FIG. 4 depicts views of a further implementation of a cable cutting accessory attachment 400 in a disengaged position, in accordance with an example. Cable cutting accessory attachment 400 is similar to cable cutting accessory attachment 200, but instead of including pivot point 224, which is fixed with respect to housing 202 and/or inner housing member 236, accessory attachment 400 includes a pivot point 424 that translates with respect to rotating blade 216. Accessory attachment 400 includes a first jaw 412 and a second jaw 414. Second jaw 414 rotates about a pivot point 424 which is fixed to first jaw 412. Because pivot point 424 is fixed to first jaw 412, it translates towards and away from rotating blade 216 when, for example, lever 206 is used to move first jaw 412 towards and away from rotating blade 216. As may be seen in FIG. 4, pivot point 424 may move between position 425A when first jaw 412 is positioned away from rotating blade 216 and position 425B when first jaw 412 is positioned towards rotating blade 216.

Figure 5A:
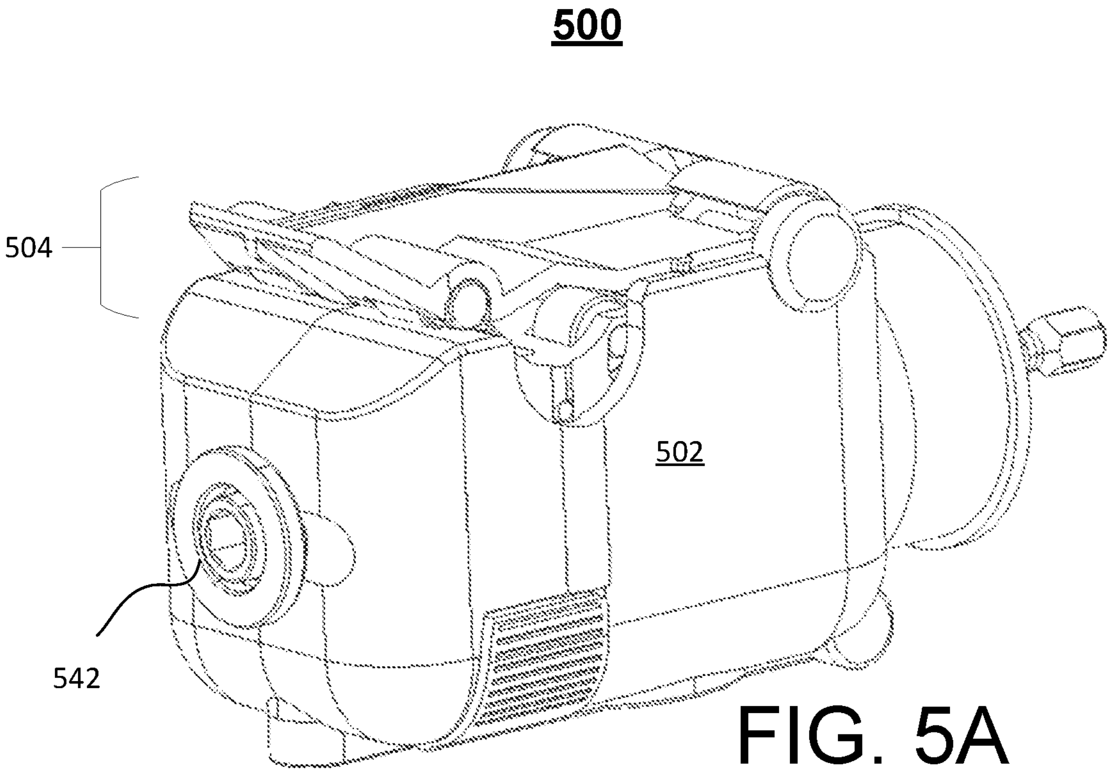
FIG. 5A is a perspective view of a cable cutting accessory attachment, in accordance with an example.
Figure 5B:
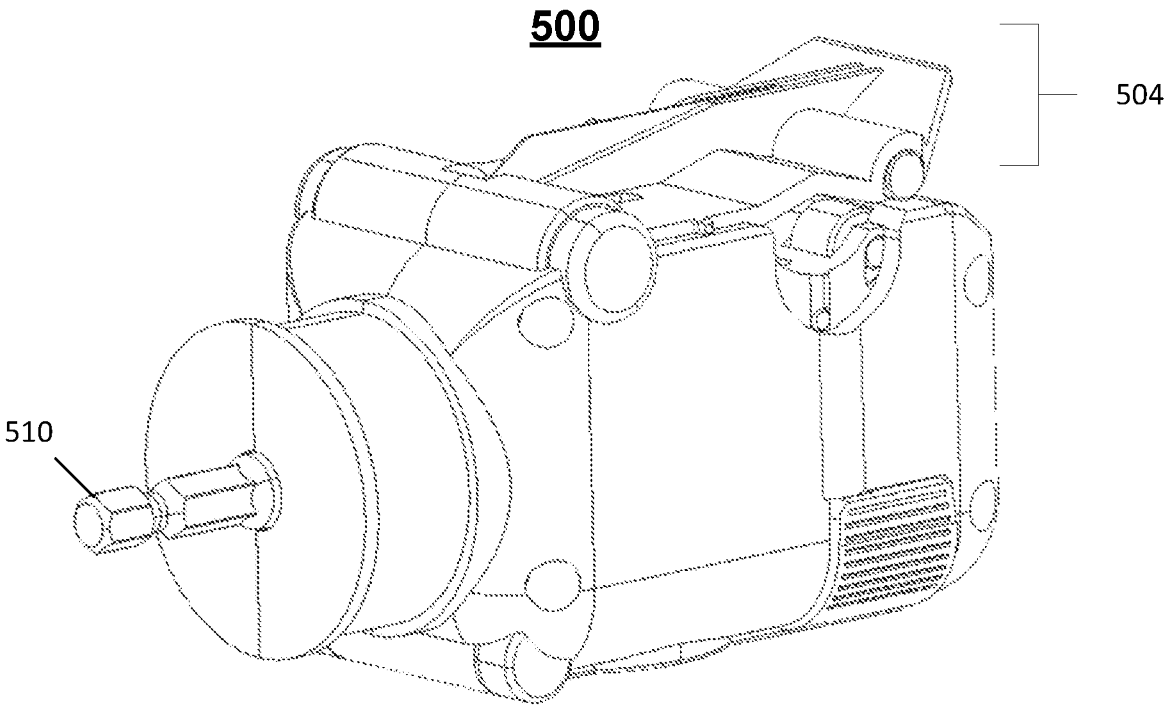
FIG. 5B is a perspective view of a cable cutting accessory attachment, in accordance with an example.
Figure 5C:
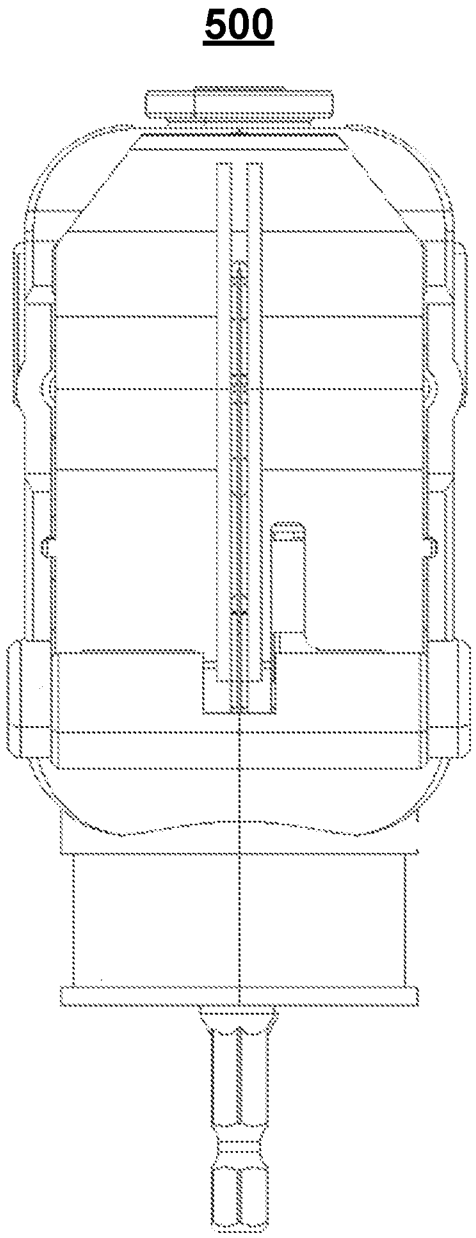
FIG. 5C is a top view of a cable cutting accessory attachment, in accordance with an example.
Figure 5D:
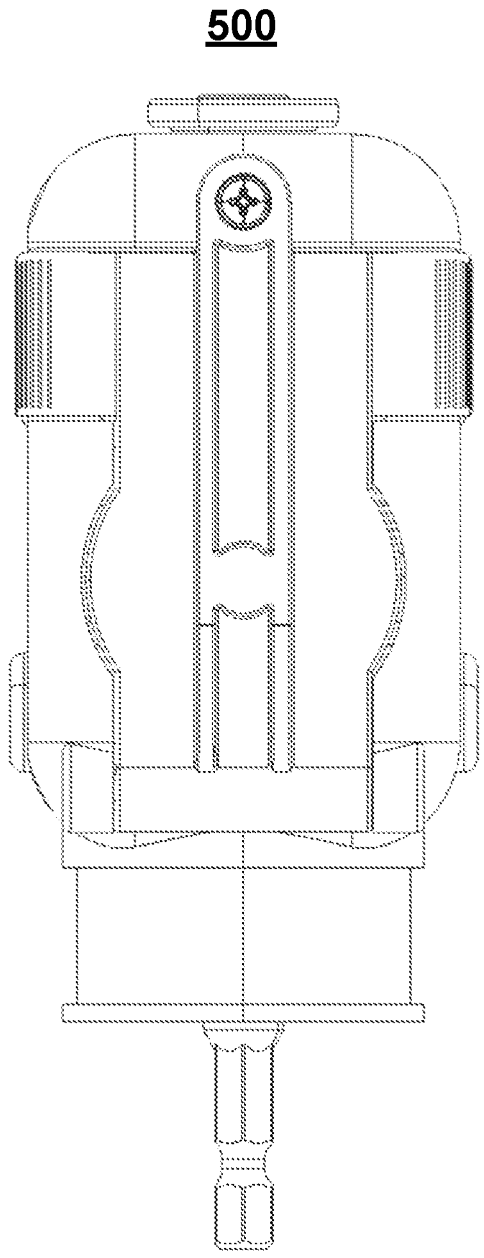
FIG. 5D is a bottom view of a cable cutting accessory attachment, in accordance with an example.
Figure 5E:
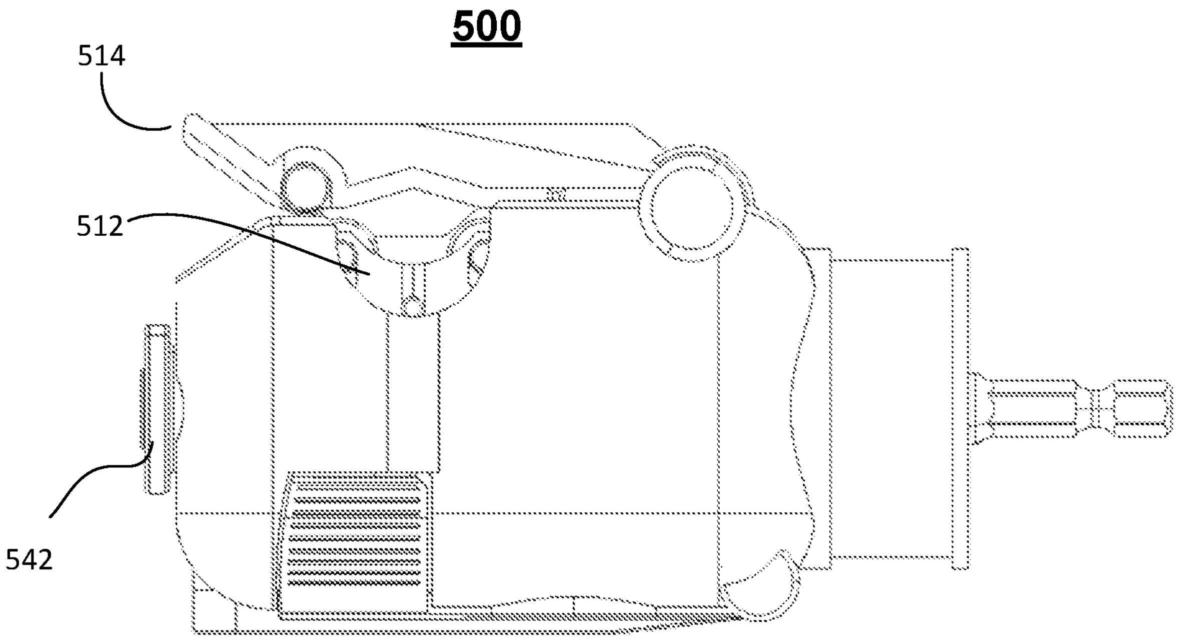
FIG. 5E is a left view of a cable cutting accessory attachment, in accordance with an example.
Figure 5F:
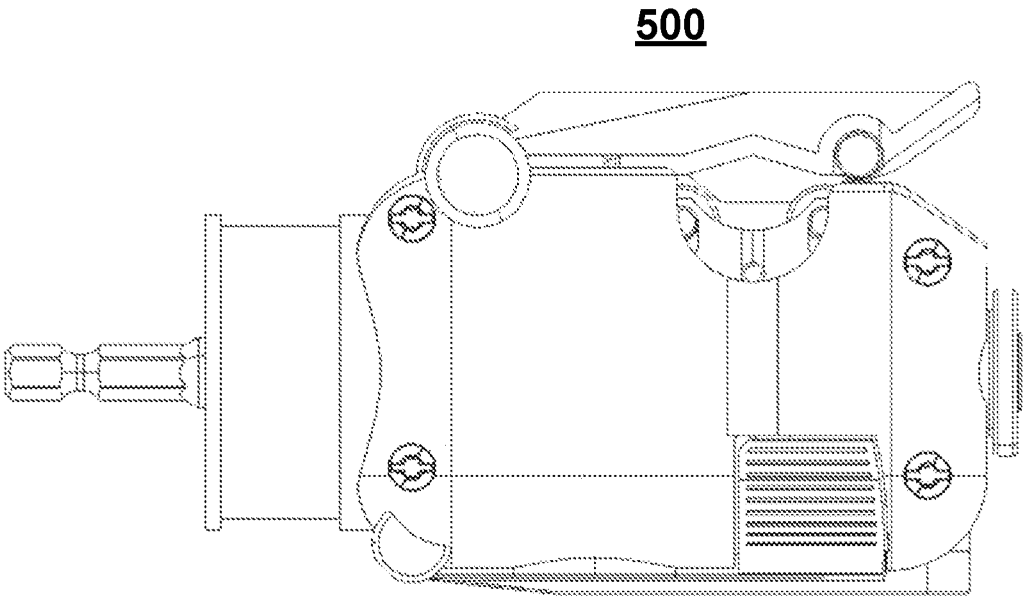
FIG. 5F is a right view of a cable cutting accessory attachment, in accordance with an example.
Figure 5G:
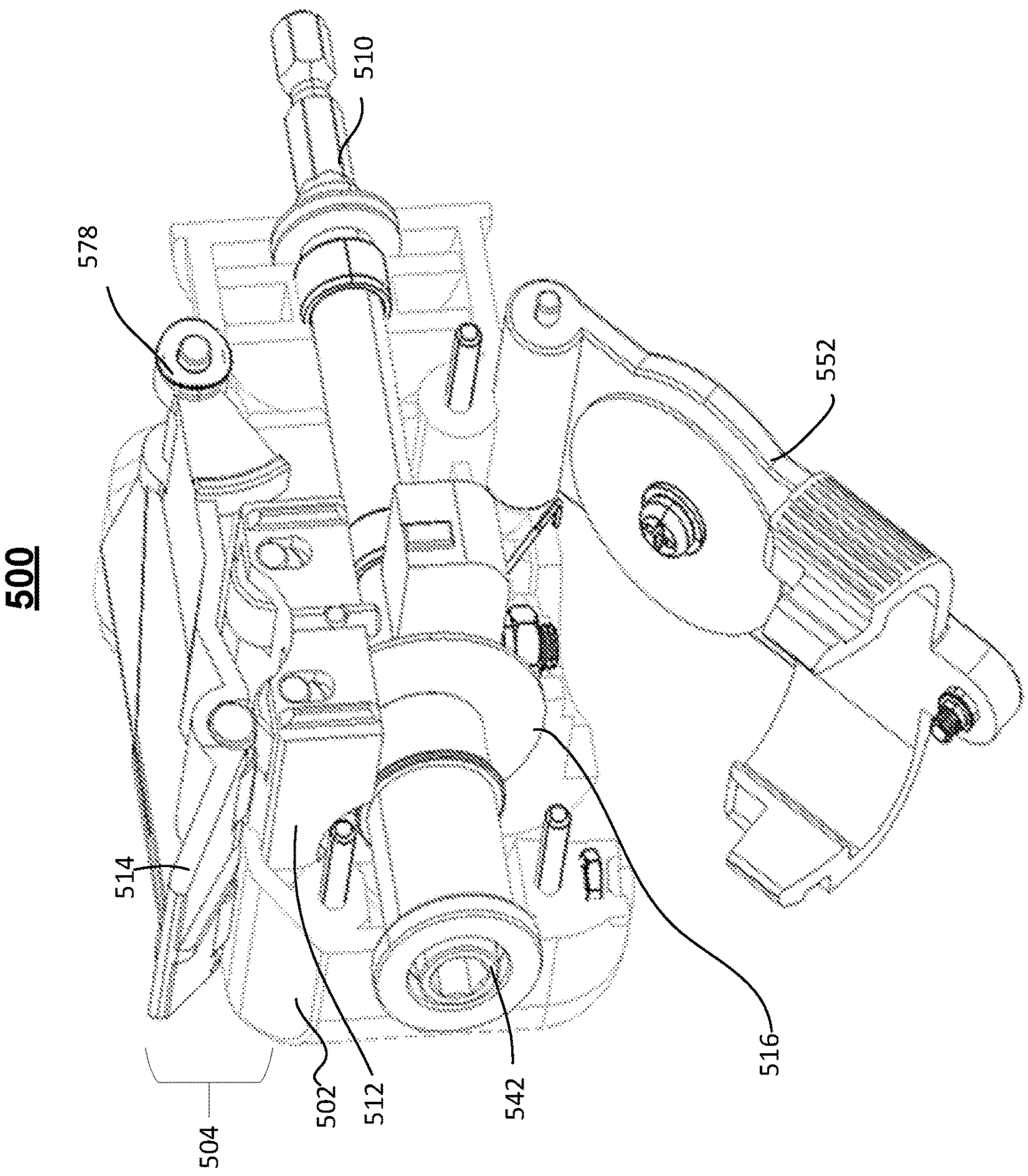
FIG. 5G is a perspective view of a cable cutting accessory attachment with a portion of a housing removed, in accordance with an example.

FIGS. 5A-5EE depict a further example implementation of a cable cutting accessory attachment 500. FIGS. 5A and 5B are perspective views of a cable cutting accessory attachment, in accordance with an example. FIG. 5C is a top view, FIG. 5D is a bottom view, FIG. 5E is a left view, and FIG. 5F is a right view of a cable cutting accessory attachment, in accordance with an example. FIG. 5G is a perspective view of a cable cutting accessory attachment with a portion of a housing removed, in accordance with an example.

Turning to FIG. 5G, it may be seen that accessory attachment 500 includes a housing 502, a rotating input shaft 510 at least partially received in the housing 502, and a rotating blade 516 coupled to the rotating input shaft 510. Each element of accessory attachment 500 may include any combination of features described with respect similarly named elements of accessory attachment 200, accessory attachment 300, or accessory attachment 400, in addition to the additional features described below.

Accessory attachment 500 may include a jaw assembly 504. Jaw assembly 504 may include any combination of the features described with regards to jaw assembly 204, jaw assembly 304, or jaw assembly 404 above. Jaw assembly 504 includes a first jaw 512 and a second jaw 514, which may each be independently coupled to the housing 502. The jaw assembly 504 is operable to grasp a cable 250 (best seen in FIGS. 5I, 5J, 5L, and 5M) and movable towards the rotating blade 516, allowing the rotating blade 516 to pass through an opening, such as a slit 530, a slot, or a groove, in the first jaw 512. FIG. 5DD depicts first jaw 512 with rotating blade 516 retracted into housing member 568 and not passing through slit 530 to contact cable 250. FIG. 5EE depicts first jaw 512 with rotating blade 516 passing through slit 530. When rotating blade 516 passes through slit 530, it may cut a cable 250 held in accessory attachment 500, as described above.

Jaw assembly 504 may be biased to maintain a closed position. For example, a first spring force on first jaw 512 may bias first jaw 512 towards second jaw 514 and a second spring force on second jaw 514 may bias second jaw 514 towards the rotating blade 516 (example spring forces further described below). This may help grasp cable 250 securely while displacing jaw assembly 504 further towards rotating blade 516 when making a cut. In examples, the second spring force may be greater than the first spring force. This may allow for the accessory attachment 500 to both grasp cable 250 and apply pressure against the rotating blade 516. Therefore, when the motor is turned on and rotating blade 516 begins to spin, cable 250 will be in a position to be cut.

Figure 5H:
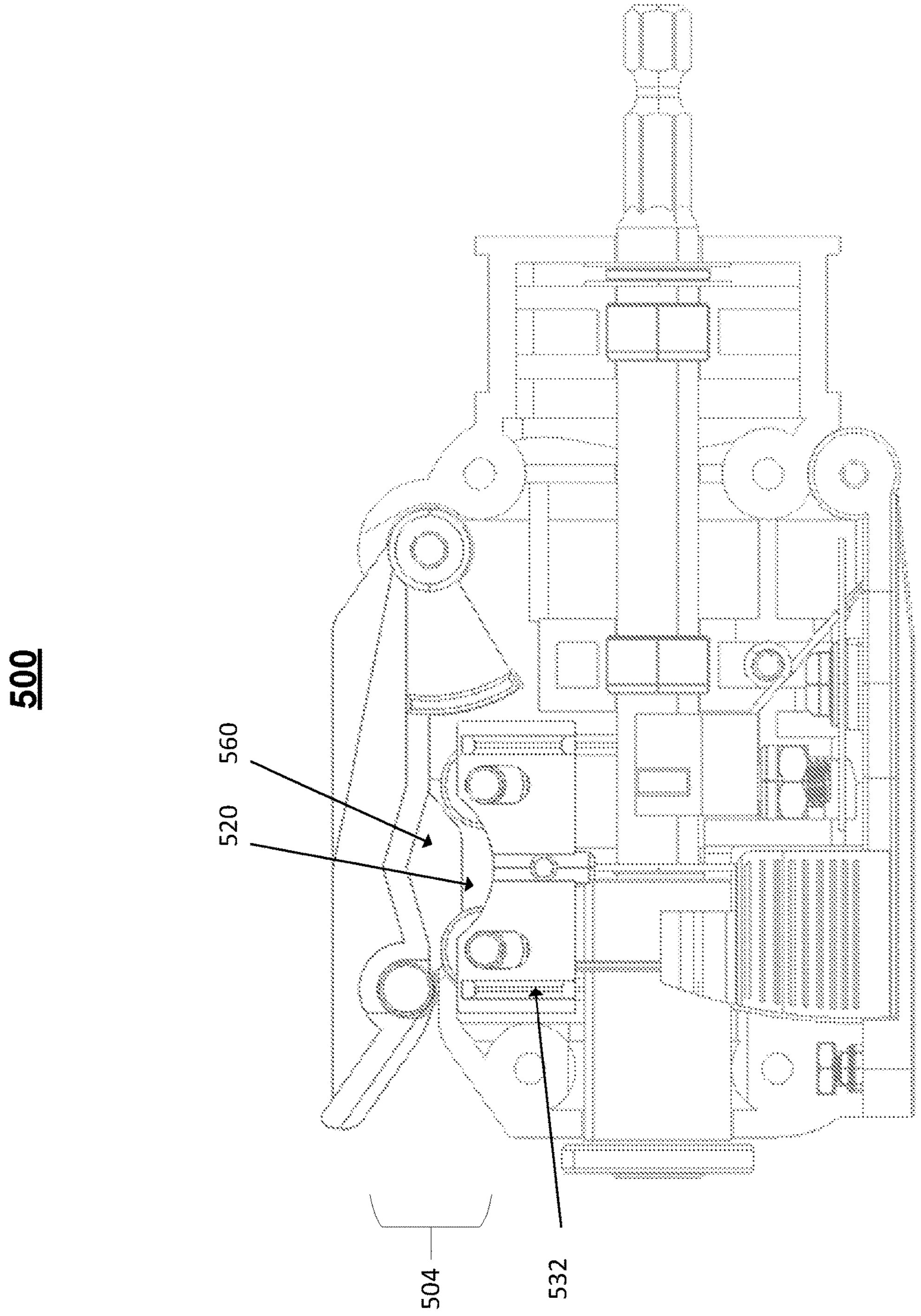
FIG. 5H is a left view of a cable cutting accessory attachment with a portion of a housing removed, in accordance with an example.
Figure 5I:
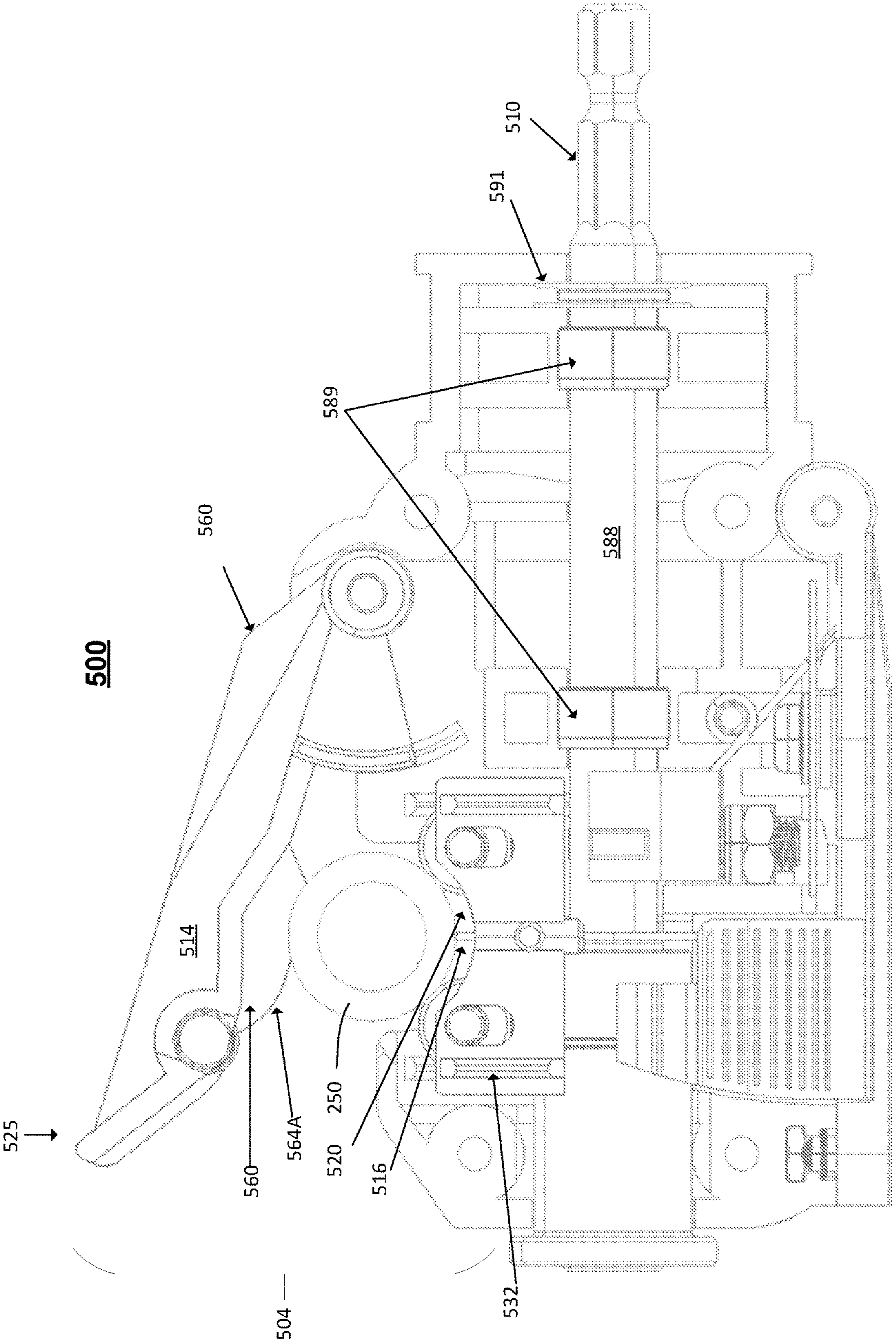
FIG. 5I is a left view of a cable cutting accessory attachment with a portion of a housing removed, in accordance with an example.
Figure 5J:
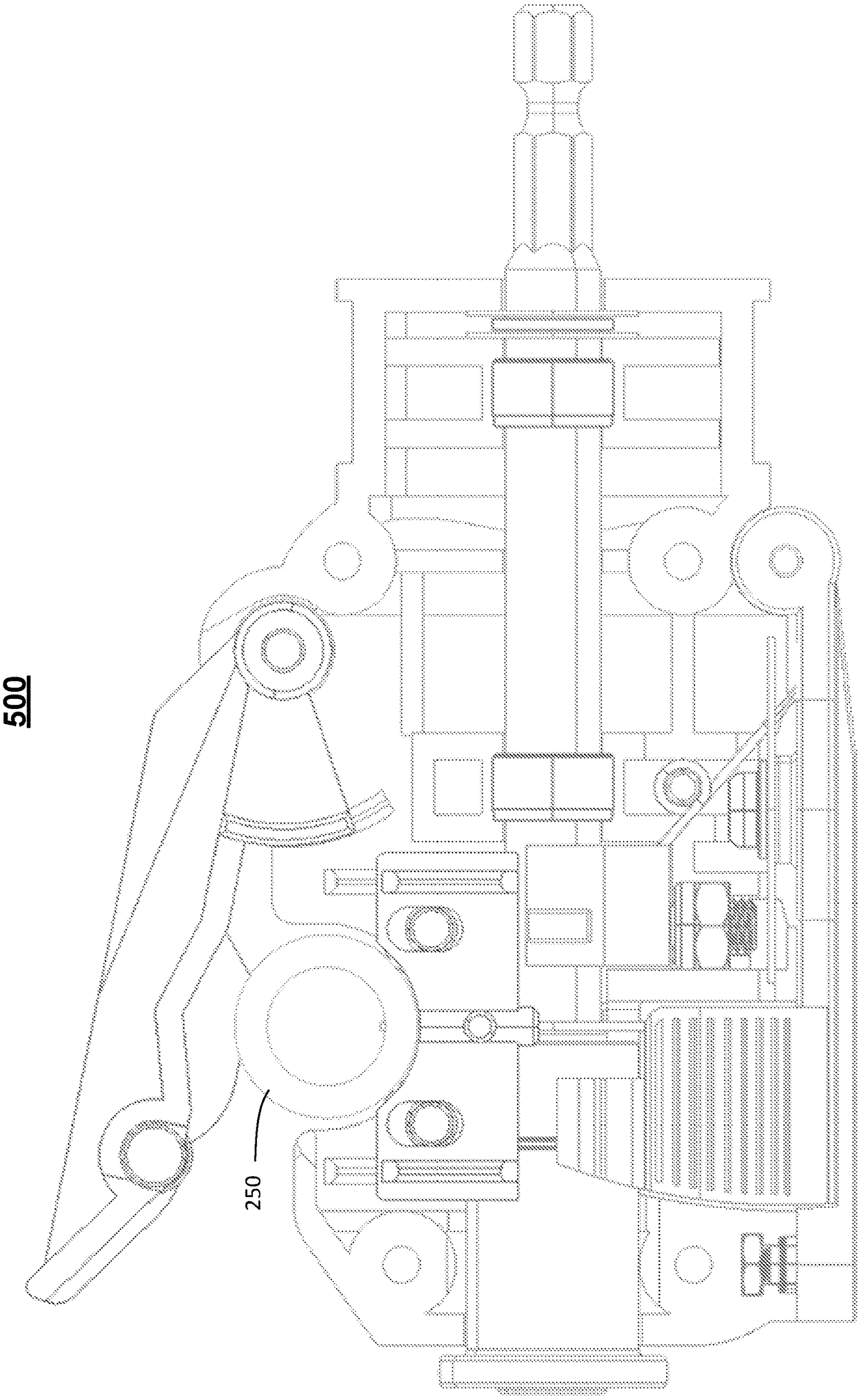
FIG. 5J is a left view of a cable cutting accessory attachment with a portion of a housing removed, in accordance with an example.
Figure 5K:
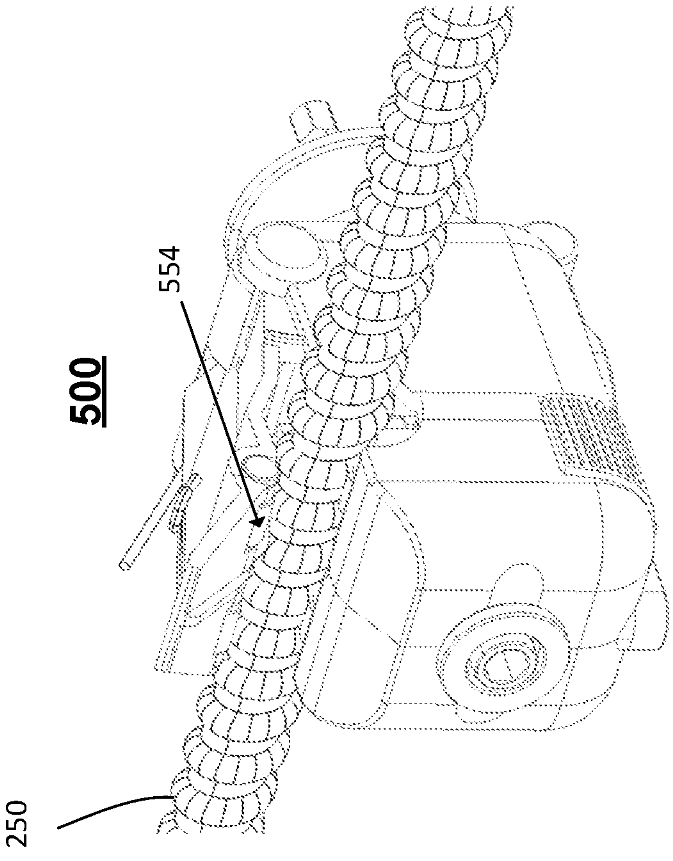
FIG. 5K is a perspective view of a cable cutting accessory attachment with a cable, in accordance with an example.
Figure 5L:
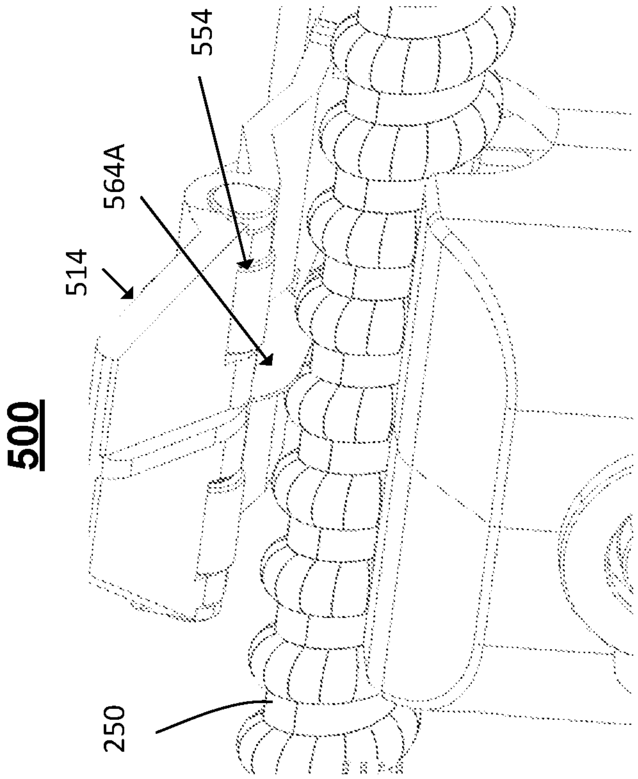
FIG. 5L is a perspective view of a cable cutting accessory attachment with a cable, in accordance with an example.
Figure 5M:
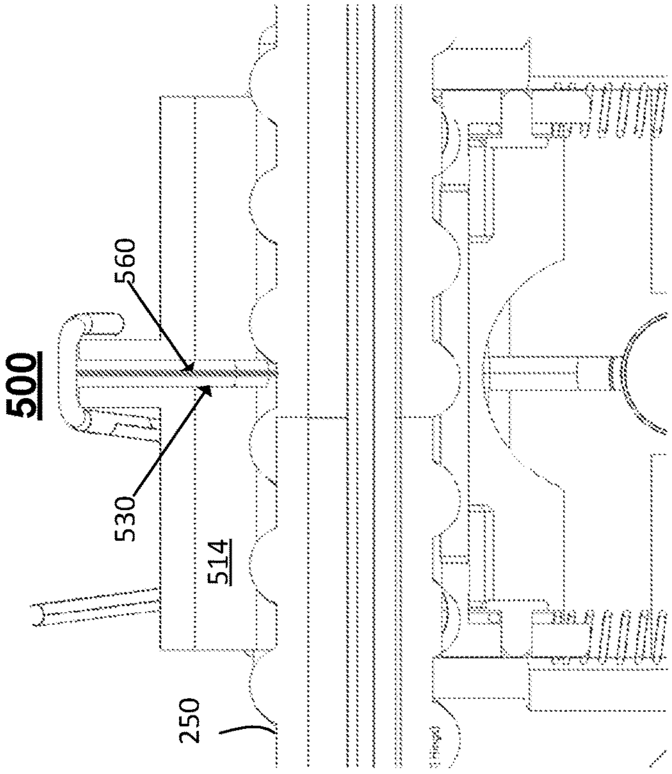
FIG. 5M is a cross sectional view of a cable cutting accessory attachment with a cable, in accordance with an example.
Figure 5N:
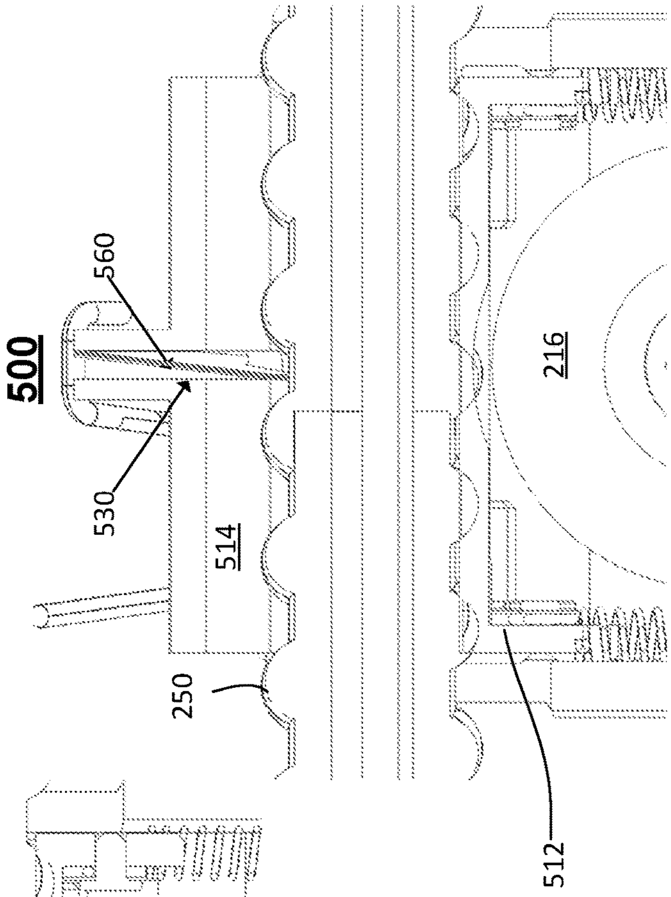
FIG. 5N is a cross sectional view of a cable cutting accessory attachment with a cable, in accordance with an example.

FIGS. 5H, 5I, and 5J provide left views of a cable cutting accessory attachment with a portion of a housing removed, in accordance with an example. FIG. 5H depicts accessory attachment 500 in a disengaged position with no cable 250 held within accessory attachment 500, FIG. 5I depicts accessory attachment 500 in a partially disengaged position, with cable 250 inserted into jaw assembly 504 but not making a cut yet, and FIG. 5J depicts accessory attachment 500 in a fully engaged position where cable 250 is either being cut or has already been cut. FIGS. 5K and 5L provide perspective views of a cable cutting accessory attachment with a cable, and FIGS. 5M and 5N provide cross-sectional views of a cable cutting accessory attachment with a cable, in accordance with an example.

Turning to FIGS. 5H, 5I, and 5J, it may be seen that, like second jaw 214 and second jaw 314, second jaw 514 may include an indented portion 520, a lock member 560, and one or more rails 532.

Figure 5O:
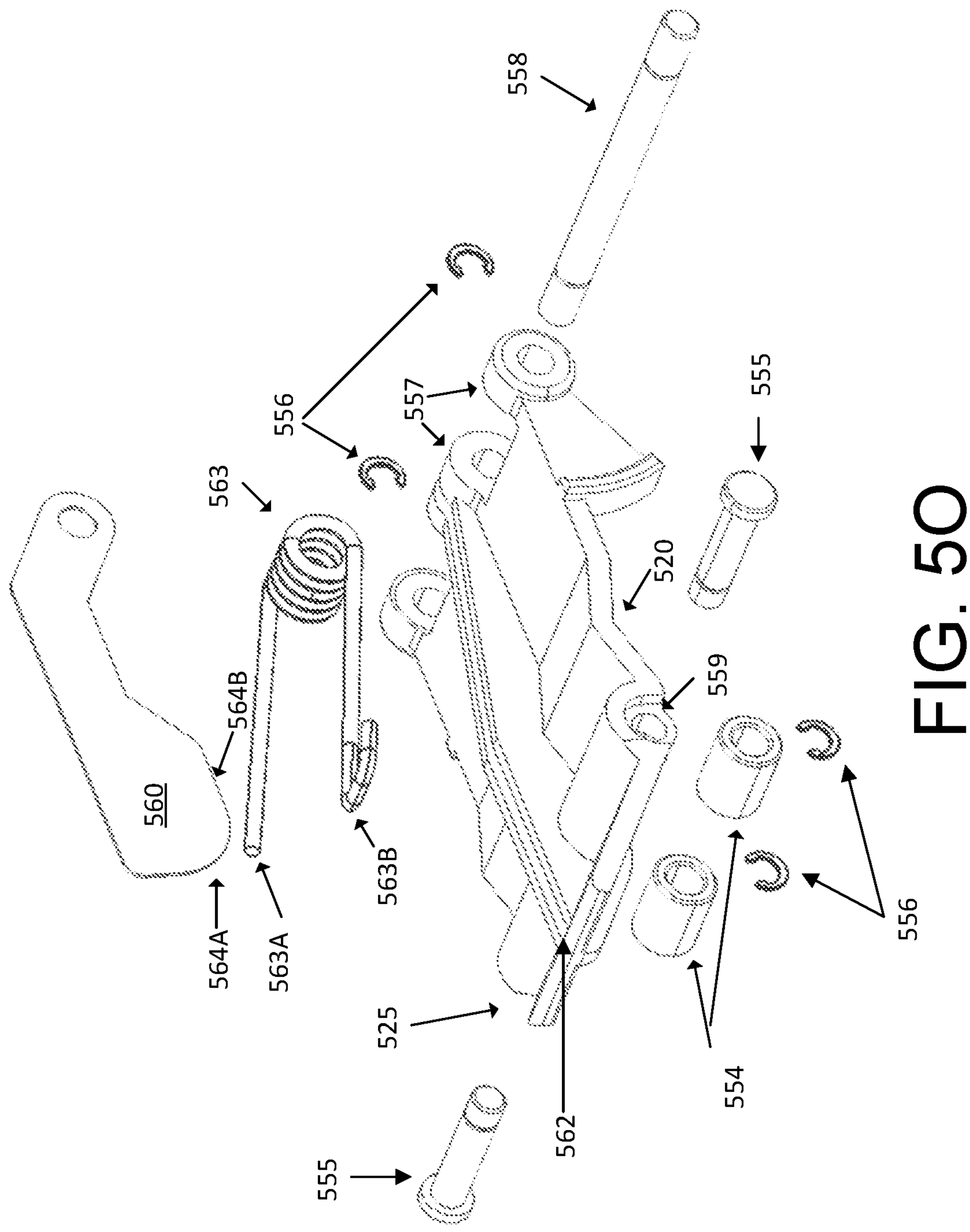
FIG. 5O is an exploded diagram of a second jaw, in accordance with an example.

Second jaw 514 may further include a include an upper jaw roller 554 adjacent to opening end 525, however. FIG. 5O provides an exploded diagram of a second jaw 514. As may be seen in the figure, upper jaw roller 554 may be coupled to second jaw 514 via a head pin 555 which may pass through an aperture 559 and be secured with a retaining ring 556 that fits onto head pin 555. In examples, second jaw 514 may include two instances of upper jaw roller 554. In examples, the upper jaw roller 554 may help support and guide cable 250 into jaw assembly 504.

It may be further seen in FIG. 5O that second jaw 514 may pivot via a pin 558 that passes through one or more apertures 557 positioned at a pivotable end of second jaw 514. Pin 558 may also pass through one or more apertures in housing 502 to secure second jaw 514 to housing 502.

In examples, pin 558 may provide a surface to secure one or more springs, for example torsion spring 563 depicted in FIG. 5O, within accessory attachment 500. Torsion spring 563 may include a first end 563A that pushes up on housing 502 (not pictured) and a second end 563B that pushes down on second jaw 514. In examples, second end 563B may further include a hook end operable to seat around slot 562.

One or more instances of retaining ring 556 may be positioned to secure pin 558 within second jaw 514.

Second jaw 514 may include a lock plate 560 that performs some of the functions of the alignment tabs 222, 322 described above. As may be seen in FIG. 5I, lock plate 560 may be a substantially planar element that is coupled to or positioned within second jaw 514 and oriented perpendicular to a plane including rotating blade 516 and an axis of rotating input shaft 510.

Returning to FIG. 5O, it may be seen that lock plate 560 may be fitted into a slot 562 formed in the body of second jaw 514. Slot 562 may be partially opened on a first jaw-facing side of second jaw 514 to allow a portion of lock plate 560 to protrude through. For example, as may be seen in FIG. 5I, lock plate 560 may include a guide edge 564A, a section of a periphery of the substantially planar lock plate 560 that may come into contact with cable 250 when cable 250 is inserted into and seated within jaw assembly 504.

As may be seen in FIGS. 5I and 5O, guide edge 564A may comprise a ramp portion 564A that may help to guide cable 250 into and out of jaw assembly 504 and/or a seat portion 564B. In examples, ramp portion 564A may include a curve oriented to transition cable 250 from opening end 525 of second jaw 514 to be seated in indented portion 520. For example, FIGS. 5K and 5L further depict possible states of seating cable 250 into jaw assembly 504. In FIG. K, cable 250 is being moved substantially horizontally into jaw assembly 504 and has come into contact with upper jaw roller 554. Upper jaw roller 554 may help make seating cable 250 into jaw assembly 504 easier. In FIG. 5L, cable 250 has been pushed by a user beyond upper jaw roller 554 and move downwards in a substantially vertical direction so that it now is in contact with ramp portion 564A. When ramp portion 564A makes contact with cable 250, it causes second jaw 514 to rotate, opening jaw assembly 504 to allow cable 250 to be moved therein. Seat portion 564B allows for proper alignment and retainment of cable 250 for cutting within jaw assembly 504.

In examples, seat portion 564B may include a flatter portion configured to secure cable 250, potentially along an area between two ridges exterior to cable 250, against an indented portion 520 of first jaw 512.

In an example, lock plate 560 may be secured within slot 562 by second end 563B of torsion spring 563. For example, the hook end of second end 563B may seat around slot 562, securing lock plate 560 inside of slot 562.

FIG. 5M depicts a cross-sectional view of accessory attachment 500 with cable 250 being seated into jaw assembly 504, and FIG. 5N depicts accessory attachment 500 with jaw assembly 504 fully clasping cable 250 but not cutting it yet. In FIG. 5M, it may be seen that lock plate 560 is parallel to the sides of slit 530. Due to the spiral nature of the corrugated ridges around the exterior of cable 250, the ridges are not circumferential. Moreover, a user cannot be sure when they insert cable 250 into jaw assembly 504 that slit 530 will land in a space between the ridges. By allowing slit 530 to move or twist when slit 530 engages cable 250, it may allow for better alignment and retention of cable 250 within accessory attachment 500. In FIG. 5N, it may be seen that lock plate 560, which is seated between ridges of cable 250, is tilted with respect to the sides of slit 530. In other words, lock plate 560 may be twistable with respect to second jaw 514 when cable 250 is installed inside the jaw assembly 504.

Figure 5P:
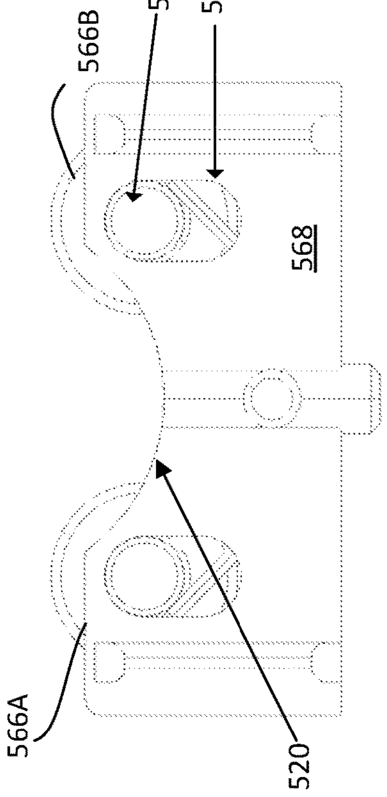
FIG. 5P is a side view of a first jaw, in accordance with an example.
Figure 5Q:
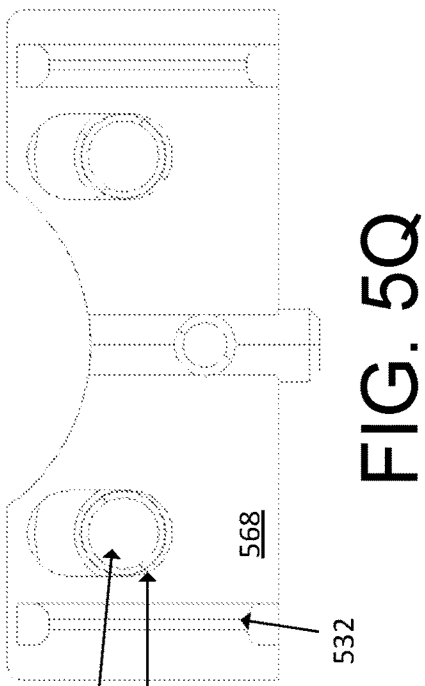
FIG. 5Q is a side view of a first jaw, in accordance with an example.
Figure 5R:
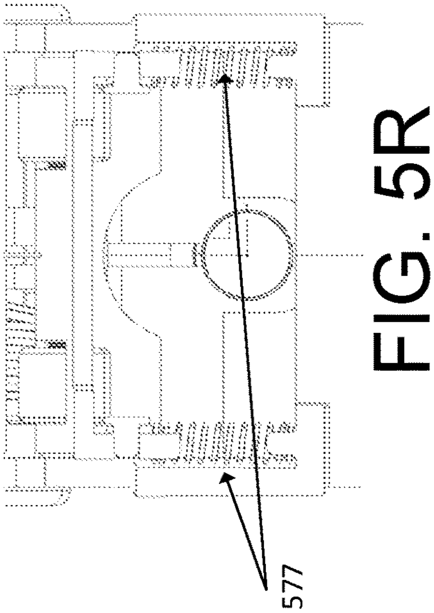
FIG. 5R is a cross-sectional view of a first jaw, in accordance with an example.
Figure 5S:
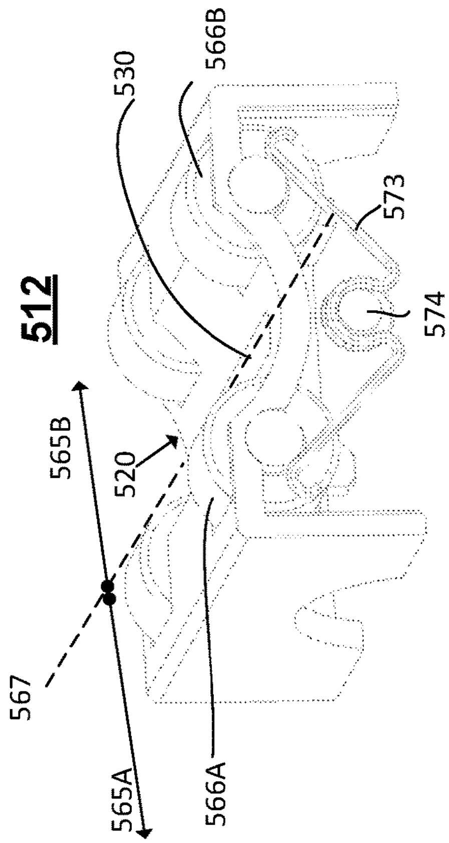
FIG. 5S is a perspective view of a first jaw, in accordance with an example.
Figure 5T:
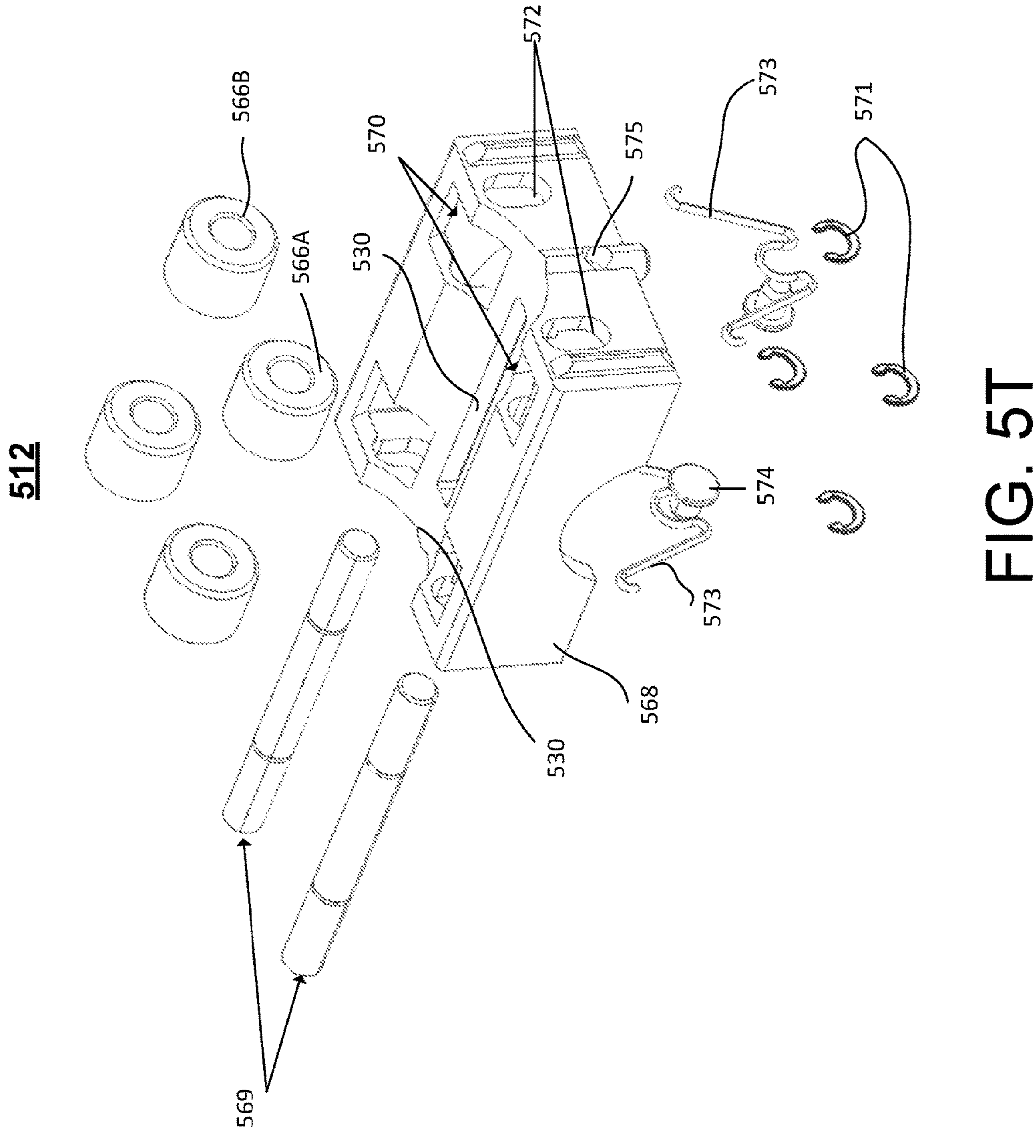
FIG. 5T is an exploded view of a first jaw, in accordance with an example.

FIGS. 5P and 5Q provide side views, FIG. 5R is a cross-sectional view, FIG. 5S is a perspective view, and FIG. 5T is an exploded view of first jaw 512, in accordance with an example. As may be seem in FIG. 5S, first jaw 512 includes an indented portion 520 for seating cable 250. Indented portion 520 may include an indented portion longitudinal axis 567.

A first roller 566A may be positioned on a first side 565A of indented portion longitudinal axis 567, and a second roller 566B may be positioned on a second side 565B of indented portion longitudinal axis 567. In examples, there may be more than one roller on either side of indented portion longitudinal axis 567. For example, in the figure first jaw 512 includes a total of four rollers, two on either side of indented portion longitudinal axis 567. The rollers may help support cable 250.

In examples, first jaw 512 may be configured to translate in a direction perpendicular to the indented portion longitudinal axis and an axis of rotating input shaft 510. For example, turning to the exploded diagram of FIG. 5T, it may be seen that first jaw 512 may include a housing member 568. In an example, first roller 566A and second roller 566B may each be inserted into a respective roller inset cavity 570 within housing member 568. First roller 566A and second roller 566B may be held in the roller inset cavity 570 by two dowels 569. Two dowels 569 may be retained within housing member 568 via two or more (e.g., four) retaining rings 571.

In examples, first roller 566A and second roller 566B may translate in a direction perpendicular to the longitudinal axis of the indented portion 567 and an axis of rotating input shaft 510. First jaw 512 may include apertures 572 through which each of the two dowels 569 are guided. For example, it may be seen that in FIG. 5P that first roller 566A, second roller 566B and two dowels 569 are positioned at the top of apertures 572 so that the rollers are exposed above housing member 568. In FIG. 5Q, it may be seen that first roller 566A, second roller 566B and two dowels 569 are positioned at the bottom of apertures 572 so that the rollers are tucked into the body of housing member 568.

First roller 566A and second roller 566B may allow for centering of cable 250 before making a cut. As will be described below, by allowing vertical movement of first roller 566A, second roller 566B and two dowels 569 within first jaw 512, it may be possible to center cables of different sizes within first jaw 512.

In examples, first roller 566A, second roller 566B and two dowels 569 may be biased in the direction of second jaw 514, for example by a resilient member. Returning to FIG. 5T, it may be seen that first jaw 512 may include at least one instance of a wire form spring 573 that may be held in place via a spring post 574 threaded through an aperture 575 in housing member 568. For example, FIG. 5S provides a cutaway view of first jaw 512 where the assembly may be seen with wire form spring 573 and spring post 574 installed.

Figure 5U:
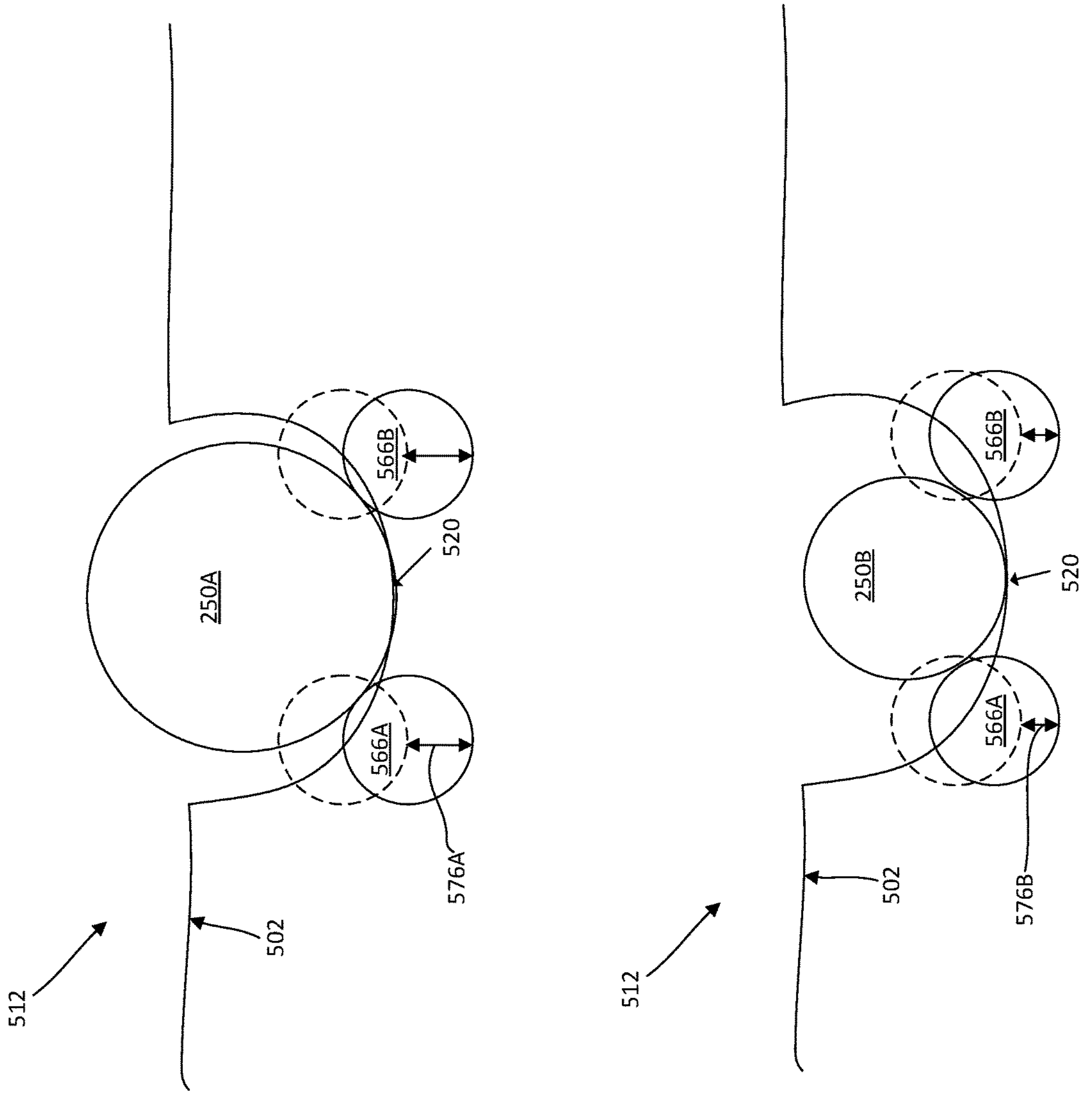
FIG. 5U is a schematic view of the first jaw with a cable in it, in accordance with an example.

By including rollers on a surface of first jaw 512 that are biased towards second jaw 514, it may be possible to center a range of sizes of cables within jaw assembly 504 before cutting. The rollers may keep an axis of cable 250 centered over a cutting contact area with rotating blade 516. Returning to FIG. 5U, two schematic representations of first jaw 512 with a cable are represented. In the upper drawing, a cable 250A has a larger diameter than a cable 250B in the lower drawing. The figure represents a surface of housing 502 along with indented portion 520 and first roller 566A and second roller 566B. The circles with the dotted lines represent the positions of first roller 566A and second roller 566B when they are biased towards second jaw 514 with no cable 250 seated upon indented portion 520. The solid circles represent the positions of first roller 566A and second roller 566B when the cables are seated against indented portion 520, a position that makes them ready for cutting. As may be seen, for the larger cable, cable 250A, first roller 566A and second roller 566B are displaced a distance 576A that is greater than a distance 576B displaced when the smaller cable 250B is seated in indented portion 520. In this way, first roller 566A and second roller 566B may allow for the centering of a range of cable sizes within housing 502.

In examples, first jaw 512 may move towards and away from rotating blade 516 via a track and groove system. For example, in FIG. 5Q first jaw 512 may include one or more rails 532. One or more rails 532 may fit into one or more grooves (not depicted) in housing 502 to create a gliding coupling. In the example, one or more rails 532 and the respective grooves are oriented to translate first jaw 512 towards and away from rotating blade 516 in a straight line.

In examples, first jaw 512 may be biased towards second jaw 514 by one or more resilient members. For example, in FIG. 5R two biasing members 577 are depicted. Two biasing members 577, which may comprise compression springs, are seated between housing member 568 of first jaw 512 and housing 502.

In examples, first jaw 512 may include an adjustment for depth of cut to accommodate different sizes of cable 250. For example, larger diameters of cable may require longer cuts than smaller diameters of cable. If accessory attachment 500 cuts cable too deeply, it may cut into conductors therein. If accessory attachment 500 does not cut cable deeply enough, however, it may not be possible to separate the cable jacket. Therefore, determining the exact depth of cut of the cable for the size of cable is very important.

Figure 5W:
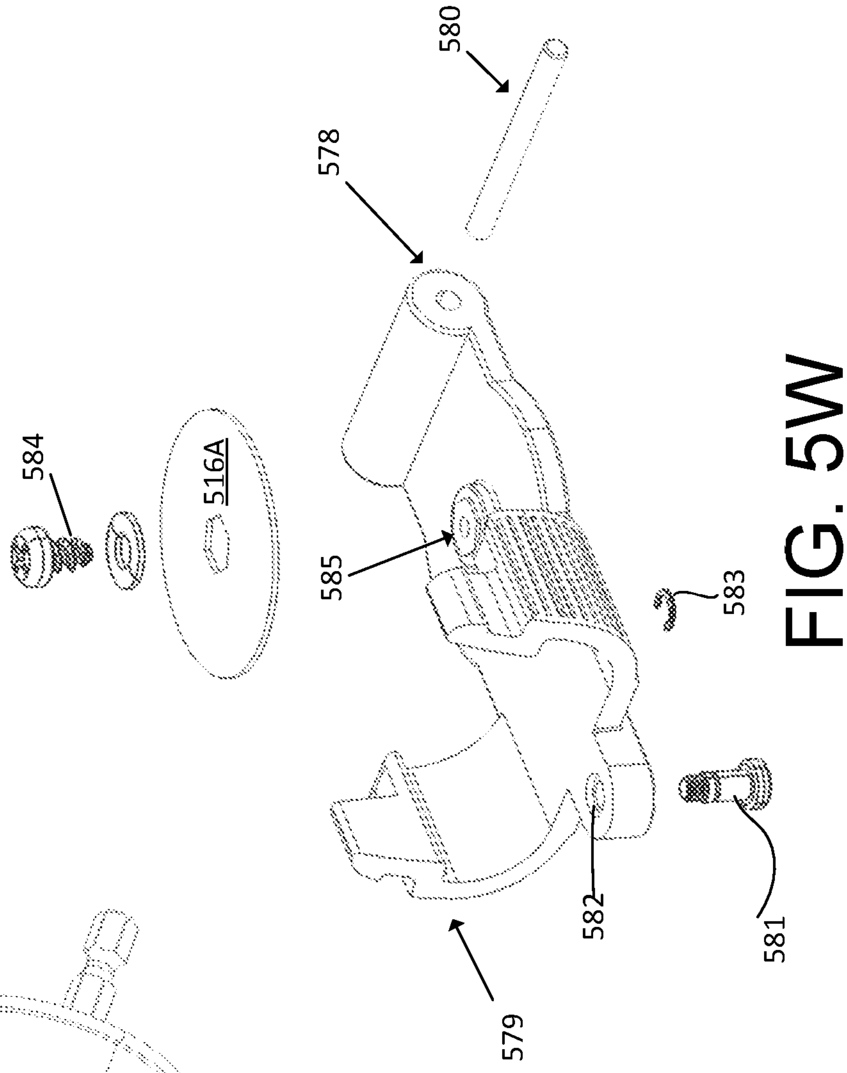
FIG. 5W is an exploded view of a door, in accordance with an example.
Figure 5V:
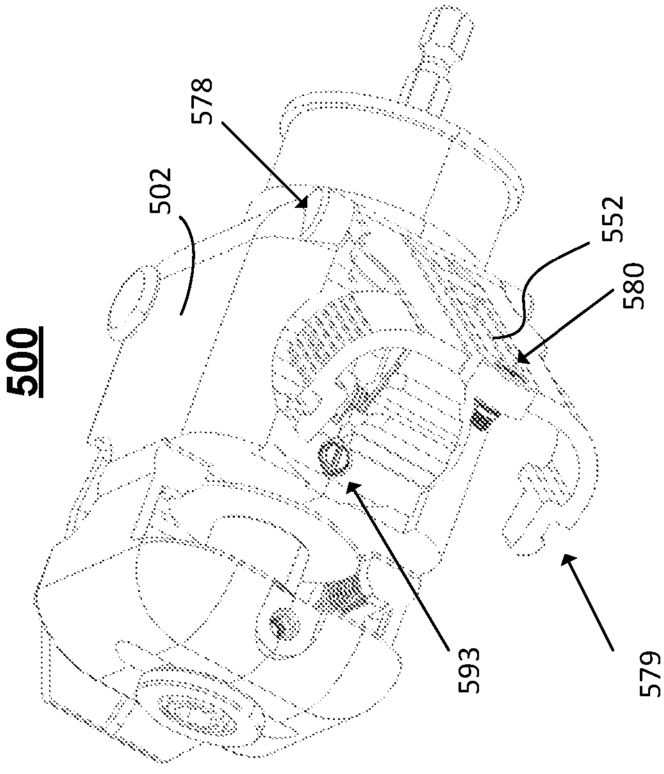
FIG. 5V is a perspective view of the bottom of a cable cutting accessory attachment, in accordance with an example.
Figure 5X:
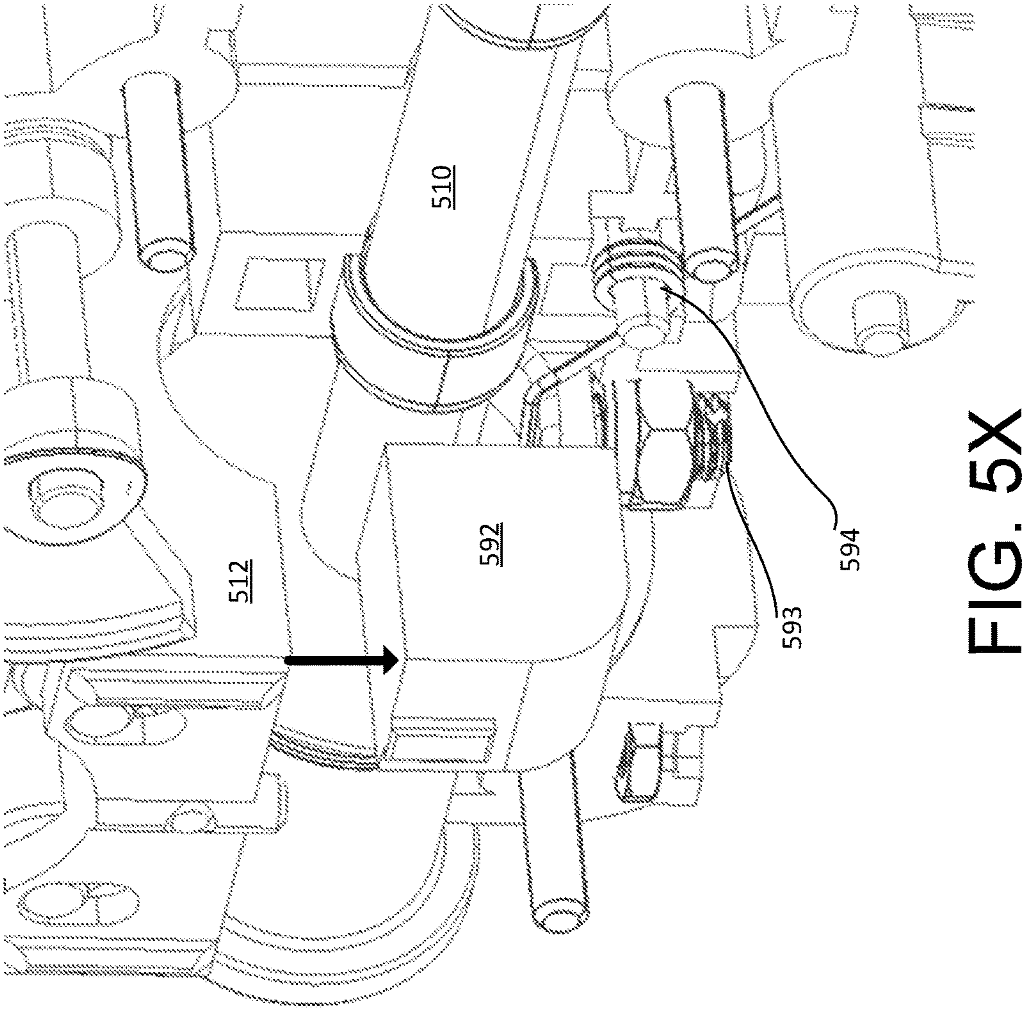
FIG. 5X is a perspective view of a cable cutting accessory attachment with a portion of housing missing, in accordance with an example.

FIG. 5X depicts an example depth of cut adjustment device, including first jaw 512, a depth adjustment block 592, a set screw 593, and a resilient member 594. Depth adjustment block 592 provides a surface (for example the planar surface depicted) that may come into contact with first jaw 512, thereby interrupting the travel of first jaw 512 towards rotating blade 516. In examples, depth adjustment block 592 may take any shape.

Resilient member 594 biases depth adjustment block 592 towards set screw 593. Set screw 593 may be used to adjust the height of depth adjustment block 592 in the direction of the blade. In this way set screw 593 may be used to adjust the travel of first jaw 512 towards the blade, thereby limiting the depth of cut for cable 250.

In examples, set screw 593 may be an actual screw device allowing for a continuous selection of height. In other examples, however, set screw 593 may be indexed to pre-determined changes in length. In examples, set screw 593 may be indexed with cable sizes for quick adjustment.

FIG. 5V provides a perspective view of the bottom of a cable cutting accessory attachment 500 with an open door 552. FIG. 5W depicts an exploded view of door 552 of a cable cutting accessory attachment 500.

Door 552 may include a substantially planar surface attached to housing 502 at a first end via a pivot 578 and at a second end via one or more fasteners 579. In FIG. 5V it may be seen that door 552 may be rotatably coupled to housing 502 via a dowel 580. In examples, one or more fasteners 579 may include finger tabs that may be squeezed or pinched to open door 552. In examples, one or more fasteners 579 may include a screw 581. In an example, screw 581 may be a captive screw held in an aperture 582 via a retainer ring 583.

In examples, door 552 may hold a spare rotating blade 516A attached to the substantially planar surface of the door. For example, spare rotating blade 516A may be coupled to door 552 with a fastener 584. In an example, fastener 584 may be a screw and washer. In an example, fastener 584 may be a plastite screw. Fastener 584 may be turned into a threaded borehole 585 in door 552.

Figure 5Y:
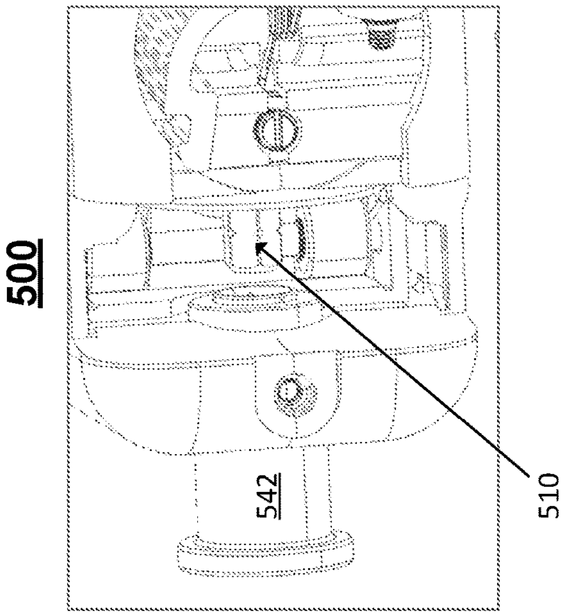
FIG. 5Y is a detail of a perspective view of a cable cutting accessory attachment with an open door, in accordance with an example.
Figure 5Z:
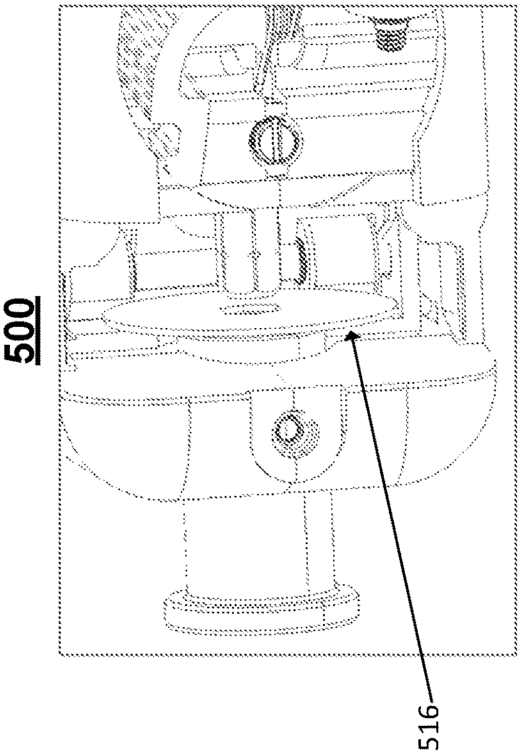
FIG. 5Z is a detail of a perspective view of a cable cutting accessory attachment with an open door, in accordance with an example.
Figure 5A:
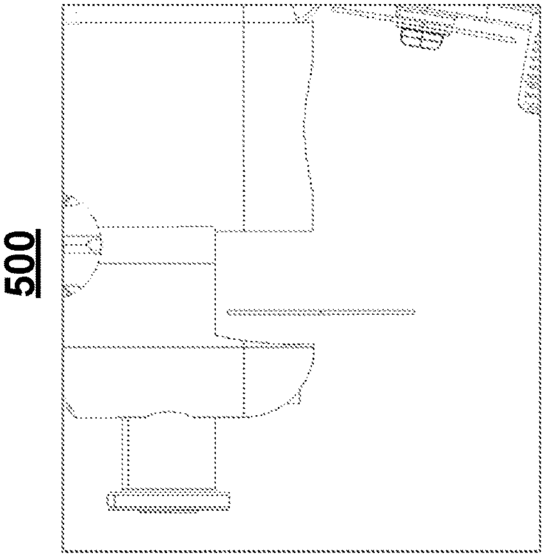
Figure 5B:
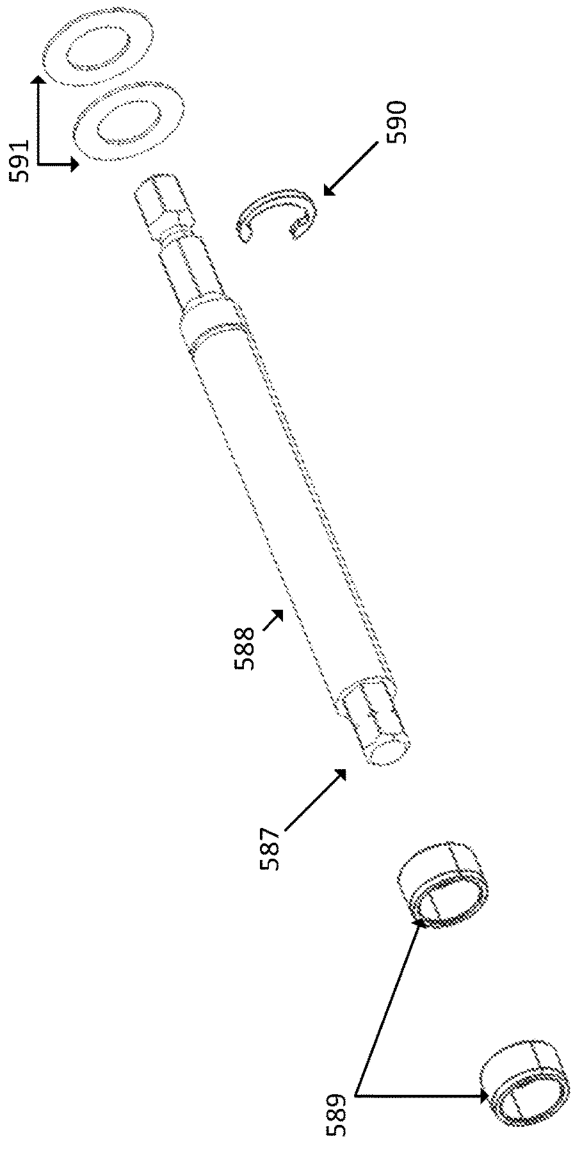
Figure 5C:
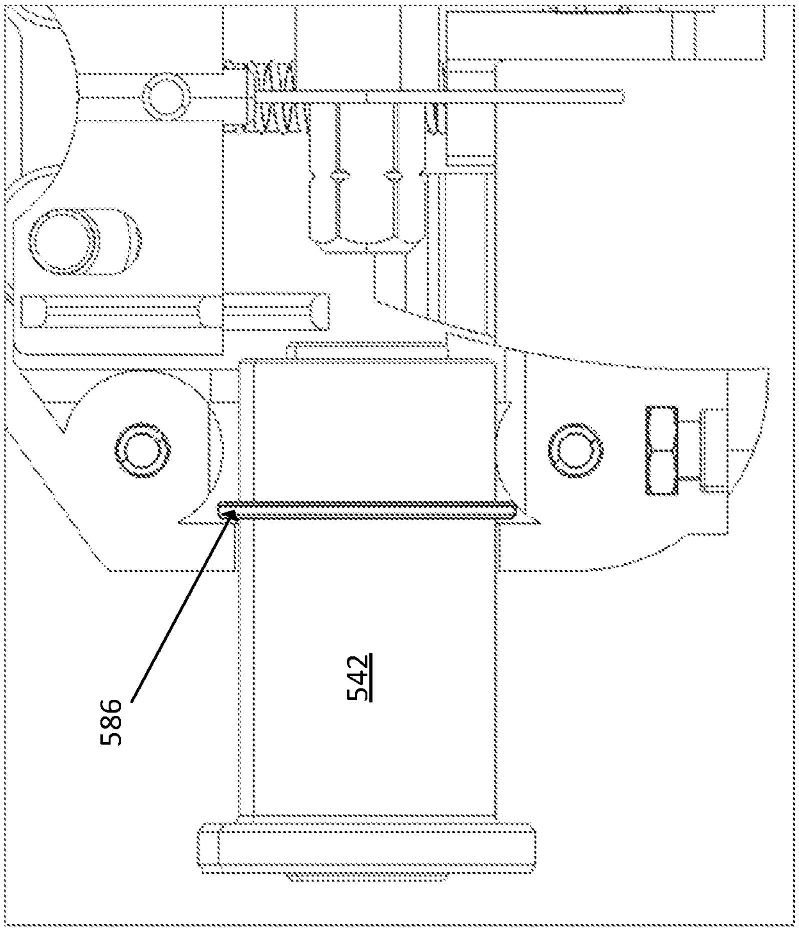
Figure 5E:
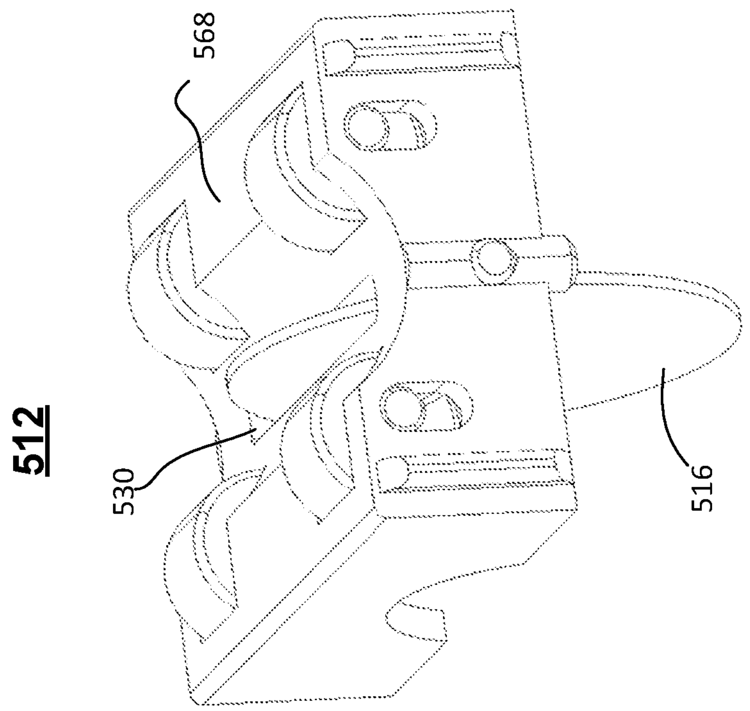
Figure 5D:
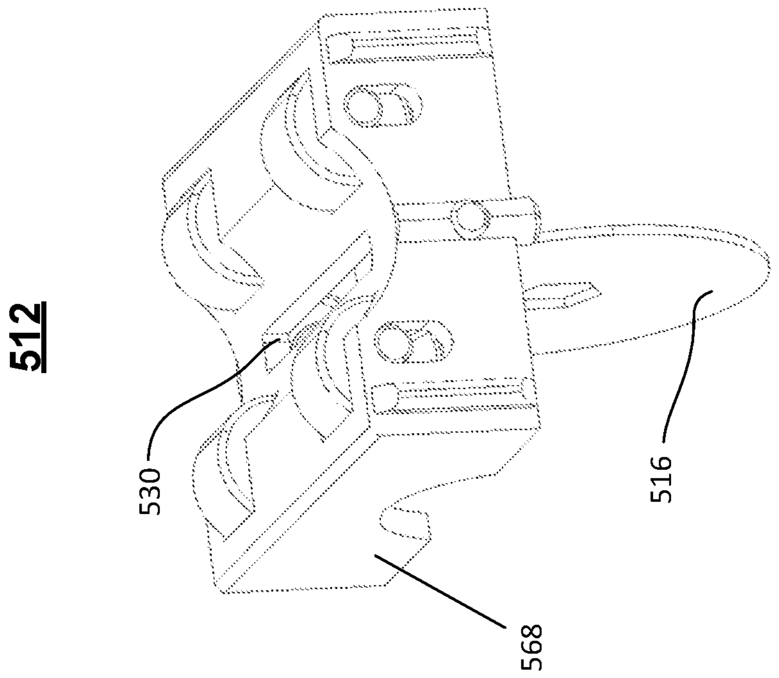

In examples, door 552 may be configured to provide access to rotating blade 516 so that rotating blade 516 may be changed and/or accessory attachment 500 may be configured for different sizes of cable 250. FIGS. 5Y, 5Z, and 5AA, which all include views of accessory attachment 500 with door 552 in an open position, help further illustrate this process.

FIG. 5Y depicts a bottom view of accessory attachment 500 with the door open. In the figure, bit holder 542 has been moved off coupling end 587 of rotating input shaft 510, separating bit holder 542 from rotating input shaft 510. In the figure, it may be seen that bit holder 542 has been moved in a direction away from accessory attachment 500.

FIG. 5BB depicts an exploded view of rotating input shaft 510 where it may be seen that rotating input shaft 510 may include a coupling end 587 for bit holder 542. In the example, coupling end 587 may include a hex coupling surface and an annular surface upon which bit holder 542 may come to rest. Rotating input shaft 510 may further include a shank 588 upon which two or more bearings 589 may be seated and coupled to housing 502. A pair of washers 591 and a retainer ring 590 may further be assembled to retain rotating input shaft 510 within housing 502. An assembled view may best be seen in FIG. 5I.

As may be seen in FIG. 5CC, bit holder 542 may include a retainer ring 586 to prevent bit holder 542 from being removed from accessory attachment 500 during the process of changing or accessing rotating blade 516.

FIGS. 5Y, 5Z, and 5AA depict a method by which rotating blade 516 may be accessed and changed for accessory attachment 500. FIGS. 5Y and 5Z depict details of perspective views of a cable cutting accessory attachment with an open door and FIG. 5AA depicts a detail of a side view of a cable cutting accessory attachment with an open door, in accordance with an example.

In FIG. 5Y, bit holder 542 has been removed from coupling end 587 of rotating input shaft 510. Next in FIG. 5Z, it may be seen that rotating blade 516 may be slide towards the bit holder 542 into a gap between bit holder 542 and rotating input shaft 510 for removal. FIG. 5AA depicts rotating blade 516 being moved out of accessory attachment 500. The reverse procedure may be used to install a new rotating blade 516.

In examples, door 552 may provide access to set screw 593, as may be seen in FIG. 5V. This may prevent accidental adjustment of cable cut depth.

Figure 6A:
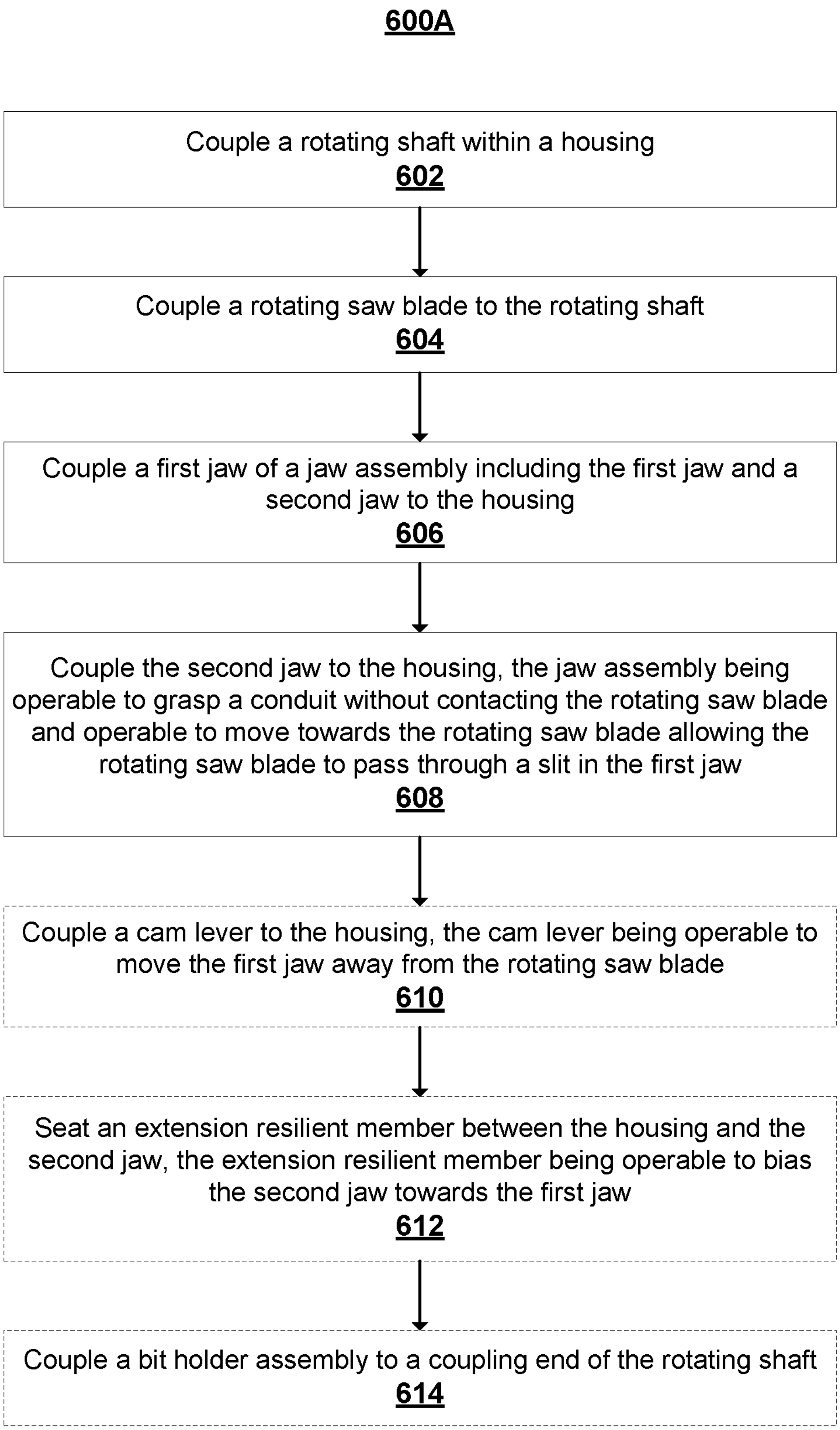
FIG. 6A is a block diagram of method 600A, in accordance with an example.

FIG. 6A depicts method 600A, in accordance with an example. Method 600A may be used to operate a cable cutting accessory attachment 200.

Method 600A begins with step 602. In step 602, rotating input shaft 210 is coupled to housing 202, as described above.

Method 600A continues with step 604. In step 604, rotating blade 216 is coupled to rotating input shaft 210, as described above.

Method 600A continues with step 606. In step 606, first jaw 212 of jaw assembly 204 is coupled to housing 202, as described above.

Method 600A continues with step 608. In step 608, second jaw 214 is coupled to housing 202. Jaw assembly 204 is operable to grasp cable 250 without contacting rotating blade 216 and operable to move towards rotating blade 216 allowing rotating blade 216 to pass through slit 230 in first jaw 212, as described above.

Method 600A may continue with step 610. In step 610, lever 206 may be coupled to housing 202. Lever 206 may be operable to move first jaw 212 away from rotating blade 216, as described above.

Method 600A may continue with step 612. In step 612, extension resilient member 238 may be coupled between housing 202 and second jaw 214, extension resilient member 238 being operable to bias second jaw 214 towards rotating blade 216, as described above.

Method 600A may continue with step 614. In step 614, bit holder assembly 242 may be coupled to coupling end 240 of rotating input shaft 210, as described above.

Figure 6B:
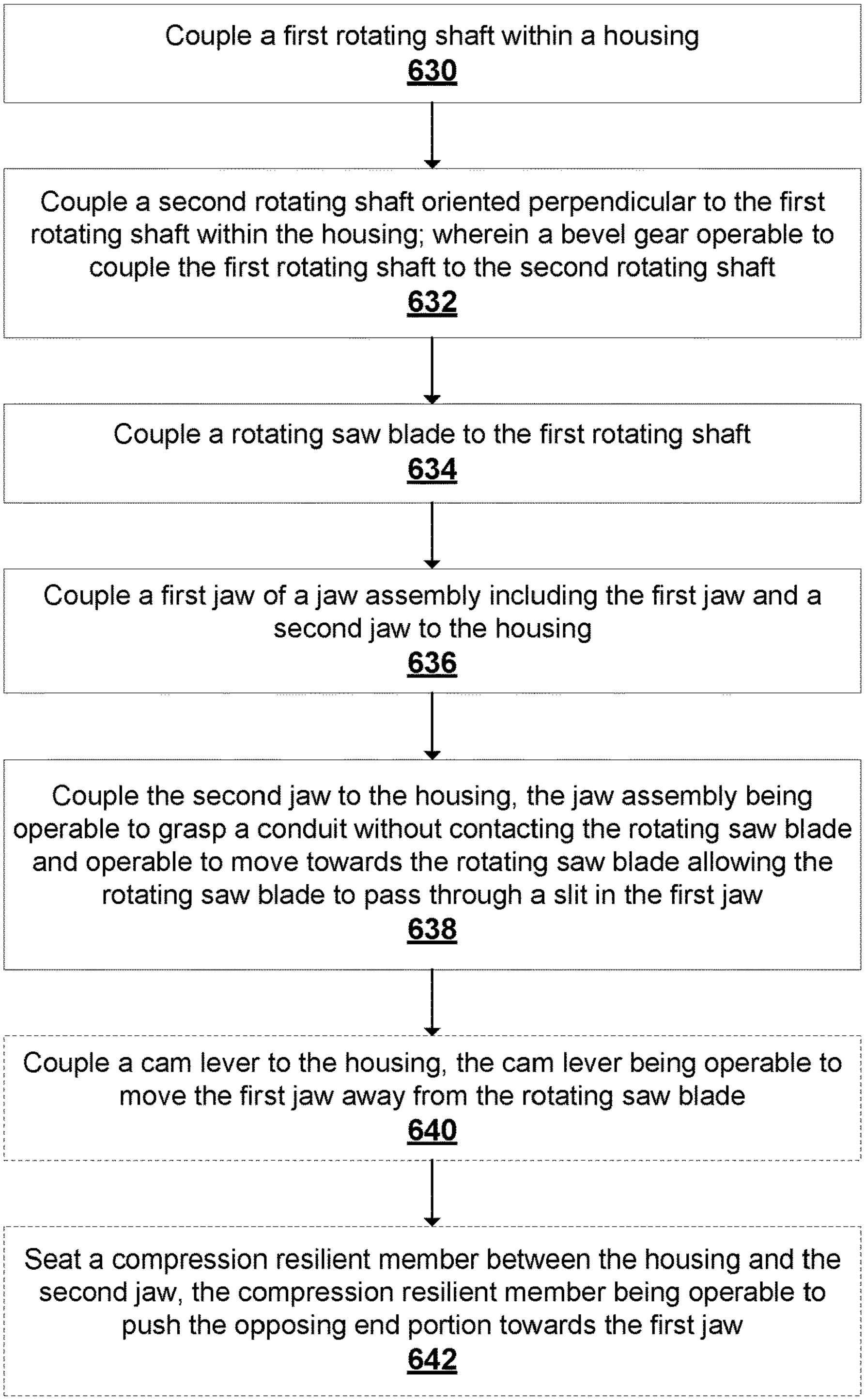
FIG. 6B is a block diagram of method 600B, in accordance with an example.

FIG. 6B depicts method 600B, in accordance with an example. Method 600B may be used to operate a cable cutting accessory attachment 300.

Method 600B begins with step 630. In step 630, a first rotating input shaft is coupled within a housing. For example, first rotating input shaft 310 may be coupled within housing 302, as described above.

Method 600B continues with step 632. In step 632, a second rotating input shaft oriented perpendicular to the first rotating input shaft is coupled within the housing. A bevel gear may be operable to couple the first rotating input shaft to the second rotating input shaft. For example, second rotating input shaft 311 may be coupled within housing 302 with plurality of gears 352, as described above.

Method 600B continues with step 634. In step 634, a rotating blade is coupled to the first rotating input shaft. For example, rotating blade 316 may be coupled to first rotating input shaft 310, as described above.

Method 600B continues with step 636. In step 636, a first jaw of a jaw assembly including the first jaw and a second jaw may be coupled to the housing. For example, first jaw 312 may be coupled to housing 302, as described above.

Method 600B continues with step 638. In step 638, the second jaw may be coupled to the housing, with the jaw assembly being operable to grasp a conduit without contacting the rotating blade and move towards the rotating blade allowing the rotating blade to pass through a slit in the first jaw. For example, second jaw 314 may be coupled to housing 302, as described above.

Method 600B may continue with step 640. In step 640, a cam lever may be coupled to the housing, the lever being operable to move the first jaw away from the rotating blade. For example, cam lever 306 may be coupled to housing 302, for example via inner housing member 336, as described above.

Method 600B may continue with step 642. In step 642, a compression resilient member may be seated between the housing and the second jaw, the compression resilient member being operable to push the second jaw towards the first jaw. For example, biasing member 338 may be seated against housing 302 and second jaw 314, as described above.

Figure 6C:
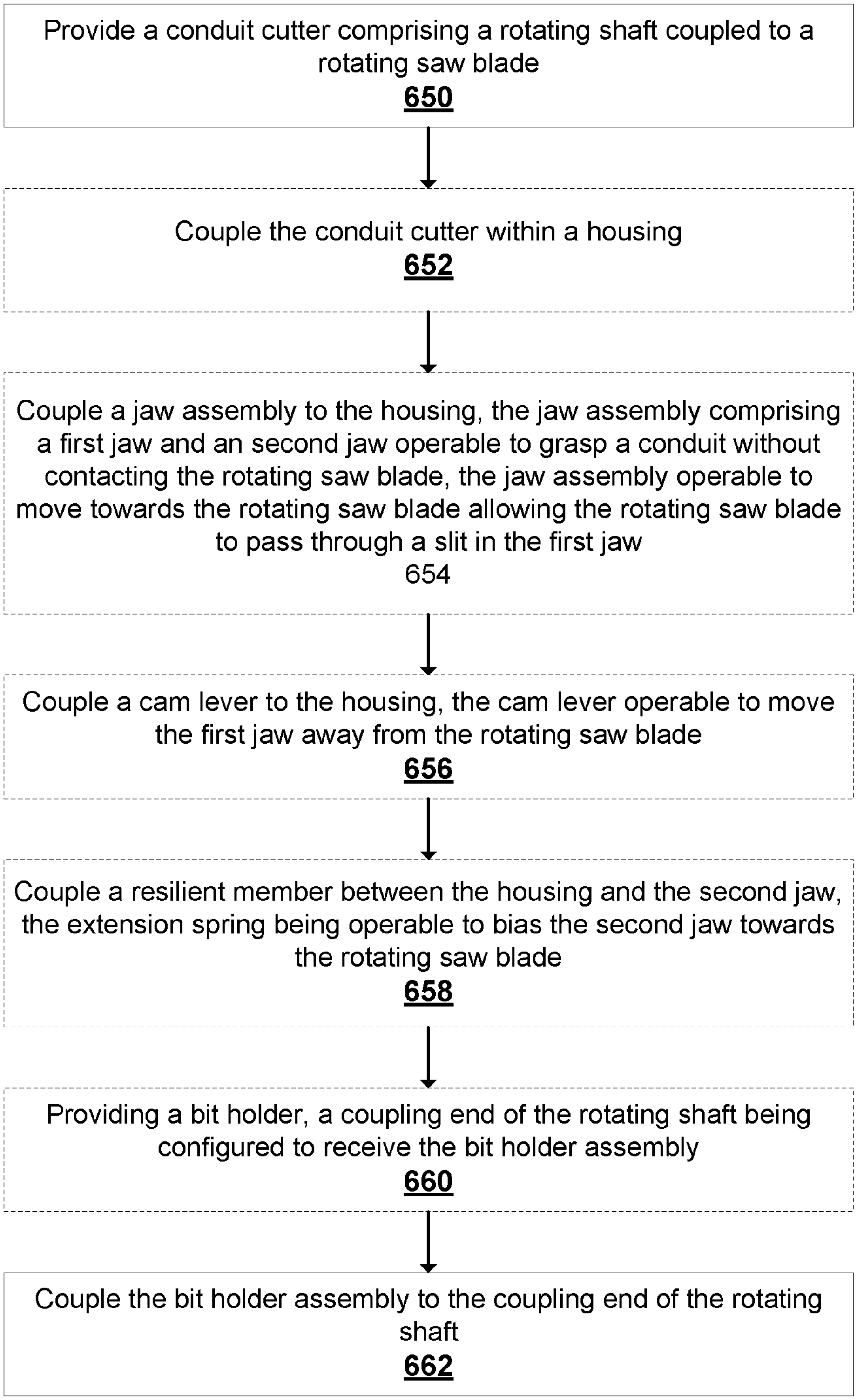
FIG. 6C is a block diagram of method 600C, in accordance with an example.

FIG. 6C depicts method 600C, in accordance with an example. Method 600C may be used to operate a cable cutting accessory attachment 200, 300.

Method 600C begins with step 650. In step 650, a conduit cutter comprising a rotating input shaft is coupled to a rotating blade. For example, rotating blade 216 or 316 described with respect to cable cutter accessory attachment 200 or accessory attachment 300 may be coupled to rotating input shaft 210 or 310, respectively.

Method 600C may continue with step 652. In step 652, the conduit cutter may be coupled within a housing. For example, rotating blade 216 or 316 and rotating input shaft 210 or 310 may be coupled within housing 202 or 302.

Method 600C may continue with step 654. In step 654, a jaw assembly may be coupled to the housing. The jaw assembly may include a first jaw and a second jaw operable to grasp a conduit without contacting the rotating blade and may be operable to move towards the rotating blade allowing the rotating blade to pass through a slit in the first jaw. For example, jaw assembly 204 or 304 may be coupled to housing 202 or 302.

Method 600C may continue with step 656. In step 656, a cam lever may be coupled to the inner housing, the cam lever operable to move the first jaw away from the rotating blade. For example, lever 206 or 306 may be coupled to housing 202 or 302.

Method 600C may continue with step 658. In step 658, a resilient member may be coupled between the housing and the second jaw, the extension resilient member being operable to bias the second jaw towards the rotating blade. For example, extension resilient member 238 may be coupled between housing 202 and second jaw 214, or biasing member 338 may be coupled between housing 302 and second jaw 314, as described above.

Method 600C continues with step 660. In step 660, a bit holder is provided. For example, bit holder assembly 242 may be provided. Coupling end 240 rotating input shaft 210 may be configured to receive the bit holder assembly.

Method 600C may continue with step 662. In step 662, the bit holder assembly may be coupled to the coupling end of the rotating input shaft. For example, bit holder assembly 242 may be coupled to coupling end 240.

The example cable cutting accessory attachments and methods described herein provide for an efficient two-step process of first securely grasping a cable, and then moving the cable smoothly towards a rotating saw driven by a motor. The cable cutting accessory attachments allow a tradesperson to make quick, precise cuts to cable sheathing, for example MC cable, without damaging any electrical wiring therein. By biasing the jaw assembly closed, it is possible to provide one hands-free means of securely grasping a cable. By biasing the second jaw of the jaw assembly towards the first jaw (and therefore rotating blade) and providing a cam lever to displace the jaw assembly away from the rotating blade, is possible to easily move a clamped cable towards the rotating blade with the mere flip of a lever. By providing an additional bit holder assembly, it may be possible to provide a multi-tool function, or at least to prevent the user from needing to remove the accessory attachment to regain use of the power-driven tool for other uses.

A number of embodiments have been described. Nevertheless, it will be understood that various modifications may be made without departing from the spirit and scope of the specification.

In addition, any logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A cable jacket cutting accessory attachment device comprising:

a housing;

a rotatable input shaft at least partially received in the housing, the input shaft including an end portion that is configured to be releasably coupled to a rotating output member of a rotary power tool;

a rotatable blade configured to be rotated upon rotation of the rotatable input shaft; and a jaw assembly coupled to the housing and including a first jaw and a second jaw operable to grasp a cable, the jaw assembly operable to move the cable towards the rotatable blade allowing the rotatable blade to form a slit in an exterior jacket of the cable;

wherein the first jaw is biased towards the blade and includes a slot, at least a portion of the rotatable blade is configured to extend through the slot to form the slit in the exterior jacket of the cable.

2. The device of claim 1, wherein the jaw assembly is movable between an open position and a closed position and is biased toward the closed position.

3. The device of claim 1, wherein the second jaw is coupled to the housing via a pivot point.

4. The device of claim 1, wherein the first jaw is configured to move towards and away from the rotatable blade via a track engaged with a groove.

5. The device of claim 1, wherein the first jaw and the second jaw are operable to move independently with respect to one another.

6. The device of claim 1, further comprising a lever coupled to the housing operable to move the first jaw away from the rotatable blade.

7. The device of claim 1, further comprising a biasing member operable to bias the second jaw towards the first jaw.

8. The device of claim 7, wherein the biasing member comprises at least one of a compression spring, an extension spring, or a torsion spring.

9. The device of claim 1, further comprising:

a second rotatable shaft oriented transverse to the rotatable input shaft; and a plurality of gears operable to couple the rotatable input shaft to the second rotatable shaft.

10. The device of claim 1, further comprising a bit holder assembly rotatably drivable upon rotation of the rotatable input shaft.

11. The device of claim 1, further comprising at least one roller coupled to the jaw assembly and configured to support the cable.

12. The device of claim 11, wherein the at least one roller is coupled to one of the first jaw or the second jaw is configured to rotate and translate relative to one of the first jaw and the second jaw.

13. The device of claim 1, wherein the jaw assembly is movable between a first position in which the rotatable blade is unexposed and a second position in which the rotatable blade is exposed to form the slit in a jacket of the cable.

14. The device of claim 1, wherein the housing includes a door configured to be openable to replace the rotatable blade.

15. The device of claim 1, wherein the jaw assembly further includes a lock member configured to engage a groove in a jacket of the cable when the jaw assembly is in a closed position.

16. A cable jacket cutting accessory attachment device comprising:

a housing;

a rotatable input shaft at least partially received in the housing, the input shaft including an end portion that is configured to be releasably coupled to a rotating output member of a rotary power tool;

a rotatable blade configured to be rotated upon rotation of the rotatable input shaft;

a cable holder assembly configured to hold a cable while allowing the rotatable blade to form a slit in an exterior jacket of the cable; and a bit holder configured to be rotated upon rotation of the rotatable input shaft.

17. The device of claim 16, wherein the housing has a first end portion and a second end portion opposite the first end portion with the rotatable input shaft at least partially received in the first end portion and the bit holder coupled to the second end portion.

18. The device of claim 16, wherein the cable holder assembly further comprises a jaw assembly including a first jaw and a second jaw operable to grasp the cable and to move the cable towards the rotatable blade allowing the rotatable blade to pass through a slot in one of the first jaw or the second jaw.

19. The device of claim 18, wherein the jaw assembly is movable between an open position and a closed position and is biased toward the closed position.

20. The device of claim 18, wherein at least one of the first jaw or the second jaw is pivotally coupled to the housing.

21. A cable jacket cutting accessory attachment device comprising:

a housing;

a rotatable input shaft at least partially received in the housing, the input shaft including an end portion that is configured to be releasably coupled to a rotating output member of a rotary power tool;

a rotatable blade configured to be rotated upon rotation of the rotatable input shaft; and a jaw assembly coupled to the housing and including a first jaw and a second jaw operable to grasp a cable, a lock member configured to engage a groove in a jacket of the cable when the cable is grasped by the jaw assembly, and at least one roller configured to support the cable when grasped by the jaw assembly, wherein the jaw assembly is operably movable between a first position in which the rotatable blade is unexposed and a second position in which the rotatable blade is exposed and is rotatable to form a slit in the jacket of the cable.

22. A device comprising:

a housing;

a rotatable blade disposed in the housing; and a jaw assembly coupled to the housing and including a first jaw and a second jaw operable to grasp a cable, the jaw assembly operable to move the cable towards the rotatable blade allowing the rotatable blade to form a slit in an exterior jacket of the cable;

wherein the first jaw is biased towards the blade and includes a slot, at least a portion of the rotatable blade is configured to extend through the slot to form the slit in the exterior jacket of the cable.

23. The device of claim 22, wherein the second jaw is coupled to the housing via a pivot point.

24. The device of claim 22, wherein the first jaw is configured to move towards and away from the rotatable blade via a track engaged with a groove.

25. The device of claim 22, wherein the first jaw and the second jaw are operable to move independently with respect to one another.

26. The device of claim 22, further comprising a lever coupled to the housing operable to move the first jaw away from the rotatable blade.

27. The device of claim 22, wherein the jaw assembly further includes a lock member configured to engage a groove in a jacket of the cable when the jaw assembly is in a closed position.

28. The device of claim 17, further comprising a lever coupled to the housing operable to move the first jaw away from the rotatable blade.

29. The device of claim 17, further comprising a lock member configured to engage a groove in a jacket of the cable when the jaw assembly is in a closed position.

30. The device of claim 20, wherein the first jaw is biased towards the blade and includes a slot, at least a portion of the rotatable blade is configured to extend through the slot to form the slit in the jacket of the cable.

31. The device of claim 20, further comprising a lever coupled to the housing operable to move the first jaw away from the rotatable blade.

* * * * *